(12) United States Patent
Herzlinger et al.

(10) Patent No.: US 9,528,379 B2
(45) Date of Patent: Dec. 27, 2016

(54) TURBINE BUCKET HAVING SERPENTINE CORE

(71) Applicant: General Electric Company, Schenectady, NY (US)

(72) Inventors: Jason Douglas Herzlinger, Glenville, NY (US); Harish Bommanakatte, Bangalore (IN); Anthony Louis Giglio, Baton Rouge, LA (US); Jacob Charles Perry, II, Taylors, SC (US)

(73) Assignee: General Electric Company, Schenectady, NY (US)

( * ) Notice: Subject to any disclaimer, the term of this patent is extended or adjusted under 35 U.S.C. 154(b) by 458 days.

(21) Appl. No.: 14/061,363

(22) Filed: Oct. 23, 2013

(65) Prior Publication Data

US 2015/0110640 A1    Apr. 23, 2015

(51) Int. Cl.
| | | |
|---|---|---|
| *F01D 5/14* | (2006.01) | |
| *F01D 5/18* | (2006.01) | |
| *B22C 9/10* | (2006.01) | |
| *B22C 9/24* | (2006.01) | |

(52) U.S. Cl.
CPC .............. *F01D 5/187* (2013.01); *B22C 9/10* (2013.01); *B22C 9/103* (2013.01); *B22C 9/24* (2013.01); *F01D 5/147* (2013.01); *F05D 2230/211* (2013.01); *F05D 2250/185* (2013.01);
CPC . *F05D 2250/74* (2013.01); *Y02T 50/673* (2013.01); *Y02T 50/676* (2013.01)

(58) Field of Classification Search
CPC ............ F01D 5/14; F01D 5/147; F01D 5/187; F01D 5/188; F01D 5/189; F05D 2250/185; F05D 2250/74
See application file for complete search history.

(56) References Cited

U.S. PATENT DOCUMENTS

| | | | |
|---|---|---|---|
| 1,828,409 | A | 10/1931 | Densmore |
| 1,955,929 | A | 4/1934 | Mueller |
| 2,714,499 | A | 8/1955 | Warner |
| 3,844,679 | A | 10/1974 | Grondahl et al. |
| 4,208,167 | A | 6/1980 | Yasugahira et al. |

(Continued)

FOREIGN PATENT DOCUMENTS

EP        2479381 A1    7/2012

OTHER PUBLICATIONS

Booth et al., "Rotor-Tip Leakage: Part 1—Basic Methodology", Journal of Engineering for Power, Transactions of the ASME, vol. 104, Jan. 1982, pp. 154-161.

(Continued)

*Primary Examiner* — Gregory Anderson
*Assistant Examiner* — Christopher R Legendre
(74) *Attorney, Agent, or Firm* — Ernest G. Cusick; Hoffman Warnick LLC

(57) ABSTRACT

Various embodiments of the invention include turbine buckets and systems employing such buckets. Various particular embodiments include a turbine bucket having: a base; and an airfoil connected with the base at a first end of the airfoil, the airfoil including: a casing having: a suction side; a pressure side opposing the suction side; a leading edge spanning between the pressure side and the suction side; and a trailing edge opposing the leading edge and spanning between the pressure side and the suction side, the casing including an aperture on the leading edge; and a core within the casing, the core having a serpentine shape for supporting the casing and a leading edge passage fluidly connected with the aperture on the leading edge of the casing.

7 Claims, 8 Drawing Sheets

(56) References Cited

U.S. PATENT DOCUMENTS

| | | | |
|---|---|---|---|
| 4,604,031 A | 8/1986 | Moss et al. | |
| 4,627,480 A * | 12/1986 | Lee | B22C 9/04 |
| | | | 164/122.1 |
| 4,682,935 A | 7/1987 | Martin | |
| 5,073,086 A | 12/1991 | Cooper | |
| 5,088,892 A | 2/1992 | Weingold et al. | |
| 5,282,721 A | 2/1994 | Kildea | |
| 5,286,168 A | 2/1994 | Smith | |
| 5,397,217 A | 3/1995 | DeMarche et al. | |
| 5,480,285 A | 1/1996 | Patel et al. | |
| 5,503,527 A | 4/1996 | Lee et al. | |
| 5,525,038 A | 6/1996 | Sharma et al. | |
| 5,536,143 A | 7/1996 | Jacala et al. | |
| 5,738,489 A | 4/1998 | Lee | |
| 5,848,876 A | 12/1998 | Tomita | |
| 5,873,695 A | 2/1999 | Takeishi et al. | |
| 5,924,843 A | 7/1999 | Staub et al. | |
| 5,980,209 A | 11/1999 | Barry et al. | |
| 6,017,189 A | 1/2000 | Judet et al. | |
| 6,019,579 A | 2/2000 | Fukuno et al. | |
| 6,072,829 A | 6/2000 | Dirr | |
| 6,077,034 A | 6/2000 | Tomita et al. | |
| 6,079,948 A | 6/2000 | Sasaki et al. | |
| 6,086,328 A | 7/2000 | Lee | |
| 6,142,739 A | 11/2000 | Harvey | |
| 6,190,130 B1 | 2/2001 | Fukue et al. | |
| 6,241,467 B1 | 6/2001 | Zelesky et al. | |
| 6,257,830 B1 | 7/2001 | Matsuura et al. | |
| 6,419,446 B1 | 7/2002 | Kvasnak et al. | |
| 6,422,817 B1 | 7/2002 | Jacala | |
| 6,464,462 B2 | 10/2002 | Stathopoulos et al. | |
| 6,474,947 B1 | 11/2002 | Yuri | |
| 6,491,493 B1 | 12/2002 | Watanabe et al. | |
| 6,491,496 B2 | 12/2002 | Starkweather | |
| 6,554,564 B1 | 4/2003 | Lord | |
| 6,579,066 B1 | 6/2003 | Saito et al. | |
| 6,595,750 B2 | 7/2003 | Parneix et al. | |
| 6,672,829 B1 | 1/2004 | Cherry et al. | |
| 6,722,851 B1 | 4/2004 | Brittingham et al. | |
| 6,761,535 B1 | 7/2004 | McGrath et al. | |
| 6,790,005 B2 | 9/2004 | Lee et al. | |
| 6,799,948 B2 | 10/2004 | Ito et al. | |
| 6,887,042 B2 | 5/2005 | Ito et al. | |
| 6,957,949 B2 | 10/2005 | Hyde et al. | |
| 6,966,756 B2 | 11/2005 | McGrath et al. | |
| 6,969,232 B2 | 11/2005 | Zess et al. | |
| 7,029,235 B2 | 4/2006 | Liang | |
| 7,048,509 B2 | 5/2006 | Tominaga et al. | |
| 7,118,329 B2 | 10/2006 | Goodman | |
| 7,134,842 B2 | 11/2006 | Tam et al. | |
| 7,220,100 B2 | 5/2007 | Lee et al. | |
| 7,255,536 B2 | 8/2007 | Cunha et al. | |
| 7,281,894 B2 | 10/2007 | Lee et al. | |
| 7,300,247 B2 | 11/2007 | Nomura et al. | |
| 7,309,212 B2 | 12/2007 | Itzel et al. | |
| 7,377,746 B2 | 5/2008 | Brassfield et al. | |
| 7,416,391 B2 | 8/2008 | Veltre et al. | |
| 7,476,086 B2 | 1/2009 | Wadia et al. | |
| 7,544,043 B2 | 6/2009 | Eastman et al. | |
| 7,597,539 B1 | 10/2009 | Liang | |
| 7,632,062 B2 | 12/2009 | Harvey et al. | |
| 7,641,446 B2 | 1/2010 | Harvey | |
| 7,674,093 B2 * | 3/2010 | Lee | B22C 9/103 |
| | | | 164/365 |
| 7,726,937 B2 | 6/2010 | Baumann et al. | |
| 7,731,483 B2 | 6/2010 | DeLong et al. | |
| 7,766,606 B2 | 8/2010 | Liang | |
| 7,931,444 B2 | 4/2011 | Godsk et al. | |
| 7,972,115 B2 | 7/2011 | Potier | |
| 7,985,053 B2 | 7/2011 | Schott et al. | |
| 7,997,875 B2 | 8/2011 | Nanukuttan et al. | |
| 8,047,802 B2 | 11/2011 | Clemen | |
| 8,052,395 B2 | 11/2011 | Tragesser | |
| 8,092,178 B2 | 1/2012 | Marini et al. | |
| 8,105,031 B2 * | 1/2012 | Trindade | F01D 5/186 |
| | | | 416/97 R |
| 8,105,037 B2 | 1/2012 | Grover et al. | |
| 8,133,030 B2 | 3/2012 | Grafitti et al. | |
| 8,133,032 B2 | 3/2012 | Tibbott et al. | |
| 8,147,188 B2 | 4/2012 | Reeves et al. | |
| 8,172,533 B2 * | 5/2012 | Pinero | F01D 5/187 |
| | | | 415/115 |
| 8,347,947 B2 * | 1/2013 | Dube | B22C 9/04 |
| | | | 164/369 |
| 8,371,815 B2 | 2/2013 | Farrell | |
| 8,414,265 B2 | 4/2013 | Willett, Jr. | |
| 8,449,249 B2 | 5/2013 | Suchezky | |
| 8,568,097 B1 * | 10/2013 | Liang | F01D 5/187 |
| | | | 416/97 R |
| 8,591,189 B2 * | 11/2013 | Correia | F01D 5/187 |
| | | | 416/96 R |
| 8,602,740 B2 | 12/2013 | O'Hearn et al. | |
| 8,647,066 B2 | 2/2014 | Guimbard et al. | |
| 8,647,067 B2 | 2/2014 | Pandey et al. | |
| 8,662,825 B2 | 3/2014 | Ireland et al. | |
| 8,684,684 B2 | 4/2014 | Clements et al. | |
| 8,720,207 B2 | 5/2014 | Gersbach et al. | |
| 8,721,291 B2 | 5/2014 | Lee et al. | |
| 8,777,572 B2 | 7/2014 | Cheong et al. | |
| 8,821,111 B2 * | 9/2014 | Gear | F01D 5/187 |
| | | | 415/115 |
| 8,870,524 B1 * | 10/2014 | Liang | F01D 9/065 |
| | | | 415/115 |
| 8,870,585 B2 | 10/2014 | Lee et al. | |
| 8,967,959 B2 | 3/2015 | Stein et al. | |
| 9,103,213 B2 | 8/2015 | Barr et al. | |
| 9,188,017 B2 | 11/2015 | Xu | |
| 2002/0141863 A1 | 10/2002 | Liu et al. | |
| 2004/0062636 A1 | 4/2004 | Mazzola et al. | |
| 2004/0081548 A1 | 4/2004 | Zess et al. | |
| 2007/0059173 A1 | 3/2007 | Lee et al. | |
| 2007/0059182 A1 | 3/2007 | Stegemiller et al. | |
| 2007/0128033 A1 | 6/2007 | Lee et al. | |
| 2007/0258810 A1 | 11/2007 | Aotsuka et al. | |
| 2007/0258819 A1 | 11/2007 | Allen-Bradley et al. | |
| 2008/0213098 A1 | 9/2008 | Neef et al. | |
| 2008/0232968 A1 | 9/2008 | Nguyen | |
| 2009/0003987 A1 * | 1/2009 | Zausner | F01D 5/187 |
| | | | 415/115 |
| 2010/0047065 A1 | 2/2010 | Sakamoto et al. | |
| 2010/0143139 A1 | 6/2010 | Pandey et al. | |
| 2010/0158696 A1 | 6/2010 | Pandey et al. | |
| 2010/0189023 A1 | 7/2010 | Lindgren et al. | |
| 2010/0196154 A1 | 8/2010 | Sakamoto et al. | |
| 2010/0221122 A1 | 9/2010 | Klasing et al. | |
| 2010/0278644 A1 | 11/2010 | Gersbach et al. | |
| 2011/0044818 A1 | 2/2011 | Kuhne et al. | |
| 2011/0058958 A1 | 3/2011 | Ireland et al. | |
| 2011/0255990 A1 | 10/2011 | Diamond et al. | |
| 2012/0163993 A1 * | 6/2012 | Levine | B22C 9/10 |
| | | | 416/97 R |
| 2012/0201688 A1 | 8/2012 | Mahle et al. | |
| 2012/0328451 A1 | 12/2012 | Lomas et al. | |
| 2013/0017095 A1 | 1/2013 | Lee et al. | |
| 2013/0108424 A1 | 5/2013 | Stein et al. | |
| 2013/0224040 A1 | 8/2013 | Straccia | |
| 2014/0119942 A1 | 5/2014 | Lehmann et al. | |
| 2014/0271225 A1 * | 9/2014 | Herzlinger | F01D 5/187 |
| | | | 416/96 R |
| 2015/0110639 A1 * | 4/2015 | Herzlinger | F01D 5/18 |
| | | | 416/96 R |
| 2015/0110640 A1 * | 4/2015 | Herzlinger | F01D 5/147 |
| | | | 416/96 R |
| 2015/0110641 A1 * | 4/2015 | Herzlinger | F01D 5/186 |
| | | | 416/97 R |

OTHER PUBLICATIONS

U.S. Appl. No. 14/061,107, Office Action dated Apr. 5, 2016, 15 pages.

(56) References Cited

OTHER PUBLICATIONS

U.S. Appl. No. 14/061,146 Notice of Allowance dated Apr. 11, 2016, 24 pages.
U.S. Appl. No. 14/060,996, Notice of Allowance dated May 25, 2016, 17 pages.
U.S. Appl. No. 14/061,221, Final Office Action 1 dated Jul. 11, 2016, 18 pages.
U.S. Appl. No. 14/061,107, Notice of Allowance dated Jul. 15, 2016, 26 pages.
U.S. Appl. No. 14/060,996, Final Office Action 1 dated Mar. 4, 2016, 15 pages.
U.S. Appl. No. 14/061,221, Office Action 1 dated Mar. 14, 2016, 15 pages.
U.S. Appl. No. 14/061,193, Office Action 1 dated Mar. 16, 2016, 17 pages.
U.S. Appl. No. 14/061,169, Office Action 1 dated Jul. 13, 2016, 40 pages.
U.S. Appl. No. 14/061,193, Notice of Allowance dated Sep. 27, 2016, 35 pages.
U.S. Appl. No. 14/061,158, Office Action 1 dated Aug. 10, 2016, 60 pages.
U.S. Appl. No. 14/061,221, Office Action 2 dated Oct. 27, 2016, 14 pages.

* cited by examiner

TURBINE BUCKET HAVING SERPENTINE CORE

FIELD OF THE INVENTION

The subject matter disclosed herein relates to turbomachines. More particularly, the subject matter disclosed herein relates to components within turbomachines such as gas and/or steam turbines.

BACKGROUND OF THE INVENTION

Gas turbine systems are one example of turbomachines widely utilized in fields such as power generation. A conventional gas turbine system includes a compressor section, a combustor section, and a turbine section. During operation of the gas turbine system, various components in the system are subjected to high temperature flows, which can cause the components to fail. Since higher temperature flows generally result in increased performance, efficiency, and power output of the gas turbine system, it may be desirable to cool the components that are subjected to high temperature flows to allow the gas turbine system to operate at increased temperatures.

Many system requirements are instituted for each stage of the turbine section, or hot gas path section, of a gas turbine system in order to meet design goals including overall improved efficiency and airfoil loading. Particularly, the buckets of the first stage of the turbine section are designed to meet the operating requirements for that particular stage and also meet requirements for bucket cooling area and wall thickness. However, conventional designs fail to meet these operating requirements in some cases.

BRIEF DESCRIPTION OF THE INVENTION

Various embodiments of the invention include turbine buckets and systems employing such buckets. Various particular embodiments include a turbine bucket having: a base; and an airfoil connected with the base at a first end of the airfoil, the airfoil including: a casing having: a suction side; a pressure side opposing the suction side; a leading edge spanning between the pressure side and the suction side; and a trailing edge opposing the leading edge and spanning between the pressure side and the suction side, the casing including an aperture on the leading edge; and a core within the casing, the core having a serpentine shape for supporting the casing and a leading edge passage fluidly connected with the aperture on the leading edge of the casing.

A first aspect of the invention includes a turbine bucket having: a base; and an airfoil connected with the base at a first end of the airfoil, the airfoil including: a casing having: a suction side; a pressure side opposing the suction side; a leading edge spanning between the pressure side and the suction side; and a trailing edge opposing the leading edge and spanning between the pressure side and the suction side, the casing including an aperture on the leading edge; and a core within the casing, the core having a serpentine shape for supporting the casing and a leading edge passage fluidly connected with the aperture on the leading edge of the casing.

A second aspect of the invention includes a turbine rotor section including: a set of buckets, the set of buckets including at least one bucket having: a base; and an airfoil connected with the base at a first end of the airfoil, the airfoil including: a casing having: a suction side; a pressure side opposing the suction side; a leading edge spanning between the pressure side and the suction side; and a trailing edge opposing the leading edge and spanning between the pressure side and the suction side, the casing including an aperture on the leading edge; and a core within the casing, the core having a serpentine shape for supporting the casing and a leading edge passage fluidly connected with the aperture on the leading edge of the casing.

A third aspect of the invention includes a turbine having: a diaphragm section; and a rotor section at least partially contained within the diaphragm section, the rotor section having a set of buckets including at least one bucket having: a base; and an airfoil connected with the base at a first end of the airfoil, the airfoil including: a casing having: a suction side; a pressure side opposing the suction side; a leading edge spanning between the pressure side and the suction side; and a trailing edge opposing the leading edge and spanning between the pressure side and the suction side, the casing including an aperture on the leading edge; and a core within the casing, the core having a serpentine shape for supporting the casing and a leading edge passage fluidly connected with the aperture on the leading edge of the casing, wherein the at least one bucket has a nominal internal core profile substantially in accordance with Cartesian coordinate values of X, Y and Z set forth in Table I, wherein the Z values are non-dimensional values from 0 to 1 convertible to Z distances in inches by multiplying the Z values by a height of the bucket in inches, and wherein X and Y are non-dimensional values which, when connected by smooth continuing arcs, define internal core profile sections at each distance Z along the bucket, the profile sections at the Z distances being joined smoothly with one another to form said bucket internal core profile.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
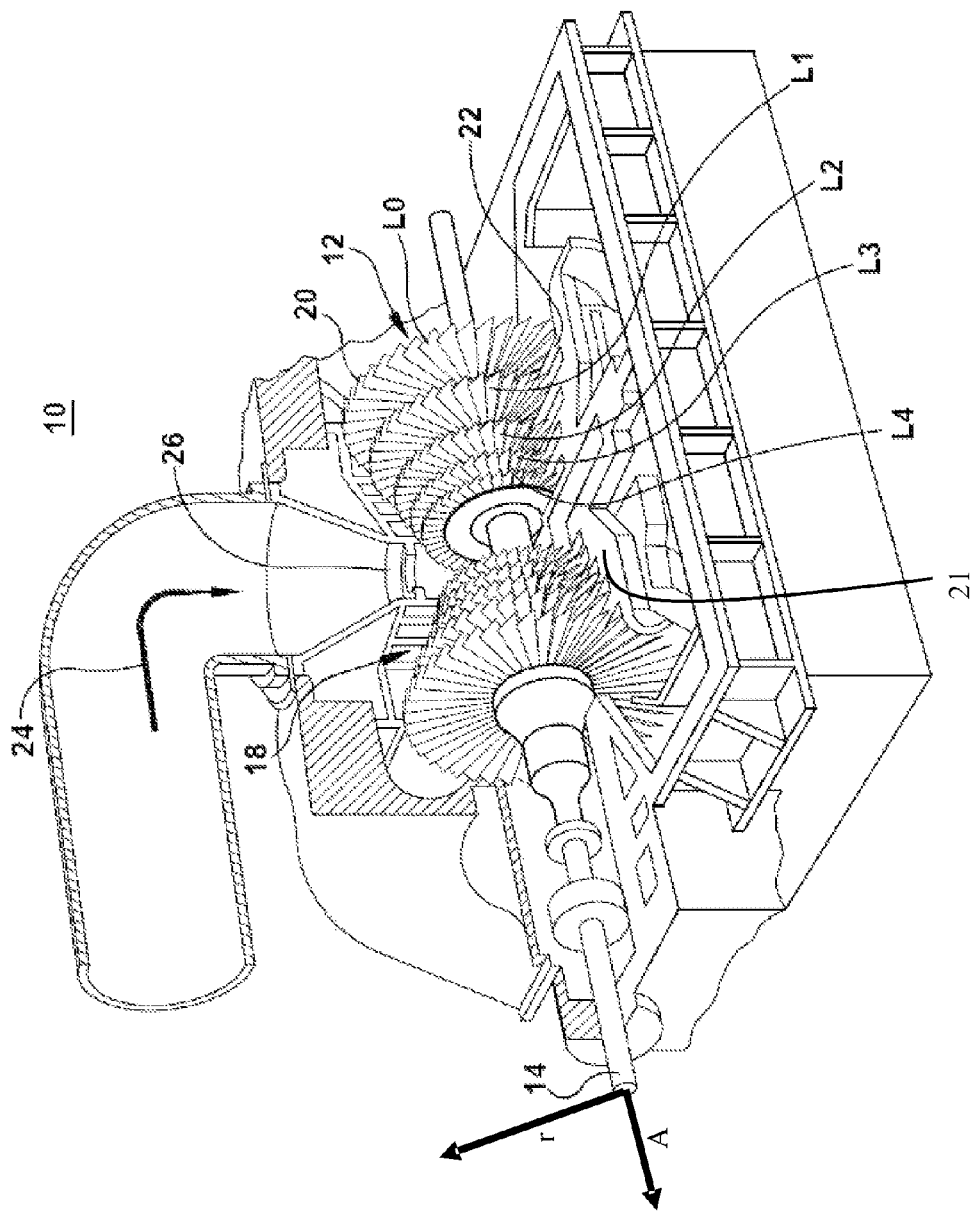
FIG. 1 shows a three-dimensional partial cut-away perspective view of a portion of a turbine according to an embodiment of the invention.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-9, like numbering may represent like elements. Redundant explanation of these elements has been omitted for clarity. Finally, it is understood that the components of FIGS. 1-9 and their accompanying descriptions may be applied to any embodiment described herein.

DETAILED DESCRIPTION OF THE INVENTION

As noted herein, various aspects of the invention are directed toward turbine buckets. Particular aspects of the invention include turbine buckets having a serpentine core structure.

In contrast to conventional turbine buckets, aspects of the invention include a turbine bucket (e.g., a dynamic bucket for driving a turbine shaft) having a serpentine core reinforcement structure within its casing. The bucket can also include a leading edge passage fluidly connected with an aperture on the leading edge of the bucket. The serpentine core reinforcement structure can reinforce the bucket casing and provide enhanced stability when compared with conventional reinforcement structures. Additionally, the leading edge passage can reduce flow-related inefficiencies in a turbine employing the bucket. Further, as described herein, the serpentine core reinforcement structure can provide for enhanced heat transfer within and/or across one or more buckets employing such reinforcement structures.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location. Further, the terms leading edge/pressure side refer to components and/or surfaces which are oriented upstream relative to the fluid flow of the system, and the terms trailing edge/suction side refer to components and/or surfaces which are oriented downstream relative to the fluid flow of the system. The Cartesian coordinate system used to define the shape of the serpentine core structure is defined further herein, and may operate independently from the axial, radial, etc., directional indicators.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Referring to the drawings, FIG. 1 shows a perspective partial cut-away illustration of a turbine 10 (e.g., a gas or steam turbine) according to various embodiments of the invention. Turbine 10 includes a rotor 12 that includes a rotating shaft 14 and a plurality of axially spaced rotor wheels 18. A plurality of rotating buckets 20 (dynamic buckets) are mechanically coupled to each rotor wheel 18. More specifically, buckets 20 are arranged in rows that extend circumferentially around each rotor wheel 18. A diaphragm 21 is shown including a plurality of stationary blades (or, vanes) 22 that circumferentially around shaft 14, and the blades 22 are axially positioned between adjacent rows of buckets 20. Stationary blades 22 cooperate with buckets 20 to form a stage of the turbine 10, and to define a portion of a flow path through turbine 10. As shown, the diaphragm 21 at least partially surrounds the rotor 12 (shown in this cut-away view). It is understood that the turbine 10 shown is a dual-flow turbine 10 that includes an axially centered inlet mouth which feeds two sets of turbine stages. It is understood that various teachings can be applied to axial turbines, e.g., axial inlet gas turbines that inlet a combustion gas from a first axial end and outlet that combustion gas to a second axial end after the gas has performed mechanical work on the turbine.

Returning to FIG. 1, in operation, gas 24 enters an inlet 26 of turbine 10 and is channeled through stationary blades 22. Blades 22 direct gas 24 against buckets 20. Gas 24 passes through the remaining stages imparting a force on buckets 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine. In another embodiment, turbine 10 may comprise an aircraft engine used to produce thrust.

Figure 2:
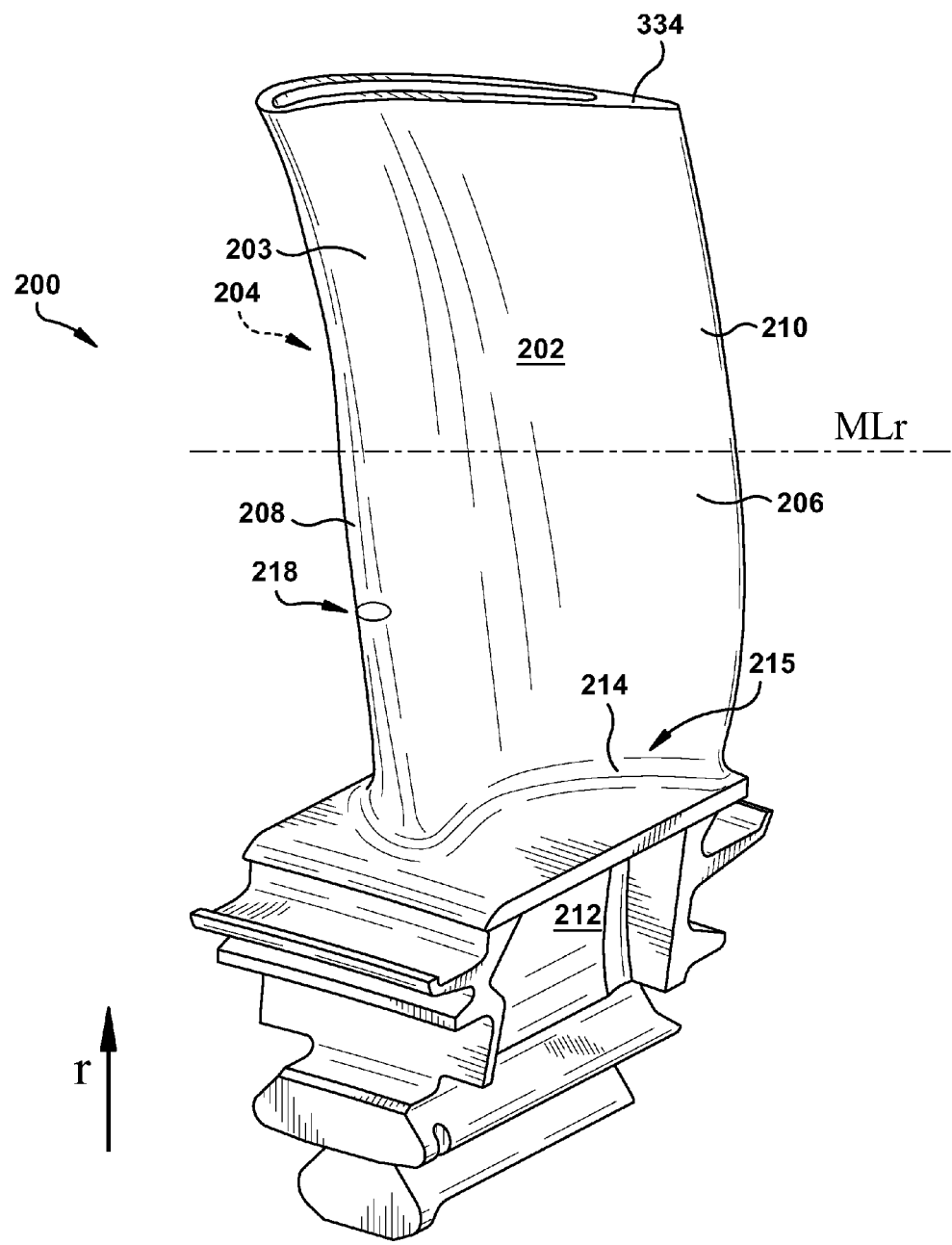
FIG. 2 shows a schematic three-dimensional depiction of a turbine bucket including an airfoil and a base according to various embodiments of the invention.

Turning to FIG. 2, a schematic three-dimensional depiction of a turbine bucket (or simply, bucket) 200 is shown according to various embodiments. The bucket 200 is a rotatable (dynamic) bucket which is part of a set of buckets circumferentially dispersed about a rotor shaft in a stage of a turbine (e.g., turbine 10). It is understood that in various embodiments, the bucket 200 can be implemented in a turbine (e.g., turbine 10, FIG. 1), just as the bucket(s) 20 shown and described with respect to FIG. 1. That is, during operation of a turbine (e.g., turbine 10), the bucket 200 will rotate about the axis A as a working fluid (e.g., gas or steam) is directed across the bucket's airfoil, initiating rotation of a rotor shaft (e.g., shaft 14). It is understood that bucket 200 is configured to couple (mechanically couple via fasteners, welds, slot/grooves, etc.) with a plurality of similar or distinct buckets (e.g., buckets 200 or other buckets) to form a set of buckets in a stage of the turbine.

Returning to FIG. 2, the turbine bucket 200 can include an airfoil 202 having a suction side 204 (obstructed in this view), and a pressure side 206 opposing the suction side 204. The bucket 200 can also include a leading edge 208 spanning between the pressure side 206 and the suction side 204, and a trailing edge 210 opposing the leading edge 208 and spanning between the pressure side 206 and the suction side 204. In this view, only the casing 203 of the airfoil 202 is visible, as its core structure (300, FIG. 3) is obstructed by the casing 203. The core structure (300, FIG. 3) will be described in greater detail herein. It is understood that in various embodiments, the bucket 200 can be a first stage (L4) bucket, exposed to higher temperature and pressure working fluid (e.g., gas or steam) than buckets located in later stages (e.g., L3-L0). As described herein, various aspects of the turbine bucket 200 allow for improved product life and performance in a turbine utilizing such a bucket.

As shown, the bucket 200 can also include a base 212 connected with the airfoil 202. The base 212 can be connected with the airfoil 202 along the suction side 204, pressure side 206, trailing edge 210 and the leading edge 208. In various embodiments, the bucket 200 includes a fillet 214 proximate a first end 215 of the airfoil 202, the fillet 214 connecting the airfoil 202 and the base 212. The fillet 214 can be cast (an as-cast feature) or include a weld or braze fillet, which may be formed via conventional MIG welding, TIG welding, brazing, etc. As is known in the art, the base 212 is designed to fit into a mating slot in the turbine rotor shaft (e.g., shaft 14) and mate with adjacent base components of other buckets 200. The base 212 is designed to be located radially inboard of the airfoil 202. As is known in the art, the base 212 can connect to a wheel of a rotor (e.g., connected with rotor shaft 14) via dovetail or firtree connection, via welding, or any other mechanical or physical connection.

In various embodiments, as described herein, the airfoil 202 can include an aperture 218 along its leading edge 208 for permitting exhaust of cooling fluid from the core of the airfoil 202 to the exterior of the airfoil 202. As described herein, the aperture 218 can be fluidly connected with a passage in the core of the airfoil 202, and together, the aperture 218 and the passage can permit exhaust of the working fluid from the core of the airfoil 202 to the exterior of the airfoil 202. The coolant flow can enter the core (core structure 300, FIG. 3) via the base section 212, and can exit the core via one or more apertures 218. It is understood that in various embodiments, one or more aperture(s) 218 can be located along the leading edge 208, trailing edge 210, or other surfaces of the airfoil 202.

Figure 3:
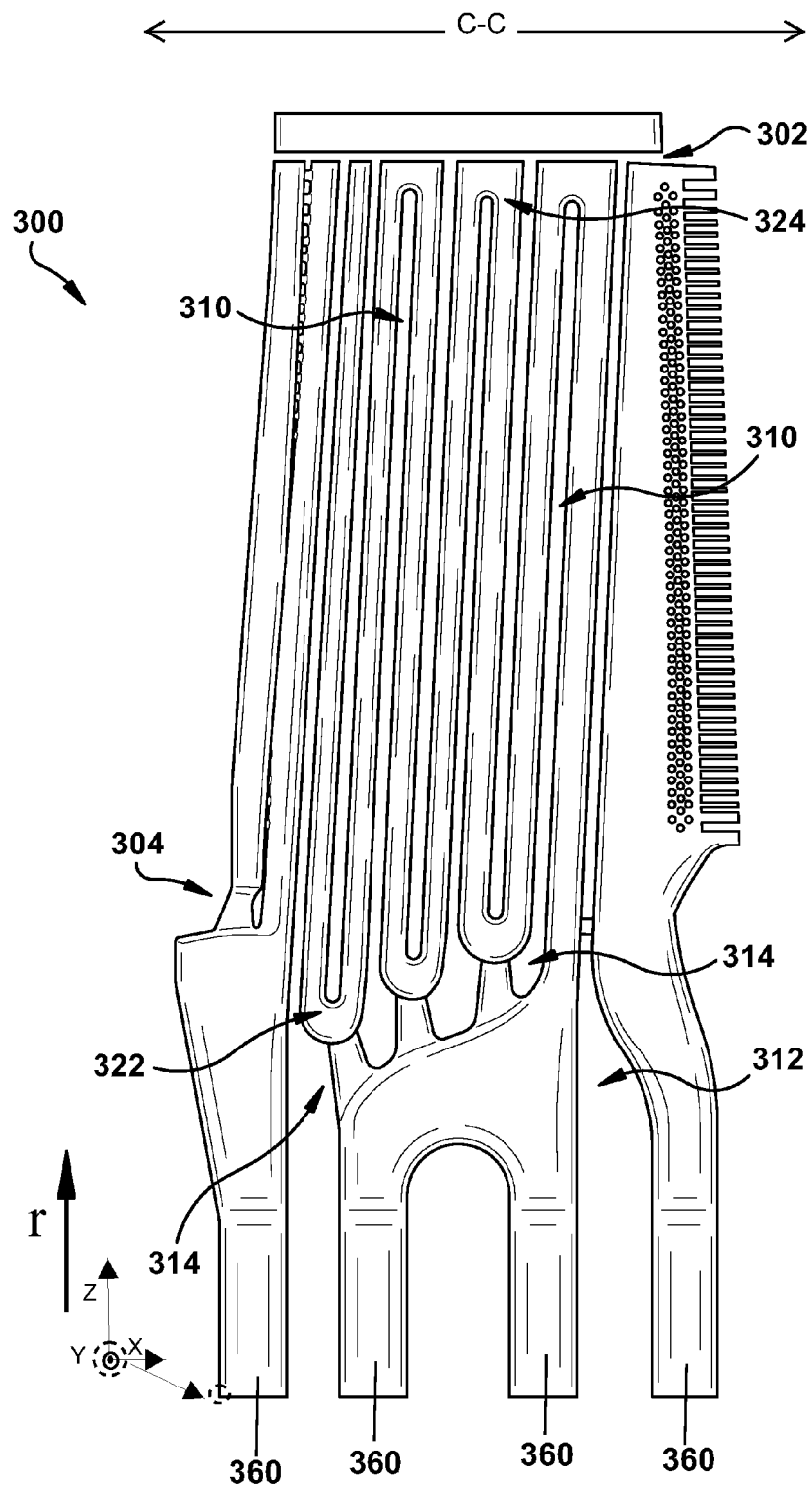
FIG. 3 shows a perspective view of a core of the turbine bucket of FIG. 2 according to various embodiments of the invention.

FIG. 3 shows a schematic three-dimensional depiction of a core structure 300 within the casing 203 of the airfoil 202. The core structure (or simply, core) 300 can have a serpentine shape 302 as further described herein. The core 300 can support the casing 203 of the airfoil 202, and can extend radially from the base 212 (FIG. 2) along the length of the airfoil 202. As described herein, the serpentine shape 302 can mechanically support the casing 203 (FIG. 2), e.g., during utilization of the bucket 200 during operation of a turbine (e.g., a gas or steam turbine, as described herein). Also shown in FIG. 3, the core 300 can include a leading edge passage 304 fluidly connected with the aperture 218 on the leading edge 208 of the airfoil casing 203. The leading edge passage 304 can be fluidly connected with the aperture 218 on the leading edge 208 such that a coolant fluid, e.g., a cooling liquid, exhaust through the aperture 218 to an exterior of the airfoil 202.

Figure 4:
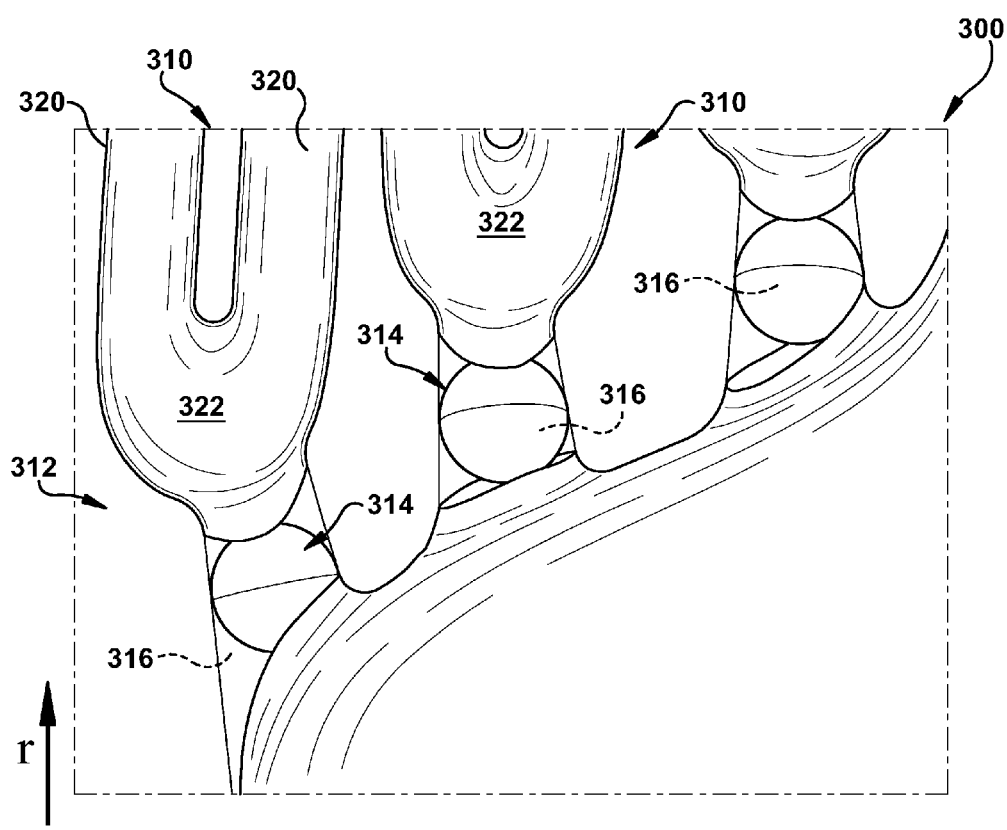
FIG. 4 shows a close-up perspective view of a base portion of the core of FIG. 3.
Figure 5:
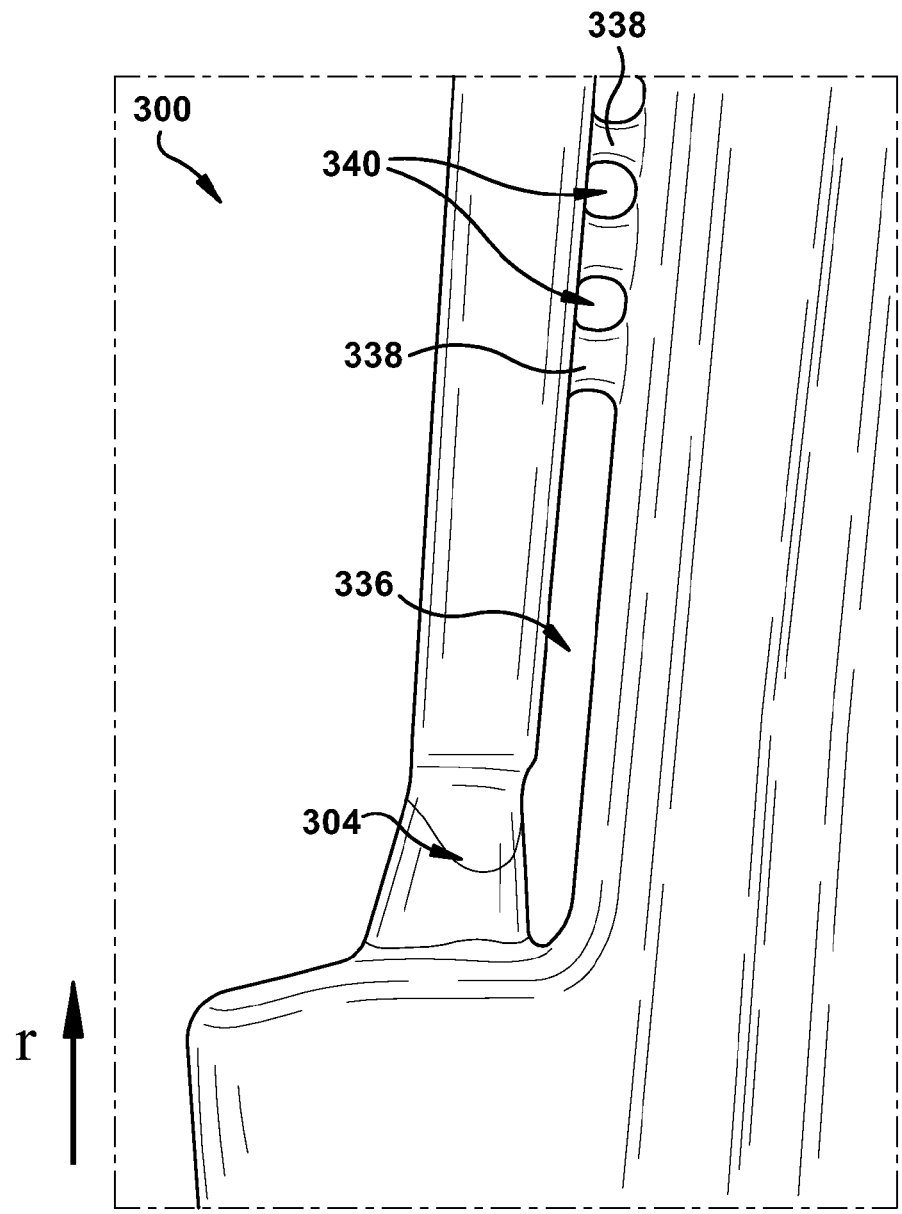
FIG. 5 shows a close-up perspective view of a metered inlet portion of the core of FIG. 3.

In FIG. 3, as well as in FIGS. 4 and 5, a body shown can be an outline of cavities formed within airfoil 202 such that what appear to be outer surfaces of core 300 or portions thereof can actually be walls of the cavities the body represents or boundaries between the cavities and the solid material of bucket 200 and/or airfoil 202. To aid conceptually, one can instead construe the representation of core 300 or a portion thereof as a form to be included in casting bucket 200 and/or airfoil 202 and later removed to leave the cavity(ies) that form core 300. It should be noted that casting is only one of many ways in which bucket 200, airfoil 202, and/or core 300 can be made and/or formed. An alternative conceptualization of core 300 can include its formation with thin sheets of metal defining its inner and outer boundaries.

In various embodiments, the serpentine shaped core 302 includes a set of contiguous reinforcement members 310 extending substantially radially within the casing (203). As described herein, the set of contiguous reinforcement members 310 can be formed of one or more substantially unitary pieces of material, e.g., a metal such as steel, aluminum and/or alloys of those metals. In various embodiments, the set of contiguous reinforcement members 310 are formed as a substantially unitary structure, and can be integrally formed, e.g., via integral casting and/or forging. In some alternative embodiments, the contiguous reinforcement members 310 can be formed from separate reinforcement members that are bonded together to substantially eliminate seams or discontinuities between these separate members. In some particular cases, these separate members are welded and/or brazed together. In other embodiments, as is known in the art, a form can be made from a sacrificial material that can be placed in a mold for bucket 200 and/or airfoil 202 during casting of bucket 200 and/or airfoil 202. Such a sacrificial material can be selected to withstand the conditions associated with casting, but can later be removed to leave the cavities that form core 300 in the otherwise substantially solid bucket 200 and/or airfoil 202.

The serpentine shaped core 302 can also include a set of support member chutes (or slots) 314 proximate one end 312 (a radially inner end) of the set of contiguous reinforcement member 310. The set of support member chutes 314 can be sized to hold a support member (FIG. 4). FIG. 4 shows a close-up view of the radially inner end 312 of several reinforcement members coupled with support member chutes 314. As shown in the semi-transparent depiction of the support member chutes 314, a support member 316 can be housed within each support member chute 314 (radially inboard of the contiguous reinforcement members 310). In various embodiments, each support member 316 can include a brazed or welded support ball or similar geometry, e.g., a substantially rounded braze or weld element formed of a metal such as silver, gold, palladium, copper, zinc, cobalt, nickel and/or alloys of one or more of these metals. As described further herein, at least one support member 316 can include a metering feature (e.g., metering features 338, shown and described with reference to FIG. 5).

Returning to FIG. 3 (with continuing reference to FIG. 4), the set of contiguous reinforcement members 310 can include a plurality of reinforcement fingers 320, a set of radially inner turns 322 between adjacent reinforcement fingers 320, and a set of radially outer turns 324 between adjacent reinforcement fingers 320. It is understood that due to the serpentine nature of the reinforcement members 310, in some cases, no radially inner turn 322 will join the same reinforcement fingers 320 as a radially outer turn 324. That is, each reinforcement finger 320 will be coupled with a single radially inner turn 322 and a single radially outer turn 324.

Figure 6:
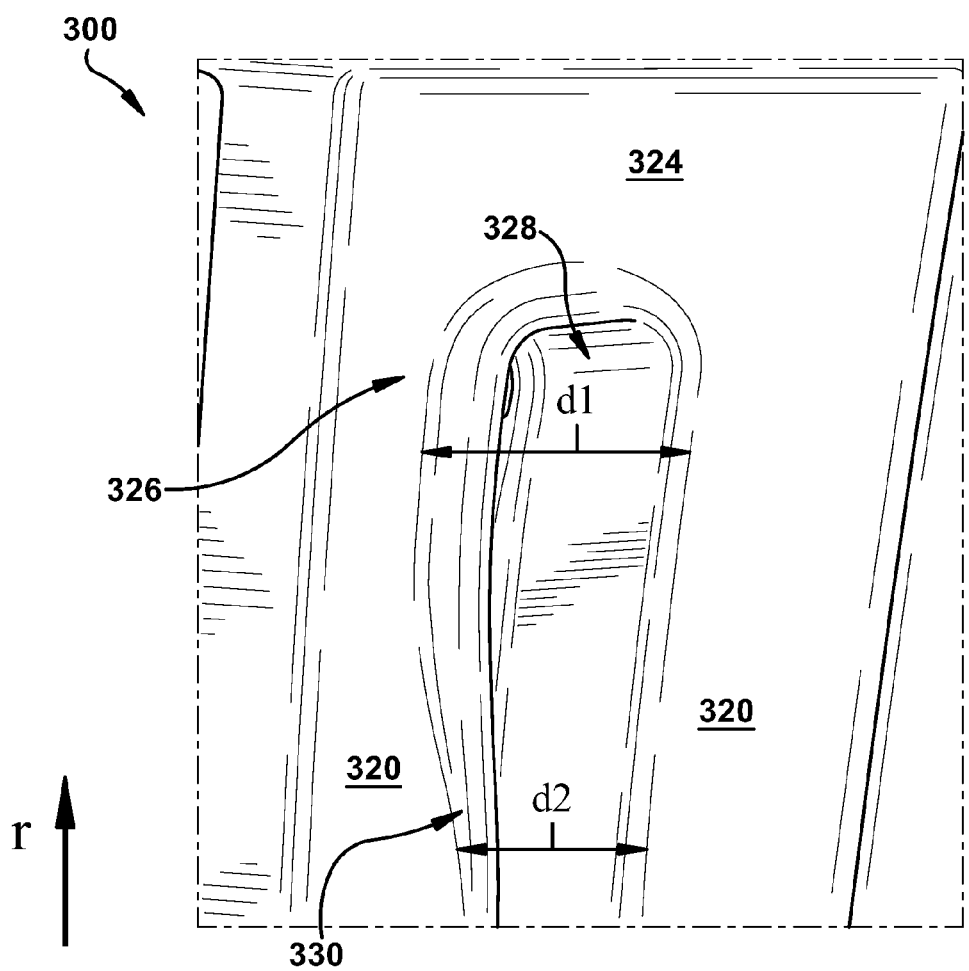
FIG. 6 shows a close-up perspective view of a non-asynchronous turn portion of the core of FIG. 3.

In any case, as shown with respect to FIG. 3 and FIG. 6, in some cases, at least one of the radially outer turns 324 in the set of radially outer turns 324 can include a non-asymmetric arc feature 326 such that the adjacent reinforcement fingers 320 are separated by a first distance (d1) at a radially outermost portion 328 of the turn (outer turn 324) and are separated by a second distance, less than the first distance, at a radially inner portion 330 of the turn (the same outer turn 324). This non-asymmetric arc feature 326 can provide additional mechanical strength when compared to conventional bucket core support structures. It is further understood that according to various embodiments, at least one radially inner turn 322 can include a non-asymmetric arc feature 326 as described herein with reference to the radially outer turn(s) 324.

FIG. 5 shows a close-up perspective view of a section of the core structure 300 including the leading edge passage 304. With continuing reference to FIG. 3, in various embodiments, the aperture 218 on the leading edge 208 and the leading edge passage 304 are located closer to the base 212 than a radial tip 334 of the airfoil 202. As described herein, the base 212 is radially inboard of the airfoil 202, and in some cases the leading edge passage 304 and the aperture 218 are radially inboard of a radial mid-line (MLr) of the airfoil 202.

As shown in FIG. 5, the core 300 can also include an at least partially radially extending passage 336 fluidly connected with the aperture 218 on the leading edge 208 and the leading edge passage 304. That is, the cooling fluid entering the core 300 via the radially inner end 312 (proximate the base 212) can flow through the radially extending passage 336 and the leading edge passage 304 to exhaust through the aperture 218 on the leading edge 208. The at least partially radially extending passage 336 can also include a set of metering features 338 for modulating an amount of cooling fluid exiting the aperture 218 on the leading edge 208 (and a flow rate of the cooling fluid through the leading edge passage 304). These metering features 338 can include protrusions, apertures, slots, etc. for interrupting flow of the cooling fluid through the at least partially radially extending passage 336. In some cases, these metering features 338 can include one or more filleted or tapered pillars extending across the at least partially radially extending passage 336. In various embodiments, these metering features 338 extend at least partially axially across the at least partially radially extending passage 336. In various embodiments, spaces 340 are dispersed radially between adjacent metering features 338 along the at least partially radially extending passage 336.

As described herein, the bucket 200 further allows for increased firing temperatures in a turbine employing the bucket 200, e.g., in a gas turbine. The bucket 200 can also allow for metering of fluid flow through its core 300.

The bucket internal core profile is defined by a unique loci of points which can achieve the necessary structural and cooling requirements whereby improved turbine performance is obtained. This unique loci of points define the internal nominal core profile and are identified by the X, Y and Z Cartesian coordinates of Table I which follows. The 3700 points for the coordinate values shown in Table I are for a cold, i.e., room temperature bucket at various cross-sections of the bucket along its length. The positive X, Y and Z directions are axial toward the exhaust end of the turbine, tangential in the direction of engine rotation looking aft and radially outwardly toward the bucket tip, respectively. The X and Y coordinates are given in distance dimensions, e.g., units of inches, and are joined smoothly at each Z location to form a smooth continuous internal core profile cross-section. The Z coordinates are given in non-dimensionalized form from 0 to 1. By multiplying the airfoil height dimension, e.g., in inches, by the non-dimensional Z value of Table I, the internal core profile, of the bucket is obtained. Each defined internal core profile section in the X, Y plane is joined smoothly with adjacent profile sections in the Z direction to form the complete internal bucket core profile.

The Table I values are generated and shown to five decimal places for determining the internal core profile of the bucket. There are typical manufacturing tolerances as well as coatings which should be accounted for in the actual internal profile of the bucket. Accordingly, the values for the profile given in Table 1 are for a nominal internal bucket core profile. It will therefore be appreciated that +/−typical manufacturing tolerances, i.e., +/−values, including any coating thicknesses, are additive to the X and Y values given in Table I below. Accordingly, a manufacturing tolerance of plus or minus 0.005 (non-dimensional) in a direction normal to any surface location along the internal core profile defines an internal core profile envelope for this particular bucket design and turbine, i.e., a range of variation between measured points on the actual internal core profile at nominal cold or room temperature and the ideal position of those points as given in Table I below at the same temperature. The internal core profile is robust to this range of variation without impairment of mechanical and cooling functions.

With the origin at a bottom of a most forward or upstream or leading edge inlet 360 as indicated in FIG. 3, the X axis can extend along a chord of airfoil 202 and/or of core 300 and/or substantially parallel to line C-C, and such that the Y axis can lie orthogonal to the X axis oriented into FIG. 3 substantially in a circumferential direction, and the Z axis can then extend substantially radially away from the intersection of the X and Y axes. Any other suitable orientation of the axes relative to airfoil 202 can be used so long as such orientation is taken into account in the resulting coordinate values. In embodiments, the coordinate system that defines the profile can be based on its own geometry and thus can be used to produce an airfoil with the described profile regardless of its location.

The coordinate values given in Table I below provide the preferred nominal internal core profile envelope.

TABLE I

| Non-Dimensionalized [X Y Z/Span Height] | | | |
|---|---|---|---|
| N | X | Y | Z |
| 1 | 0.00000 | 0.00000 | 0.00000 |
| 2 | 0.00004 | −0.00857 | 0.00000 |
| 3 | 0.00077 | 0.00857 | 0.00000 |
| 4 | 0.00081 | −0.01714 | 0.00000 |
| 5 | 0.00147 | 0.01713 | 0.00000 |
| 6 | 0.00156 | −0.02570 | 0.00000 |
| 7 | 0.00352 | 0.02544 | 0.00000 |
| 8 | 0.00369 | −0.03398 | 0.00000 |
| 9 | 0.00836 | 0.03246 | 0.00000 |
| 10 | 0.00872 | −0.04088 | 0.00000 |
| 11 | 0.01553 | 0.03706 | 0.00000 |
| 12 | 0.01599 | −0.04533 | 0.00000 |
| 13 | 0.02392 | 0.03876 | 0.00000 |
| 14 | 0.02441 | −0.04687 | 0.00000 |
| 15 | 0.03251 | 0.03874 | 0.00000 |
| 16 | 0.03300 | −0.04683 | 0.00000 |
| 17 | 0.04111 | 0.03874 | 0.00000 |
| 18 | 0.04159 | −0.04683 | 0.00000 |
| 19 | 0.04970 | 0.03874 | 0.00000 |
| 20 | 0.05020 | −0.04683 | 0.00000 |
| 21 | 0.05830 | 0.03874 | 0.00000 |
| 22 | 0.05879 | −0.04683 | 0.00000 |
| 23 | 0.06690 | 0.03874 | 0.00000 |
| 24 | 0.06738 | −0.04683 | 0.00000 |
| 25 | 0.07549 | 0.03874 | 0.00000 |
| 26 | 0.07598 | −0.04683 | 0.00000 |
| 27 | 0.08408 | 0.03874 | 0.00000 |
| 28 | 0.08458 | −0.04683 | 0.00000 |
| 29 | 0.09268 | 0.03874 | 0.00000 |
| 30 | 0.09317 | −0.04683 | 0.00000 |
| 31 | 0.10128 | 0.03874 | 0.00000 |
| 32 | 0.10177 | −0.04683 | 0.00000 |
| 33 | 0.10987 | 0.03874 | 0.00000 |
| 34 | 0.11036 | −0.04683 | 0.00000 |
| 35 | 0.11847 | 0.03874 | 0.00000 |

TABLE I-continued

Non-Dimensionalized [X Y Z/Span Height]

| N | X | Y | Z |
|---|---|---|---|
| 36 | 0.11895 | −0.04683 | 0.00000 |
| 37 | 0.12706 | 0.03874 | 0.00000 |
| 38 | 0.12756 | −0.04683 | 0.00000 |
| 39 | 0.13566 | 0.03874 | 0.00000 |
| 40 | 0.13615 | −0.04683 | 0.00000 |
| 41 | 0.14426 | 0.03874 | 0.00000 |
| 42 | 0.14474 | −0.04683 | 0.00000 |
| 43 | 0.15285 | 0.03874 | 0.00000 |
| 44 | 0.15334 | −0.04683 | 0.00000 |
| 45 | 0.16144 | 0.03874 | 0.00000 |
| 46 | 0.16194 | −0.04683 | 0.00000 |
| 47 | 0.17005 | 0.03874 | 0.00000 |
| 48 | 0.17053 | −0.04683 | 0.00000 |
| 49 | 0.17864 | 0.03874 | 0.00000 |
| 50 | 0.17913 | −0.04683 | 0.00000 |
| 51 | 0.18723 | 0.03874 | 0.00000 |
| 52 | 0.18772 | −0.04683 | 0.00000 |
| 53 | 0.19583 | 0.03874 | 0.00000 |
| 54 | 0.19632 | −0.04683 | 0.00000 |
| 55 | 0.20443 | 0.03874 | 0.00000 |
| 56 | 0.20492 | −0.04683 | 0.00000 |
| 57 | 0.21302 | 0.03874 | 0.00000 |
| 58 | 0.21351 | −0.04683 | 0.00000 |
| 59 | 0.22162 | 0.03874 | 0.00000 |
| 60 | 0.22211 | −0.04683 | 0.00000 |
| 61 | 0.23021 | 0.03874 | 0.00000 |
| 62 | 0.23070 | −0.04683 | 0.00000 |
| 63 | 0.23880 | 0.03874 | 0.00000 |
| 64 | 0.23930 | −0.04683 | 0.00000 |
| 65 | 0.24741 | 0.03874 | 0.00000 |
| 66 | 0.24790 | −0.04683 | 0.00000 |
| 67 | 0.25600 | 0.03874 | 0.00000 |
| 68 | 0.25649 | −0.04683 | 0.00000 |
| 69 | 0.26460 | 0.03874 | 0.00000 |
| 70 | 0.26508 | −0.04683 | 0.00000 |
| 71 | 0.27319 | 0.03874 | 0.00000 |
| 72 | 0.27369 | −0.04683 | 0.00000 |
| 73 | 0.28179 | 0.03874 | 0.00000 |
| 74 | 0.28228 | −0.04683 | 0.00000 |
| 75 | 0.29039 | 0.03874 | 0.00000 |
| 76 | 0.29087 | −0.04683 | 0.00000 |
| 77 | 0.29898 | 0.03874 | 0.00000 |
| 78 | 0.29947 | −0.04683 | 0.00000 |
| 79 | 0.30757 | 0.03874 | 0.00000 |
| 80 | 0.30807 | −0.04683 | 0.00000 |
| 81 | 0.31617 | 0.03874 | 0.00000 |
| 82 | 0.31666 | −0.04683 | 0.00000 |
| 83 | 0.32477 | 0.03874 | 0.00000 |
| 84 | 0.32526 | −0.04683 | 0.00000 |
| 85 | 0.33336 | 0.03874 | 0.00000 |
| 86 | 0.33385 | −0.04683 | 0.00000 |
| 87 | 0.34196 | 0.03875 | 0.00000 |
| 88 | 0.34245 | −0.04683 | 0.00000 |
| 89 | 0.35038 | 0.03725 | 0.00000 |
| 90 | 0.35083 | −0.04518 | 0.00000 |
| 91 | 0.35764 | 0.03279 | 0.00000 |
| 92 | 0.35800 | −0.04055 | 0.00000 |
| 93 | 0.36267 | 0.02589 | 0.00000 |
| 94 | 0.36284 | −0.03353 | 0.00000 |
| 95 | 0.36481 | 0.01761 | 0.00000 |
| 96 | 0.36489 | −0.02522 | 0.00000 |
| 97 | 0.36556 | 0.00905 | 0.00000 |
| 98 | 0.36559 | −0.01665 | 0.00000 |
| 99 | 0.36632 | 0.00048 | 0.00000 |
| 100 | 0.36636 | −0.00809 | 0.00000 |
| 1 | −0.00021 | −0.00508 | 0.02777 |
| 2 | 0.00030 | 0.00325 | 0.02777 |
| 3 | 0.00047 | −0.01340 | 0.02777 |
| 4 | 0.00111 | 0.01156 | 0.02777 |
| 5 | 0.00154 | −0.02167 | 0.02777 |
| 6 | 0.00365 | 0.01948 | 0.02777 |
| 7 | 0.00465 | −0.02938 | 0.02777 |
| 8 | 0.00855 | 0.02619 | 0.02777 |
| 9 | 0.01009 | −0.03565 | 0.02777 |
| 10 | 0.01543 | 0.03082 | 0.02777 |
| 11 | 0.01737 | −0.03962 | 0.02777 |

TABLE I-continued

Non-Dimensionalized [X Y Z/Span Height]

| N | X | Y | Z |
|---|---|---|---|
| 12 | 0.02353 | 0.03254 | 0.02777 |
| 13 | 0.02560 | −0.04066 | 0.02777 |
| 14 | 0.03188 | 0.03254 | 0.02777 |
| 15 | 0.03395 | −0.04063 | 0.02777 |
| 16 | 0.04023 | 0.03254 | 0.02777 |
| 17 | 0.04230 | −0.04063 | 0.02777 |
| 18 | 0.04858 | 0.03254 | 0.02777 |
| 19 | 0.05064 | −0.04063 | 0.02777 |
| 20 | 0.05693 | 0.03254 | 0.02777 |
| 21 | 0.05899 | −0.04063 | 0.02777 |
| 22 | 0.06528 | 0.03254 | 0.02777 |
| 23 | 0.06735 | −0.04063 | 0.02777 |
| 24 | 0.07362 | 0.03254 | 0.02777 |
| 25 | 0.07569 | −0.04063 | 0.02777 |
| 26 | 0.08197 | 0.03254 | 0.02777 |
| 27 | 0.08404 | −0.04063 | 0.02777 |
| 28 | 0.09032 | 0.03254 | 0.02777 |
| 29 | 0.09239 | −0.04063 | 0.02777 |
| 30 | 0.09866 | 0.03254 | 0.02777 |
| 31 | 0.10073 | −0.04063 | 0.02777 |
| 32 | 0.10701 | 0.03254 | 0.02777 |
| 33 | 0.10908 | −0.04063 | 0.02777 |
| 34 | 0.11537 | 0.03254 | 0.02777 |
| 35 | 0.11743 | −0.04063 | 0.02777 |
| 36 | 0.12371 | 0.03254 | 0.02777 |
| 37 | 0.12578 | −0.04063 | 0.02777 |
| 38 | 0.13206 | 0.03254 | 0.02777 |
| 39 | 0.13413 | −0.04063 | 0.02777 |
| 40 | 0.14041 | 0.03254 | 0.02777 |
| 41 | 0.14248 | −0.04063 | 0.02777 |
| 42 | 0.14875 | 0.03254 | 0.02777 |
| 43 | 0.15082 | −0.04063 | 0.02777 |
| 44 | 0.15710 | 0.03254 | 0.02777 |
| 45 | 0.15917 | −0.04063 | 0.02777 |
| 46 | 0.16545 | 0.03254 | 0.02777 |
| 47 | 0.16752 | −0.04063 | 0.02777 |
| 48 | 0.17380 | 0.03254 | 0.02777 |
| 49 | 0.17586 | −0.04063 | 0.02777 |
| 50 | 0.18215 | 0.03254 | 0.02777 |
| 51 | 0.18421 | −0.04063 | 0.02777 |
| 52 | 0.19050 | 0.03254 | 0.02777 |
| 53 | 0.19257 | −0.04063 | 0.02777 |
| 54 | 0.19884 | 0.03254 | 0.02777 |
| 55 | 0.20091 | −0.04063 | 0.02777 |
| 56 | 0.20719 | 0.03254 | 0.02777 |
| 57 | 0.20926 | −0.04063 | 0.02777 |
| 58 | 0.21554 | 0.03254 | 0.02777 |
| 59 | 0.21761 | −0.04063 | 0.02777 |
| 60 | 0.22388 | 0.03254 | 0.02777 |
| 61 | 0.22595 | −0.04063 | 0.02777 |
| 62 | 0.23224 | 0.03254 | 0.02777 |
| 63 | 0.23430 | −0.04063 | 0.02777 |
| 64 | 0.24059 | 0.03254 | 0.02777 |
| 65 | 0.24265 | −0.04063 | 0.02777 |
| 66 | 0.24893 | 0.03254 | 0.02777 |
| 67 | 0.25100 | −0.04063 | 0.02777 |
| 68 | 0.25728 | 0.03254 | 0.02777 |
| 69 | 0.25935 | −0.04063 | 0.02777 |
| 70 | 0.26563 | 0.03254 | 0.02777 |
| 71 | 0.26770 | −0.04063 | 0.02777 |
| 72 | 0.27397 | 0.03254 | 0.02777 |
| 73 | 0.27604 | −0.04063 | 0.02777 |
| 74 | 0.28232 | 0.03254 | 0.02777 |
| 75 | 0.28439 | −0.04063 | 0.02777 |
| 76 | 0.29067 | 0.03254 | 0.02777 |
| 77 | 0.29274 | −0.04063 | 0.02777 |
| 78 | 0.29902 | 0.03254 | 0.02777 |
| 79 | 0.30108 | −0.04063 | 0.02777 |
| 80 | 0.30737 | 0.03254 | 0.02777 |
| 81 | 0.30943 | −0.04063 | 0.02777 |
| 82 | 0.31572 | 0.03254 | 0.02777 |
| 83 | 0.31779 | −0.04063 | 0.02777 |
| 84 | 0.32406 | 0.03254 | 0.02777 |
| 85 | 0.32613 | −0.04063 | 0.02777 |
| 86 | 0.33241 | 0.03254 | 0.02777 |
| 87 | 0.33448 | −0.04063 | 0.02777 |

TABLE I-continued

Non-Dimensionalized [X Y Z/Span Height]

| N | X | Y | Z |
|---|---|---|---|
| 88 | 0.34076 | 0.03254 | 0.02777 |
| 89 | 0.34283 | −0.04063 | 0.02777 |
| 90 | 0.34900 | 0.03153 | 0.02777 |
| 91 | 0.35093 | −0.03891 | 0.02777 |
| 92 | 0.35627 | 0.02756 | 0.02777 |
| 93 | 0.35781 | −0.03428 | 0.02777 |
| 94 | 0.36172 | 0.02128 | 0.02777 |
| 95 | 0.36271 | −0.02757 | 0.02777 |
| 96 | 0.36485 | 0.01358 | 0.02777 |
| 97 | 0.36525 | −0.01965 | 0.02777 |
| 98 | 0.36590 | 0.00530 | 0.02777 |
| 99 | 0.36606 | −0.01134 | 0.02777 |
| 100 | 0.36659 | −0.00302 | 0.02777 |
| 1 | −0.00020 | −0.00524 | 0.05556 |
| 2 | 0.00032 | 0.00270 | 0.05556 |
| 3 | 0.00084 | −0.01313 | 0.05556 |
| 4 | 0.00290 | 0.01021 | 0.05556 |
| 5 | 0.00415 | −0.02034 | 0.05556 |
| 6 | 0.00786 | 0.01640 | 0.05556 |
| 7 | 0.00974 | −0.02595 | 0.05556 |
| 8 | 0.01468 | 0.02042 | 0.05556 |
| 9 | 0.01695 | −0.02922 | 0.05556 |
| 10 | 0.02248 | 0.02191 | 0.05556 |
| 11 | 0.02487 | −0.03005 | 0.05556 |
| 12 | 0.03045 | 0.02190 | 0.05556 |
| 13 | 0.03284 | −0.02999 | 0.05556 |
| 14 | 0.03843 | 0.02189 | 0.05556 |
| 15 | 0.04082 | −0.02999 | 0.05556 |
| 16 | 0.04640 | 0.02189 | 0.05556 |
| 17 | 0.04879 | −0.02999 | 0.05556 |
| 18 | 0.05438 | 0.02189 | 0.05556 |
| 19 | 0.05677 | −0.02999 | 0.05556 |
| 20 | 0.06235 | 0.02189 | 0.05556 |
| 21 | 0.06474 | −0.02999 | 0.05556 |
| 22 | 0.07033 | 0.02189 | 0.05556 |
| 23 | 0.07272 | −0.02999 | 0.05556 |
| 24 | 0.07830 | 0.02189 | 0.05556 |
| 25 | 0.08069 | −0.02999 | 0.05556 |
| 26 | 0.08628 | 0.02189 | 0.05556 |
| 27 | 0.08867 | −0.02999 | 0.05556 |
| 28 | 0.09425 | 0.02189 | 0.05556 |
| 29 | 0.09664 | −0.02999 | 0.05556 |
| 30 | 0.10223 | 0.02189 | 0.05556 |
| 31 | 0.10462 | −0.02999 | 0.05556 |
| 32 | 0.11021 | 0.02189 | 0.05556 |
| 33 | 0.11260 | −0.02999 | 0.05556 |
| 34 | 0.11819 | 0.02189 | 0.05556 |
| 35 | 0.12057 | −0.02999 | 0.05556 |
| 36 | 0.12616 | 0.02189 | 0.05556 |
| 37 | 0.12855 | −0.02999 | 0.05556 |
| 38 | 0.13414 | 0.02189 | 0.05556 |
| 39 | 0.13653 | −0.02999 | 0.05556 |
| 40 | 0.14211 | 0.02189 | 0.05556 |
| 41 | 0.14450 | −0.02999 | 0.05556 |
| 42 | 0.15009 | 0.02189 | 0.05556 |
| 43 | 0.15248 | −0.02999 | 0.05556 |
| 44 | 0.15806 | 0.02189 | 0.05556 |
| 45 | 0.16045 | −0.02999 | 0.05556 |
| 46 | 0.16604 | 0.02189 | 0.05556 |
| 47 | 0.16843 | −0.02999 | 0.05556 |
| 48 | 0.17401 | 0.02189 | 0.05556 |
| 49 | 0.17640 | −0.02999 | 0.05556 |
| 50 | 0.18199 | 0.02189 | 0.05556 |
| 51 | 0.18438 | −0.02999 | 0.05556 |
| 52 | 0.18996 | 0.02189 | 0.05556 |
| 53 | 0.19235 | −0.02999 | 0.05556 |
| 54 | 0.19794 | 0.02189 | 0.05556 |
| 55 | 0.20033 | −0.02999 | 0.05556 |
| 56 | 0.20591 | 0.02189 | 0.05556 |
| 57 | 0.20830 | −0.02999 | 0.05556 |
| 58 | 0.21389 | 0.02189 | 0.05556 |
| 59 | 0.21628 | −0.02999 | 0.05556 |
| 60 | 0.22186 | 0.02189 | 0.05556 |
| 61 | 0.22425 | −0.02999 | 0.05556 |
| 62 | 0.22984 | 0.02189 | 0.05556 |
| 63 | 0.23224 | −0.02999 | 0.05556 |
| 64 | 0.23782 | 0.02189 | 0.05556 |
| 65 | 0.24021 | −0.02999 | 0.05556 |
| 66 | 0.24580 | 0.02189 | 0.05556 |
| 67 | 0.24819 | −0.02999 | 0.05556 |
| 68 | 0.25377 | 0.02189 | 0.05556 |
| 69 | 0.25616 | −0.02999 | 0.05556 |
| 70 | 0.26175 | 0.02189 | 0.05556 |
| 71 | 0.26414 | −0.02999 | 0.05556 |
| 72 | 0.26972 | 0.02189 | 0.05556 |
| 73 | 0.27211 | −0.02999 | 0.05556 |
| 74 | 0.27770 | 0.02189 | 0.05556 |
| 75 | 0.28009 | −0.02999 | 0.05556 |
| 76 | 0.28567 | 0.02189 | 0.05556 |
| 77 | 0.28806 | −0.02999 | 0.05556 |
| 78 | 0.29365 | 0.02189 | 0.05556 |
| 79 | 0.29604 | −0.02999 | 0.05556 |
| 80 | 0.30162 | 0.02189 | 0.05556 |
| 81 | 0.30401 | −0.02999 | 0.05556 |
| 82 | 0.30960 | 0.02189 | 0.05556 |
| 83 | 0.31199 | −0.02999 | 0.05556 |
| 84 | 0.31757 | 0.02189 | 0.05556 |
| 85 | 0.31996 | −0.02999 | 0.05556 |
| 86 | 0.32555 | 0.02189 | 0.05556 |
| 87 | 0.32794 | −0.02999 | 0.05556 |
| 88 | 0.33352 | 0.02189 | 0.05556 |
| 89 | 0.33591 | −0.02999 | 0.05556 |
| 90 | 0.34150 | 0.02190 | 0.05556 |
| 91 | 0.34389 | −0.02999 | 0.05556 |
| 92 | 0.34941 | 0.02118 | 0.05556 |
| 93 | 0.35169 | −0.02854 | 0.05556 |
| 94 | 0.35662 | 0.01786 | 0.05556 |
| 95 | 0.35850 | −0.02449 | 0.05556 |
| 96 | 0.36222 | 0.01224 | 0.05556 |
| 97 | 0.36346 | −0.01830 | 0.05556 |
| 98 | 0.36556 | 0.00504 | 0.05556 |
| 99 | 0.36603 | −0.01079 | 0.05556 |
| 100 | 0.36659 | −0.00286 | 0.05556 |
| 1 | −0.00021 | −0.00516 | 0.08333 |
| 2 | 0.00033 | 0.00278 | 0.08333 |
| 3 | 0.00080 | −0.01307 | 0.08333 |
| 4 | 0.00288 | 0.01029 | 0.08333 |
| 5 | 0.00406 | −0.02030 | 0.08333 |
| 6 | 0.00787 | 0.01646 | 0.08333 |
| 7 | 0.00964 | −0.02594 | 0.08333 |
| 8 | 0.01469 | 0.02054 | 0.08333 |
| 9 | 0.01682 | −0.02931 | 0.08333 |
| 10 | 0.02248 | 0.02200 | 0.08333 |
| 11 | 0.02473 | −0.03010 | 0.08333 |
| 12 | 0.03046 | 0.02199 | 0.08333 |
| 13 | 0.03271 | −0.03008 | 0.08333 |
| 14 | 0.03844 | 0.02198 | 0.08333 |
| 15 | 0.04069 | −0.03008 | 0.08333 |
| 16 | 0.04642 | 0.02198 | 0.08333 |
| 17 | 0.04867 | −0.03008 | 0.08333 |
| 18 | 0.05440 | 0.02198 | 0.08333 |
| 19 | 0.05664 | −0.03008 | 0.08333 |
| 20 | 0.06238 | 0.02198 | 0.08333 |
| 21 | 0.06462 | −0.03008 | 0.08333 |
| 22 | 0.07036 | 0.02198 | 0.08333 |
| 23 | 0.07260 | −0.03008 | 0.08333 |
| 24 | 0.07834 | 0.02198 | 0.08333 |
| 25 | 0.08058 | −0.03008 | 0.08333 |
| 26 | 0.08631 | 0.02198 | 0.08333 |
| 27 | 0.08856 | −0.03008 | 0.08333 |
| 28 | 0.09430 | 0.02198 | 0.08333 |
| 29 | 0.09654 | −0.03008 | 0.08333 |
| 30 | 0.10227 | 0.02198 | 0.08333 |
| 31 | 0.10452 | −0.03008 | 0.08333 |
| 32 | 0.11025 | 0.02198 | 0.08333 |
| 33 | 0.11249 | −0.03008 | 0.08333 |
| 34 | 0.11823 | 0.02198 | 0.08333 |
| 35 | 0.12048 | −0.03008 | 0.08333 |
| 36 | 0.12620 | 0.02198 | 0.08333 |
| 37 | 0.12845 | −0.03008 | 0.08333 |
| 38 | 0.13419 | 0.02198 | 0.08333 |
| 39 | 0.13644 | −0.03008 | 0.08333 |

TABLE I-continued

Non-Dimensionalized [X Y Z/Span Height]

| N | X | Y | Z |
|---|---|---|---|
| 40 | 0.14216 | 0.02198 | 0.08333 |
| 41 | 0.14441 | −0.03008 | 0.08333 |
| 42 | 0.15015 | 0.02198 | 0.08333 |
| 43 | 0.15239 | −0.03008 | 0.08333 |
| 44 | 0.15812 | 0.02198 | 0.08333 |
| 45 | 0.16037 | −0.03008 | 0.08333 |
| 46 | 0.16610 | 0.02198 | 0.08333 |
| 47 | 0.16834 | −0.03008 | 0.08333 |
| 48 | 0.17408 | 0.02198 | 0.08333 |
| 49 | 0.17633 | −0.03008 | 0.08333 |
| 50 | 0.18206 | 0.02198 | 0.08333 |
| 51 | 0.18430 | −0.03008 | 0.08333 |
| 52 | 0.19004 | 0.02198 | 0.08333 |
| 53 | 0.19228 | −0.03008 | 0.08333 |
| 54 | 0.19802 | 0.02198 | 0.08333 |
| 55 | 0.20026 | −0.03008 | 0.08333 |
| 56 | 0.20599 | 0.02198 | 0.08333 |
| 57 | 0.20824 | −0.03008 | 0.08333 |
| 58 | 0.21398 | 0.02198 | 0.08333 |
| 59 | 0.21622 | −0.03008 | 0.08333 |
| 60 | 0.22195 | 0.02198 | 0.08333 |
| 61 | 0.22420 | −0.03008 | 0.08333 |
| 62 | 0.22993 | 0.02198 | 0.08333 |
| 63 | 0.23218 | −0.03008 | 0.08333 |
| 64 | 0.23791 | 0.02198 | 0.08333 |
| 65 | 0.24016 | −0.03008 | 0.08333 |
| 66 | 0.24589 | 0.02198 | 0.08333 |
| 67 | 0.24813 | −0.03008 | 0.08333 |
| 68 | 0.25387 | 0.02198 | 0.08333 |
| 69 | 0.25612 | −0.03008 | 0.08333 |
| 70 | 0.26184 | 0.02198 | 0.08333 |
| 71 | 0.26409 | −0.03008 | 0.08333 |
| 72 | 0.26983 | 0.02198 | 0.08333 |
| 73 | 0.27207 | −0.03008 | 0.08333 |
| 74 | 0.27780 | 0.02198 | 0.08333 |
| 75 | 0.28005 | −0.03008 | 0.08333 |
| 76 | 0.28579 | 0.02198 | 0.08333 |
| 77 | 0.28802 | −0.03008 | 0.08333 |
| 78 | 0.29376 | 0.02198 | 0.08333 |
| 79 | 0.29601 | −0.03008 | 0.08333 |
| 80 | 0.30174 | 0.02198 | 0.08333 |
| 81 | 0.30398 | −0.03008 | 0.08333 |
| 82 | 0.30972 | 0.02198 | 0.08333 |
| 83 | 0.31197 | −0.03008 | 0.08333 |
| 84 | 0.31770 | 0.02198 | 0.08333 |
| 85 | 0.31994 | −0.03008 | 0.08333 |
| 86 | 0.32568 | 0.02198 | 0.08333 |
| 87 | 0.32792 | −0.03008 | 0.08333 |
| 88 | 0.33366 | 0.02198 | 0.08333 |
| 89 | 0.33590 | −0.03008 | 0.08333 |
| 90 | 0.34163 | 0.02199 | 0.08333 |
| 91 | 0.34388 | −0.03008 | 0.08333 |
| 92 | 0.34954 | 0.02122 | 0.08333 |
| 93 | 0.35168 | −0.02863 | 0.08333 |
| 94 | 0.35673 | 0.01786 | 0.08333 |
| 95 | 0.35849 | −0.02457 | 0.08333 |
| 96 | 0.36229 | 0.01220 | 0.08333 |
| 97 | 0.36345 | −0.01838 | 0.08333 |
| 98 | 0.36558 | 0.00498 | 0.08333 |
| 99 | 0.36602 | −0.01088 | 0.08333 |
| 100 | 0.36659 | −0.00293 | 0.08333 |
| 1 | −0.00209 | −0.00499 | 0.11111 |
| 2 | −0.00156 | 0.00340 | 0.11111 |
| 3 | −0.00141 | −0.01338 | 0.11111 |
| 4 | −0.00080 | 0.01179 | 0.11111 |
| 5 | −0.00054 | −0.02175 | 0.11111 |
| 6 | 0.00128 | 0.01991 | 0.11111 |
| 7 | 0.00209 | −0.02970 | 0.11111 |
| 8 | 0.00592 | 0.02688 | 0.11111 |
| 9 | 0.00729 | −0.03627 | 0.11111 |
| 10 | 0.01283 | 0.03155 | 0.11111 |
| 11 | 0.01461 | −0.04027 | 0.11111 |
| 12 | 0.02105 | 0.03310 | 0.11111 |
| 13 | 0.02294 | −0.04121 | 0.11111 |
| 14 | 0.02947 | 0.03307 | 0.11111 |
| 15 | 0.03135 | −0.04116 | 0.11111 |

TABLE I-continued

Non-Dimensionalized [X Y Z/Span Height]

| N | X | Y | Z |
|---|---|---|---|
| 16 | 0.03788 | 0.03307 | 0.11111 |
| 17 | 0.03977 | −0.04116 | 0.11111 |
| 18 | 0.04630 | 0.03307 | 0.11111 |
| 19 | 0.04818 | −0.04116 | 0.11111 |
| 20 | 0.05472 | 0.03307 | 0.11111 |
| 21 | 0.05660 | −0.04116 | 0.11111 |
| 22 | 0.06313 | 0.03307 | 0.11111 |
| 23 | 0.06502 | −0.04116 | 0.11111 |
| 24 | 0.07154 | 0.03307 | 0.11111 |
| 25 | 0.07343 | −0.04116 | 0.11111 |
| 26 | 0.07997 | 0.03307 | 0.11111 |
| 27 | 0.08185 | −0.04116 | 0.11111 |
| 28 | 0.08838 | 0.03307 | 0.11111 |
| 29 | 0.09027 | −0.04116 | 0.11111 |
| 30 | 0.09679 | 0.03307 | 0.11111 |
| 31 | 0.09868 | −0.04116 | 0.11111 |
| 32 | 0.10522 | 0.03307 | 0.11111 |
| 33 | 0.10710 | −0.04116 | 0.11111 |
| 34 | 0.11363 | 0.03307 | 0.11111 |
| 35 | 0.11552 | −0.04116 | 0.11111 |
| 36 | 0.12204 | 0.03307 | 0.11111 |
| 37 | 0.12393 | −0.04116 | 0.11111 |
| 38 | 0.13046 | 0.03307 | 0.11111 |
| 39 | 0.13235 | −0.04116 | 0.11111 |
| 40 | 0.13888 | 0.03307 | 0.11111 |
| 41 | 0.14076 | −0.04116 | 0.11111 |
| 42 | 0.14729 | 0.03307 | 0.11111 |
| 43 | 0.14918 | −0.04116 | 0.11111 |
| 44 | 0.15571 | 0.03307 | 0.11111 |
| 45 | 0.15760 | −0.04116 | 0.11111 |
| 46 | 0.16412 | 0.03307 | 0.11111 |
| 47 | 0.16601 | −0.04116 | 0.11111 |
| 48 | 0.17254 | 0.03307 | 0.11111 |
| 49 | 0.17442 | −0.04116 | 0.11111 |
| 50 | 0.18096 | 0.03307 | 0.11111 |
| 51 | 0.18285 | −0.04116 | 0.11111 |
| 52 | 0.18937 | 0.03307 | 0.11111 |
| 53 | 0.19126 | −0.04116 | 0.11111 |
| 54 | 0.19778 | 0.03307 | 0.11111 |
| 55 | 0.19967 | −0.04116 | 0.11111 |
| 56 | 0.20621 | 0.03307 | 0.11111 |
| 57 | 0.20810 | −0.04116 | 0.11111 |
| 58 | 0.21462 | 0.03307 | 0.11111 |
| 59 | 0.21651 | −0.04116 | 0.11111 |
| 60 | 0.22303 | 0.03307 | 0.11111 |
| 61 | 0.22492 | −0.04116 | 0.11111 |
| 62 | 0.23146 | 0.03307 | 0.11111 |
| 63 | 0.23334 | −0.04116 | 0.11111 |
| 64 | 0.23987 | 0.03307 | 0.11111 |
| 65 | 0.24176 | −0.04116 | 0.11111 |
| 66 | 0.24828 | 0.03307 | 0.11111 |
| 67 | 0.25017 | −0.04116 | 0.11111 |
| 68 | 0.25670 | 0.03307 | 0.11111 |
| 69 | 0.25859 | −0.04116 | 0.11111 |
| 70 | 0.26512 | 0.03307 | 0.11111 |
| 71 | 0.26700 | −0.04116 | 0.11111 |
| 72 | 0.27353 | 0.03307 | 0.11111 |
| 73 | 0.27542 | −0.04116 | 0.11111 |
| 74 | 0.28195 | 0.03307 | 0.11111 |
| 75 | 0.28384 | −0.04116 | 0.11111 |
| 76 | 0.29036 | 0.03307 | 0.11111 |
| 77 | 0.29225 | −0.04116 | 0.11111 |
| 78 | 0.29878 | 0.03307 | 0.11111 |
| 79 | 0.30067 | −0.04116 | 0.11111 |
| 80 | 0.30720 | 0.03307 | 0.11111 |
| 81 | 0.30909 | −0.04116 | 0.11111 |
| 82 | 0.31561 | 0.03307 | 0.11111 |
| 83 | 0.31750 | −0.04116 | 0.11111 |
| 84 | 0.32403 | 0.03307 | 0.11111 |
| 85 | 0.32591 | −0.04116 | 0.11111 |
| 86 | 0.33245 | 0.03307 | 0.11111 |
| 87 | 0.33434 | −0.04116 | 0.11111 |
| 88 | 0.34086 | 0.03308 | 0.11111 |
| 89 | 0.34275 | −0.04116 | 0.11111 |
| 90 | 0.34916 | 0.03199 | 0.11111 |
| 91 | 0.35091 | −0.03941 | 0.11111 |

TABLE I-continued

Non-Dimensionalized [X Y Z/Span Height]

| N | X | Y | Z |
|---|---|---|---|
| 92 | 0.35643 | 0.02785 | 0.11111 |
| 93 | 0.35780 | −0.03468 | 0.11111 |
| 94 | 0.36179 | 0.02143 | 0.11111 |
| 95 | 0.36268 | −0.02786 | 0.11111 |
| 96 | 0.36487 | 0.01362 | 0.11111 |
| 97 | 0.36522 | −0.01987 | 0.11111 |
| 98 | 0.36592 | 0.00528 | 0.11111 |
| 99 | 0.36606 | −0.01149 | 0.11111 |
| 100 | 0.36660 | −0.00311 | 0.11111 |
| 1 | −0.00644 | −0.00824 | 0.13889 |
| 2 | −0.00641 | 0.00052 | 0.13889 |
| 3 | −0.00567 | −0.01700 | 0.13889 |
| 4 | −0.00562 | 0.00927 | 0.13889 |
| 5 | −0.00491 | 0.01803 | 0.13889 |
| 6 | −0.00491 | −0.02575 | 0.13889 |
| 7 | −0.00321 | −0.03433 | 0.13889 |
| 8 | −0.00303 | 0.02657 | 0.13889 |
| 9 | 0.00150 | −0.04167 | 0.13889 |
| 10 | 0.00176 | 0.03384 | 0.13889 |
| 11 | 0.00869 | −0.04660 | 0.13889 |
| 12 | 0.00903 | 0.03865 | 0.13889 |
| 13 | 0.01722 | −0.04849 | 0.13889 |
| 14 | 0.01759 | 0.04042 | 0.13889 |
| 15 | 0.02601 | −0.04850 | 0.13889 |
| 16 | 0.02638 | 0.04041 | 0.13889 |
| 17 | 0.03479 | −0.04849 | 0.13889 |
| 18 | 0.03516 | 0.04040 | 0.13889 |
| 19 | 0.04358 | −0.04849 | 0.13889 |
| 20 | 0.04395 | 0.04040 | 0.13889 |
| 21 | 0.05236 | −0.04849 | 0.13889 |
| 22 | 0.05274 | 0.04040 | 0.13889 |
| 23 | 0.06115 | −0.04849 | 0.13889 |
| 24 | 0.06152 | 0.04040 | 0.13889 |
| 25 | 0.06994 | −0.04849 | 0.13889 |
| 26 | 0.07031 | 0.04040 | 0.13889 |
| 27 | 0.07872 | −0.04849 | 0.13889 |
| 28 | 0.07909 | 0.04040 | 0.13889 |
| 29 | 0.08751 | −0.04849 | 0.13889 |
| 30 | 0.08788 | 0.04040 | 0.13889 |
| 31 | 0.09629 | −0.04849 | 0.13889 |
| 32 | 0.09666 | 0.04040 | 0.13889 |
| 33 | 0.10508 | −0.04849 | 0.13889 |
| 34 | 0.10545 | 0.04040 | 0.13889 |
| 35 | 0.11386 | −0.04849 | 0.13889 |
| 36 | 0.11424 | 0.04040 | 0.13889 |
| 37 | 0.12265 | −0.04849 | 0.13889 |
| 38 | 0.12302 | 0.04040 | 0.13889 |
| 39 | 0.13144 | −0.04849 | 0.13889 |
| 40 | 0.13181 | 0.04040 | 0.13889 |
| 41 | 0.14022 | −0.04849 | 0.13889 |
| 42 | 0.14059 | 0.04040 | 0.13889 |
| 43 | 0.14901 | −0.04849 | 0.13889 |
| 44 | 0.14938 | 0.04040 | 0.13889 |
| 45 | 0.15779 | −0.04849 | 0.13889 |
| 46 | 0.15817 | 0.04040 | 0.13889 |
| 47 | 0.16658 | −0.04849 | 0.13889 |
| 48 | 0.16695 | 0.04040 | 0.13889 |
| 49 | 0.17537 | −0.04849 | 0.13889 |
| 50 | 0.17574 | 0.04040 | 0.13889 |
| 51 | 0.18415 | −0.04849 | 0.13889 |
| 52 | 0.18452 | 0.04040 | 0.13889 |
| 53 | 0.19294 | −0.04849 | 0.13889 |
| 54 | 0.19331 | 0.04040 | 0.13889 |
| 55 | 0.20172 | −0.04849 | 0.13889 |
| 56 | 0.20210 | 0.04040 | 0.13889 |
| 57 | 0.21051 | −0.04849 | 0.13889 |
| 58 | 0.21088 | 0.04040 | 0.13889 |
| 59 | 0.21930 | −0.04849 | 0.13889 |
| 60 | 0.21967 | 0.04040 | 0.13889 |
| 61 | 0.22808 | −0.04849 | 0.13889 |
| 62 | 0.22845 | 0.04040 | 0.13889 |
| 63 | 0.23687 | −0.04849 | 0.13889 |
| 64 | 0.23724 | 0.04040 | 0.13889 |
| 65 | 0.24565 | −0.04849 | 0.13889 |
| 66 | 0.24602 | 0.04040 | 0.13889 |
| 67 | 0.25444 | −0.04849 | 0.13889 |
| 68 | 0.25481 | 0.04040 | 0.13889 |
| 69 | 0.26322 | −0.04849 | 0.13889 |
| 70 | 0.26360 | 0.04040 | 0.13889 |
| 71 | 0.27201 | −0.04849 | 0.13889 |
| 72 | 0.27238 | 0.04040 | 0.13889 |
| 73 | 0.28080 | −0.04849 | 0.13889 |
| 74 | 0.28117 | 0.04040 | 0.13889 |
| 75 | 0.28958 | −0.04849 | 0.13889 |
| 76 | 0.28995 | 0.04040 | 0.13889 |
| 77 | 0.29837 | −0.04849 | 0.13889 |
| 78 | 0.29874 | 0.04040 | 0.13889 |
| 79 | 0.30715 | −0.04849 | 0.13889 |
| 80 | 0.30753 | 0.04040 | 0.13889 |
| 81 | 0.31594 | −0.04849 | 0.13889 |
| 82 | 0.31631 | 0.04040 | 0.13889 |
| 83 | 0.32473 | −0.04849 | 0.13889 |
| 84 | 0.32510 | 0.04040 | 0.13889 |
| 85 | 0.33351 | −0.04849 | 0.13889 |
| 86 | 0.33388 | 0.04040 | 0.13889 |
| 87 | 0.34230 | −0.04849 | 0.13889 |
| 88 | 0.34267 | 0.04039 | 0.13889 |
| 89 | 0.35086 | −0.04677 | 0.13889 |
| 90 | 0.35120 | 0.03852 | 0.13889 |
| 91 | 0.35812 | −0.04193 | 0.13889 |
| 92 | 0.35838 | 0.03357 | 0.13889 |
| 93 | 0.36291 | −0.03467 | 0.13889 |
| 94 | 0.36309 | 0.02623 | 0.13889 |
| 95 | 0.36482 | −0.02612 | 0.13889 |
| 96 | 0.36482 | 0.01766 | 0.13889 |
| 97 | 0.36553 | −0.01736 | 0.13889 |
| 98 | 0.36557 | 0.00890 | 0.13889 |
| 99 | 0.36632 | −0.00861 | 0.13889 |
| 100 | 0.36635 | 0.00015 | 0.13889 |
| 1 | −0.01110 | −0.00029 | 0.16666 |
| 2 | −0.01097 | −0.00918 | 0.16666 |
| 3 | −0.01030 | 0.00860 | 0.16666 |
| 4 | −0.01019 | −0.01808 | 0.16666 |
| 5 | −0.00954 | 0.01750 | 0.16666 |
| 6 | −0.00941 | −0.02697 | 0.16666 |
| 7 | −0.00784 | 0.02622 | 0.16666 |
| 8 | −0.00730 | −0.03558 | 0.16666 |
| 9 | −0.00303 | 0.03367 | 0.16666 |
| 10 | −0.00205 | −0.04273 | 0.16666 |
| 11 | 0.00426 | 0.03869 | 0.16666 |
| 12 | 0.00554 | −0.04729 | 0.16666 |
| 13 | 0.01293 | 0.04056 | 0.16666 |
| 14 | 0.01431 | −0.04869 | 0.16666 |
| 15 | 0.02186 | 0.04056 | 0.16666 |
| 16 | 0.02324 | −0.04866 | 0.16666 |
| 17 | 0.03078 | 0.04056 | 0.16666 |
| 18 | 0.03216 | −0.04866 | 0.16666 |
| 19 | 0.03971 | 0.04056 | 0.16666 |
| 20 | 0.04109 | −0.04866 | 0.16666 |
| 21 | 0.04863 | 0.04056 | 0.16666 |
| 22 | 0.05002 | −0.04866 | 0.16666 |
| 23 | 0.05756 | 0.04056 | 0.16666 |
| 24 | 0.05894 | −0.04866 | 0.16666 |
| 25 | 0.06649 | 0.04056 | 0.16666 |
| 26 | 0.06786 | −0.04866 | 0.16666 |
| 27 | 0.07541 | 0.04056 | 0.16666 |
| 28 | 0.07679 | −0.04866 | 0.16666 |
| 29 | 0.08433 | 0.04056 | 0.16666 |
| 30 | 0.08571 | −0.04866 | 0.16666 |
| 31 | 0.09326 | 0.04056 | 0.16666 |
| 32 | 0.09464 | −0.04866 | 0.16666 |
| 33 | 0.10218 | 0.04056 | 0.16666 |
| 34 | 0.10356 | −0.04866 | 0.16666 |
| 35 | 0.11111 | 0.04056 | 0.16666 |
| 36 | 0.11248 | −0.04866 | 0.16666 |
| 37 | 0.12003 | 0.04056 | 0.16666 |
| 38 | 0.12142 | −0.04866 | 0.16666 |
| 39 | 0.12895 | 0.04056 | 0.16666 |
| 40 | 0.13034 | −0.04866 | 0.16666 |
| 41 | 0.13784 | 0.03996 | 0.16666 |
| 42 | 0.13920 | −0.04781 | 0.16666 |
| 43 | 0.14655 | 0.03811 | 0.16666 |

TABLE I-continued

Non-Dimensionalized [X Y Z/Span Height]

| N | X | Y | Z |
|---|---|---|---|
| 44 | 0.14786 | −0.04568 | 0.16666 |
| 45 | 0.15518 | 0.03571 | 0.16666 |
| 46 | 0.15641 | −0.04308 | 0.16666 |
| 47 | 0.16384 | 0.03349 | 0.16666 |
| 48 | 0.16503 | −0.04080 | 0.16666 |
| 49 | 0.17264 | 0.03218 | 0.16666 |
| 50 | 0.17388 | −0.03963 | 0.16666 |
| 51 | 0.18152 | 0.03270 | 0.16666 |
| 52 | 0.18272 | −0.04056 | 0.16666 |
| 53 | 0.19016 | 0.03491 | 0.16666 |
| 54 | 0.19127 | −0.04310 | 0.16666 |
| 55 | 0.19871 | 0.03750 | 0.16666 |
| 56 | 0.19979 | −0.04581 | 0.16666 |
| 57 | 0.20740 | 0.03956 | 0.16666 |
| 58 | 0.20847 | −0.04783 | 0.16666 |
| 59 | 0.21625 | 0.04054 | 0.16666 |
| 60 | 0.21734 | −0.04865 | 0.16666 |
| 61 | 0.22517 | 0.04056 | 0.16666 |
| 62 | 0.22626 | −0.04866 | 0.16666 |
| 63 | 0.23410 | 0.04056 | 0.16666 |
| 64 | 0.23519 | −0.04866 | 0.16666 |
| 65 | 0.24302 | 0.04056 | 0.16666 |
| 66 | 0.24411 | −0.04866 | 0.16666 |
| 67 | 0.25194 | 0.04056 | 0.16666 |
| 68 | 0.25305 | −0.04866 | 0.16666 |
| 69 | 0.26087 | 0.04056 | 0.16666 |
| 70 | 0.26197 | −0.04866 | 0.16666 |
| 71 | 0.26979 | 0.04056 | 0.16666 |
| 72 | 0.27089 | −0.04866 | 0.16666 |
| 73 | 0.27873 | 0.04056 | 0.16666 |
| 74 | 0.27982 | −0.04866 | 0.16666 |
| 75 | 0.28765 | 0.04056 | 0.16666 |
| 76 | 0.28874 | −0.04866 | 0.16666 |
| 77 | 0.29657 | 0.04056 | 0.16666 |
| 78 | 0.29766 | −0.04866 | 0.16666 |
| 79 | 0.30550 | 0.04056 | 0.16666 |
| 80 | 0.30659 | −0.04866 | 0.16666 |
| 81 | 0.31442 | 0.04056 | 0.16666 |
| 82 | 0.31551 | −0.04866 | 0.16666 |
| 83 | 0.32334 | 0.04056 | 0.16666 |
| 84 | 0.32444 | −0.04866 | 0.16666 |
| 85 | 0.33227 | 0.04056 | 0.16666 |
| 86 | 0.33337 | −0.04866 | 0.16666 |
| 87 | 0.34119 | 0.04056 | 0.16666 |
| 88 | 0.34229 | −0.04866 | 0.16666 |
| 89 | 0.34995 | 0.03918 | 0.16666 |
| 90 | 0.35098 | −0.04687 | 0.16666 |
| 91 | 0.35752 | 0.03458 | 0.16666 |
| 92 | 0.35831 | −0.04191 | 0.16666 |
| 93 | 0.36267 | 0.02736 | 0.16666 |
| 94 | 0.36305 | −0.03445 | 0.16666 |
| 95 | 0.36472 | 0.01873 | 0.16666 |
| 96 | 0.36485 | −0.02573 | 0.16666 |
| 97 | 0.36549 | 0.00984 | 0.16666 |
| 98 | 0.36557 | −0.01685 | 0.16666 |
| 99 | 0.36628 | 0.00095 | 0.16666 |
| 100 | 0.36638 | −0.00795 | 0.16666 |
| 1 | −0.01583 | −0.00232 | 0.19445 |
| 2 | −0.01547 | −0.01122 | 0.19445 |
| 3 | −0.01506 | 0.00657 | 0.19445 |
| 4 | −0.01467 | −0.02011 | 0.19445 |
| 5 | −0.01432 | 0.01547 | 0.19445 |
| 6 | −0.01388 | −0.02901 | 0.19445 |
| 7 | −0.01266 | 0.02420 | 0.19445 |
| 8 | −0.01127 | −0.03748 | 0.19445 |
| 9 | −0.00806 | 0.03176 | 0.19445 |
| 10 | −0.00551 | −0.04420 | 0.19445 |
| 11 | −0.00085 | 0.03692 | 0.19445 |
| 12 | 0.00245 | −0.04805 | 0.19445 |
| 13 | 0.00778 | 0.03897 | 0.19445 |
| 14 | 0.01132 | −0.04887 | 0.19445 |
| 15 | 0.01670 | 0.03920 | 0.19445 |
| 16 | 0.02025 | −0.04871 | 0.19445 |
| 17 | 0.02563 | 0.03942 | 0.19445 |
| 18 | 0.02917 | −0.04861 | 0.19445 |
| 19 | 0.03455 | 0.03964 | 0.19445 |
| 20 | 0.03809 | −0.04852 | 0.19445 |
| 21 | 0.04347 | 0.03986 | 0.19445 |
| 22 | 0.04702 | −0.04843 | 0.19445 |
| 23 | 0.05240 | 0.04006 | 0.19445 |
| 24 | 0.05595 | −0.04834 | 0.19445 |
| 25 | 0.06132 | 0.04025 | 0.19445 |
| 26 | 0.06487 | −0.04825 | 0.19445 |
| 27 | 0.07025 | 0.04043 | 0.19445 |
| 28 | 0.07380 | −0.04817 | 0.19445 |
| 29 | 0.07917 | 0.04061 | 0.19445 |
| 30 | 0.08272 | −0.04809 | 0.19445 |
| 31 | 0.08809 | 0.04077 | 0.19445 |
| 32 | 0.09165 | −0.04801 | 0.19445 |
| 33 | 0.09702 | 0.04092 | 0.19445 |
| 34 | 0.10057 | −0.04795 | 0.19445 |
| 35 | 0.10594 | 0.04107 | 0.19445 |
| 36 | 0.10950 | −0.04790 | 0.19445 |
| 37 | 0.11486 | 0.04122 | 0.19445 |
| 38 | 0.11843 | −0.04784 | 0.19445 |
| 39 | 0.12380 | 0.04133 | 0.19445 |
| 40 | 0.12735 | −0.04781 | 0.19445 |
| 41 | 0.13272 | 0.04143 | 0.19445 |
| 42 | 0.13627 | −0.04777 | 0.19445 |
| 43 | 0.14164 | 0.04150 | 0.19445 |
| 44 | 0.14521 | −0.04775 | 0.19445 |
| 45 | 0.15057 | 0.04153 | 0.19445 |
| 46 | 0.15413 | −0.04773 | 0.19445 |
| 47 | 0.15949 | 0.04151 | 0.19445 |
| 48 | 0.16306 | −0.04773 | 0.19445 |
| 49 | 0.16842 | 0.04146 | 0.19445 |
| 50 | 0.17198 | −0.04774 | 0.19445 |
| 51 | 0.17735 | 0.04135 | 0.19445 |
| 52 | 0.18090 | −0.04776 | 0.19445 |
| 53 | 0.18627 | 0.04120 | 0.19445 |
| 54 | 0.18984 | −0.04779 | 0.19445 |
| 55 | 0.19520 | 0.04101 | 0.19445 |
| 56 | 0.19876 | −0.04782 | 0.19445 |
| 57 | 0.20412 | 0.04080 | 0.19445 |
| 58 | 0.20768 | −0.04787 | 0.19445 |
| 59 | 0.21304 | 0.04056 | 0.19445 |
| 60 | 0.21661 | −0.04793 | 0.19445 |
| 61 | 0.22196 | 0.04031 | 0.19445 |
| 62 | 0.22553 | −0.04801 | 0.19445 |
| 63 | 0.23088 | 0.04005 | 0.19445 |
| 64 | 0.23446 | −0.04811 | 0.19445 |
| 65 | 0.23981 | 0.03979 | 0.19445 |
| 66 | 0.24339 | −0.04823 | 0.19445 |
| 67 | 0.24873 | 0.03951 | 0.19445 |
| 68 | 0.25231 | −0.04836 | 0.19445 |
| 69 | 0.25765 | 0.03923 | 0.19445 |
| 70 | 0.26124 | −0.04851 | 0.19445 |
| 71 | 0.26657 | 0.03894 | 0.19445 |
| 72 | 0.27016 | −0.04867 | 0.19445 |
| 73 | 0.27549 | 0.03865 | 0.19445 |
| 74 | 0.27908 | −0.04885 | 0.19445 |
| 75 | 0.28441 | 0.03835 | 0.19445 |
| 76 | 0.28801 | −0.04903 | 0.19445 |
| 77 | 0.29333 | 0.03805 | 0.19445 |
| 78 | 0.29693 | −0.04923 | 0.19445 |
| 79 | 0.30226 | 0.03775 | 0.19445 |
| 80 | 0.30585 | −0.04943 | 0.19445 |
| 81 | 0.31117 | 0.03744 | 0.19445 |
| 82 | 0.31478 | −0.04962 | 0.19445 |
| 83 | 0.32010 | 0.03713 | 0.19445 |
| 84 | 0.32370 | −0.04984 | 0.19445 |
| 85 | 0.32902 | 0.03681 | 0.19445 |
| 86 | 0.33263 | −0.05005 | 0.19445 |
| 87 | 0.33793 | 0.03650 | 0.19445 |
| 88 | 0.34155 | −0.05028 | 0.19445 |
| 89 | 0.34680 | 0.03564 | 0.19445 |
| 90 | 0.35028 | −0.04871 | 0.19445 |
| 91 | 0.35481 | 0.03184 | 0.19445 |
| 92 | 0.35765 | −0.04380 | 0.19445 |
| 93 | 0.36075 | 0.02524 | 0.19445 |
| 94 | 0.36241 | −0.03632 | 0.19445 |
| 95 | 0.36366 | 0.01688 | 0.19445 |

TABLE I-continued

Non-Dimensionalized [X Y Z/Span Height]

| N | X | Y | Z |
|---|---|---|---|
| 96 | 0.36396 | −0.02757 | 0.19445 |
| 97 | 0.36451 | 0.00799 | 0.19445 |
| 98 | 0.36481 | −0.01868 | 0.19445 |
| 99 | 0.36529 | −0.00090 | 0.19445 |
| 100 | 0.36573 | −0.00979 | 0.19445 |
| 1 | −0.02045 | −0.00917 | 0.22222 |
| 2 | −0.02009 | −0.00031 | 0.22222 |
| 3 | −0.01969 | −0.01801 | 0.22222 |
| 4 | −0.01932 | 0.00854 | 0.22222 |
| 5 | −0.01893 | −0.02685 | 0.22222 |
| 6 | −0.01811 | 0.01731 | 0.22222 |
| 7 | −0.01770 | −0.03562 | 0.22222 |
| 8 | −0.01417 | 0.02519 | 0.22222 |
| 9 | −0.01336 | −0.04329 | 0.22222 |
| 10 | −0.00746 | 0.03090 | 0.22222 |
| 11 | −0.00618 | −0.04834 | 0.22222 |
| 12 | 0.00095 | 0.03357 | 0.22222 |
| 13 | 0.00250 | −0.04995 | 0.22222 |
| 14 | 0.00980 | 0.03419 | 0.22222 |
| 15 | 0.01136 | −0.04947 | 0.22222 |
| 16 | 0.01864 | 0.03502 | 0.22222 |
| 17 | 0.02022 | −0.04902 | 0.22222 |
| 18 | 0.02748 | 0.03587 | 0.22222 |
| 19 | 0.02909 | −0.04861 | 0.22222 |
| 20 | 0.03631 | 0.03675 | 0.22222 |
| 21 | 0.03796 | −0.04824 | 0.22222 |
| 22 | 0.04514 | 0.03765 | 0.22222 |
| 23 | 0.04683 | −0.04786 | 0.22222 |
| 24 | 0.05397 | 0.03851 | 0.22222 |
| 25 | 0.05570 | −0.04749 | 0.22222 |
| 26 | 0.06282 | 0.03933 | 0.22222 |
| 27 | 0.06457 | −0.04713 | 0.22222 |
| 28 | 0.07166 | 0.04010 | 0.22222 |
| 29 | 0.07344 | −0.04679 | 0.22222 |
| 30 | 0.08050 | 0.04083 | 0.22222 |
| 31 | 0.08231 | −0.04646 | 0.22222 |
| 32 | 0.08935 | 0.04152 | 0.22222 |
| 33 | 0.09118 | −0.04615 | 0.22222 |
| 34 | 0.09821 | 0.04218 | 0.22222 |
| 35 | 0.10005 | −0.04587 | 0.22222 |
| 36 | 0.10706 | 0.04280 | 0.22222 |
| 37 | 0.10892 | −0.04562 | 0.22222 |
| 38 | 0.11592 | 0.04340 | 0.22222 |
| 39 | 0.11780 | −0.04541 | 0.22222 |
| 40 | 0.12478 | 0.04397 | 0.22222 |
| 41 | 0.12667 | −0.04524 | 0.22222 |
| 42 | 0.13364 | 0.04444 | 0.22222 |
| 43 | 0.13555 | −0.04510 | 0.22222 |
| 44 | 0.14251 | 0.04479 | 0.22222 |
| 45 | 0.14442 | −0.04500 | 0.22222 |
| 46 | 0.15138 | 0.04495 | 0.22222 |
| 47 | 0.15330 | −0.04495 | 0.22222 |
| 48 | 0.16026 | 0.04490 | 0.22222 |
| 49 | 0.16218 | −0.04493 | 0.22222 |
| 50 | 0.16913 | 0.04465 | 0.22222 |
| 51 | 0.17105 | −0.04495 | 0.22222 |
| 52 | 0.17799 | 0.04421 | 0.22222 |
| 53 | 0.17993 | −0.04500 | 0.22222 |
| 54 | 0.18685 | 0.04361 | 0.22222 |
| 55 | 0.18881 | −0.04510 | 0.22222 |
| 56 | 0.19570 | 0.04287 | 0.22222 |
| 57 | 0.19769 | −0.04523 | 0.22222 |
| 58 | 0.20453 | 0.04201 | 0.22222 |
| 59 | 0.20656 | −0.04541 | 0.22222 |
| 60 | 0.21336 | 0.04106 | 0.22222 |
| 61 | 0.21543 | −0.04565 | 0.22222 |
| 62 | 0.22217 | 0.04002 | 0.22222 |
| 63 | 0.22430 | −0.04594 | 0.22222 |
| 64 | 0.23098 | 0.03893 | 0.22222 |
| 65 | 0.23317 | −0.04631 | 0.22222 |
| 66 | 0.23979 | 0.03779 | 0.22222 |
| 67 | 0.24204 | −0.04676 | 0.22222 |
| 68 | 0.24859 | 0.03661 | 0.22222 |
| 69 | 0.25090 | −0.04730 | 0.22222 |
| 70 | 0.25738 | 0.03539 | 0.22222 |
| 71 | 0.25975 | −0.04792 | 0.22222 |
| 72 | 0.26618 | 0.03416 | 0.22222 |
| 73 | 0.26860 | −0.04859 | 0.22222 |
| 74 | 0.27496 | 0.03290 | 0.22222 |
| 75 | 0.27745 | −0.04930 | 0.22222 |
| 76 | 0.28375 | 0.03162 | 0.22222 |
| 77 | 0.28630 | −0.05004 | 0.22222 |
| 78 | 0.29253 | 0.03033 | 0.22222 |
| 79 | 0.29514 | −0.05082 | 0.22222 |
| 80 | 0.30131 | 0.02900 | 0.22222 |
| 81 | 0.30398 | −0.05163 | 0.22222 |
| 82 | 0.31008 | 0.02766 | 0.22222 |
| 83 | 0.31282 | −0.05247 | 0.22222 |
| 84 | 0.31885 | 0.02630 | 0.22222 |
| 85 | 0.32165 | −0.05334 | 0.22222 |
| 86 | 0.32761 | 0.02491 | 0.22222 |
| 87 | 0.33048 | −0.05426 | 0.22222 |
| 88 | 0.33639 | 0.02350 | 0.22222 |
| 89 | 0.33930 | −0.05520 | 0.22222 |
| 90 | 0.34506 | 0.02168 | 0.22222 |
| 91 | 0.34807 | −0.05423 | 0.22222 |
| 92 | 0.35279 | 0.01744 | 0.22222 |
| 93 | 0.35547 | −0.04951 | 0.22222 |
| 94 | 0.35845 | 0.01066 | 0.22222 |
| 95 | 0.35982 | −0.04188 | 0.22222 |
| 96 | 0.36104 | 0.00224 | 0.22222 |
| 97 | 0.36116 | −0.03310 | 0.22222 |
| 98 | 0.36179 | −0.00661 | 0.22222 |
| 99 | 0.36222 | −0.02429 | 0.22222 |
| 100 | 0.36255 | −0.01546 | 0.22222 |
| 1 | −0.02512 | −0.00985 | 0.25000 |
| 2 | −0.02467 | −0.01866 | 0.25000 |
| 3 | −0.02438 | −0.00106 | 0.25000 |
| 4 | −0.02391 | −0.02745 | 0.25000 |
| 5 | −0.02360 | 0.00772 | 0.25000 |
| 6 | −0.02315 | −0.03625 | 0.25000 |
| 7 | −0.02064 | 0.01598 | 0.25000 |
| 8 | −0.02031 | −0.04452 | 0.25000 |
| 9 | −0.01468 | 0.02240 | 0.25000 |
| 10 | −0.01393 | −0.05044 | 0.25000 |
| 11 | −0.00665 | 0.02593 | 0.25000 |
| 12 | −0.00547 | −0.05263 | 0.25000 |
| 13 | 0.00214 | 0.02643 | 0.25000 |
| 14 | 0.00334 | −0.05195 | 0.25000 |
| 15 | 0.01090 | 0.02742 | 0.25000 |
| 16 | 0.01211 | −0.05099 | 0.25000 |
| 17 | 0.01954 | 0.02924 | 0.25000 |
| 18 | 0.02088 | −0.05000 | 0.25000 |
| 19 | 0.02816 | 0.03114 | 0.25000 |
| 20 | 0.02965 | −0.04906 | 0.25000 |
| 21 | 0.03677 | 0.03305 | 0.25000 |
| 22 | 0.03844 | −0.04817 | 0.25000 |
| 23 | 0.04540 | 0.03493 | 0.25000 |
| 24 | 0.04723 | −0.04738 | 0.25000 |
| 25 | 0.05359 | 0.03807 | 0.25000 |
| 26 | 0.05575 | −0.04509 | 0.25000 |
| 27 | 0.06175 | 0.04125 | 0.25000 |
| 28 | 0.06445 | −0.04380 | 0.25000 |
| 29 | 0.07052 | 0.04228 | 0.25000 |
| 30 | 0.07324 | −0.04306 | 0.25000 |
| 31 | 0.07928 | 0.04341 | 0.25000 |
| 32 | 0.08204 | −0.04233 | 0.25000 |
| 33 | 0.08803 | 0.04459 | 0.25000 |
| 34 | 0.09084 | −0.04164 | 0.25000 |
| 35 | 0.09677 | 0.04585 | 0.25000 |
| 36 | 0.09964 | −0.04099 | 0.25000 |
| 37 | 0.10550 | 0.04713 | 0.25000 |
| 38 | 0.10845 | −0.04041 | 0.25000 |
| 39 | 0.11426 | 0.04827 | 0.25000 |
| 40 | 0.11726 | −0.03998 | 0.25000 |
| 41 | 0.12303 | 0.04922 | 0.25000 |
| 42 | 0.12608 | −0.03984 | 0.25000 |
| 43 | 0.13183 | 0.04994 | 0.25000 |
| 44 | 0.13491 | −0.03996 | 0.25000 |
| 45 | 0.14064 | 0.05045 | 0.25000 |
| 46 | 0.14373 | −0.04022 | 0.25000 |
| 47 | 0.14946 | 0.05071 | 0.25000 |

TABLE I-continued

Non-Dimensionalized [X Y Z/Span Height]

| N | X | Y | Z |
|---|---|---|---|
| 48 | 0.15256 | −0.04049 | 0.25000 |
| 49 | 0.15828 | 0.05076 | 0.25000 |
| 50 | 0.16139 | −0.04066 | 0.25000 |
| 51 | 0.16711 | 0.05050 | 0.25000 |
| 52 | 0.17022 | −0.04071 | 0.25000 |
| 53 | 0.17590 | 0.04986 | 0.25000 |
| 54 | 0.17904 | −0.04076 | 0.25000 |
| 55 | 0.18466 | 0.04887 | 0.25000 |
| 56 | 0.18787 | −0.04090 | 0.25000 |
| 57 | 0.19338 | 0.04752 | 0.25000 |
| 58 | 0.19669 | −0.04114 | 0.25000 |
| 59 | 0.20206 | 0.04586 | 0.25000 |
| 60 | 0.20551 | −0.04147 | 0.25000 |
| 61 | 0.21068 | 0.04395 | 0.25000 |
| 62 | 0.21432 | −0.04193 | 0.25000 |
| 63 | 0.21926 | 0.04183 | 0.25000 |
| 64 | 0.22313 | −0.04253 | 0.25000 |
| 65 | 0.22779 | 0.03954 | 0.25000 |
| 66 | 0.23193 | −0.04329 | 0.25000 |
| 67 | 0.23627 | 0.03712 | 0.25000 |
| 68 | 0.24070 | −0.04421 | 0.25000 |
| 69 | 0.24473 | 0.03459 | 0.25000 |
| 70 | 0.24947 | −0.04532 | 0.25000 |
| 71 | 0.25316 | 0.03200 | 0.25000 |
| 72 | 0.25819 | −0.04663 | 0.25000 |
| 73 | 0.26158 | 0.02934 | 0.25000 |
| 74 | 0.26689 | −0.04809 | 0.25000 |
| 75 | 0.26998 | 0.02663 | 0.25000 |
| 76 | 0.27558 | −0.04964 | 0.25000 |
| 77 | 0.27836 | 0.02386 | 0.25000 |
| 78 | 0.28427 | −0.05124 | 0.25000 |
| 79 | 0.28672 | 0.02103 | 0.25000 |
| 80 | 0.29294 | −0.05290 | 0.25000 |
| 81 | 0.29505 | 0.01811 | 0.25000 |
| 82 | 0.30159 | −0.05464 | 0.25000 |
| 83 | 0.30336 | 0.01513 | 0.25000 |
| 84 | 0.31022 | −0.05647 | 0.25000 |
| 85 | 0.31165 | 0.01208 | 0.25000 |
| 86 | 0.31883 | −0.05840 | 0.25000 |
| 87 | 0.31991 | 0.00898 | 0.25000 |
| 88 | 0.32743 | −0.06042 | 0.25000 |
| 89 | 0.32815 | 0.00582 | 0.25000 |
| 90 | 0.33601 | −0.06248 | 0.25000 |
| 91 | 0.33638 | 0.00260 | 0.25000 |
| 92 | 0.34438 | −0.00109 | 0.25000 |
| 93 | 0.34475 | −0.06237 | 0.25000 |
| 94 | 0.35111 | −0.00674 | 0.25000 |
| 95 | 0.35201 | −0.05759 | 0.25000 |
| 96 | 0.35518 | −0.01447 | 0.25000 |
| 97 | 0.35520 | −0.04950 | 0.25000 |
| 98 | 0.35639 | −0.02321 | 0.25000 |
| 99 | 0.35667 | −0.04079 | 0.25000 |
| 100 | 0.35714 | −0.03201 | 0.25000 |
| 1 | −0.02976 | −0.01909 | 0.27778 |
| 2 | −0.02930 | −0.02792 | 0.27778 |
| 3 | −0.02906 | −0.01028 | 0.27778 |
| 4 | −0.02857 | −0.03673 | 0.27778 |
| 5 | −0.02839 | −0.00145 | 0.27778 |
| 6 | −0.02739 | −0.04548 | 0.27778 |
| 7 | −0.02648 | 0.00713 | 0.27778 |
| 8 | −0.02248 | −0.05268 | 0.27778 |
| 9 | −0.02137 | 0.01426 | 0.27778 |
| 10 | −0.01445 | −0.05606 | 0.27778 |
| 11 | −0.01371 | 0.01854 | 0.27778 |
| 12 | −0.00561 | −0.05577 | 0.27778 |
| 13 | −0.00497 | 0.01921 | 0.27778 |
| 14 | 0.00318 | −0.05481 | 0.27778 |
| 15 | 0.00387 | 0.01881 | 0.27778 |
| 16 | 0.01195 | −0.05364 | 0.27778 |
| 17 | 0.01264 | 0.01991 | 0.27778 |
| 18 | 0.02068 | −0.05221 | 0.27778 |
| 19 | 0.02104 | 0.02260 | 0.27778 |
| 20 | 0.02927 | 0.02587 | 0.27778 |
| 21 | 0.02937 | −0.05056 | 0.27778 |
| 22 | 0.03749 | 0.02913 | 0.27778 |
| 23 | 0.03806 | −0.04892 | 0.27778 |
| 24 | 0.04572 | 0.03240 | 0.27778 |
| 25 | 0.04677 | −0.04740 | 0.27778 |
| 26 | 0.05398 | 0.03559 | 0.27778 |
| 27 | 0.05522 | −0.04490 | 0.27778 |
| 28 | 0.06248 | 0.03796 | 0.27778 |
| 29 | 0.06377 | −0.04281 | 0.27778 |
| 30 | 0.07111 | 0.03992 | 0.27778 |
| 31 | 0.07252 | −0.04150 | 0.27778 |
| 32 | 0.07971 | 0.04201 | 0.27778 |
| 33 | 0.08127 | −0.04024 | 0.27778 |
| 34 | 0.08828 | 0.04419 | 0.27778 |
| 35 | 0.09004 | −0.03903 | 0.27778 |
| 36 | 0.09683 | 0.04646 | 0.27778 |
| 37 | 0.09881 | −0.03789 | 0.27778 |
| 38 | 0.10537 | 0.04879 | 0.27778 |
| 39 | 0.10760 | −0.03688 | 0.27778 |
| 40 | 0.11394 | 0.05097 | 0.27778 |
| 41 | 0.11640 | −0.03604 | 0.27778 |
| 42 | 0.12258 | 0.05287 | 0.27778 |
| 43 | 0.12522 | −0.03539 | 0.27778 |
| 44 | 0.13129 | 0.05443 | 0.27778 |
| 45 | 0.13405 | −0.03492 | 0.27778 |
| 46 | 0.14005 | 0.05564 | 0.27778 |
| 47 | 0.14290 | −0.03462 | 0.27778 |
| 48 | 0.14886 | 0.05647 | 0.27778 |
| 49 | 0.15174 | −0.03449 | 0.27778 |
| 50 | 0.15768 | 0.05689 | 0.27778 |
| 51 | 0.16059 | −0.03451 | 0.27778 |
| 52 | 0.16653 | 0.05689 | 0.27778 |
| 53 | 0.16944 | −0.03468 | 0.27778 |
| 54 | 0.17536 | 0.05644 | 0.27778 |
| 55 | 0.17827 | −0.03500 | 0.27778 |
| 56 | 0.18416 | 0.05552 | 0.27778 |
| 57 | 0.18711 | −0.03543 | 0.27778 |
| 58 | 0.19289 | 0.05410 | 0.27778 |
| 59 | 0.19594 | −0.03598 | 0.27778 |
| 60 | 0.20152 | 0.05215 | 0.27778 |
| 61 | 0.20476 | −0.03664 | 0.27778 |
| 62 | 0.21000 | 0.04965 | 0.27778 |
| 63 | 0.21357 | −0.03738 | 0.27778 |
| 64 | 0.21832 | 0.04664 | 0.27778 |
| 65 | 0.22238 | −0.03826 | 0.27778 |
| 66 | 0.22646 | 0.04321 | 0.27778 |
| 67 | 0.23115 | −0.03939 | 0.27778 |
| 68 | 0.23447 | 0.03946 | 0.27778 |
| 69 | 0.23989 | −0.04080 | 0.27778 |
| 70 | 0.24239 | 0.03553 | 0.27778 |
| 71 | 0.24855 | −0.04253 | 0.27778 |
| 72 | 0.25023 | 0.03142 | 0.27778 |
| 73 | 0.25715 | −0.04462 | 0.27778 |
| 74 | 0.25800 | 0.02718 | 0.27778 |
| 75 | 0.26567 | −0.04699 | 0.27778 |
| 76 | 0.26573 | 0.02288 | 0.27778 |
| 77 | 0.27342 | 0.01850 | 0.27778 |
| 78 | 0.27413 | −0.04956 | 0.27778 |
| 79 | 0.28104 | 0.01402 | 0.27778 |
| 80 | 0.28257 | −0.05223 | 0.27778 |
| 81 | 0.28860 | 0.00942 | 0.27778 |
| 82 | 0.29097 | −0.05501 | 0.27778 |
| 83 | 0.29608 | 0.00470 | 0.27778 |
| 84 | 0.29932 | −0.05793 | 0.27778 |
| 85 | 0.30348 | −0.00013 | 0.27778 |
| 86 | 0.30761 | −0.06100 | 0.27778 |
| 87 | 0.31081 | −0.00508 | 0.27778 |
| 88 | 0.31585 | −0.06421 | 0.27778 |
| 89 | 0.31807 | −0.01013 | 0.27778 |
| 90 | 0.32404 | −0.06755 | 0.27778 |
| 91 | 0.32527 | −0.01529 | 0.27778 |
| 92 | 0.33219 | −0.07101 | 0.27778 |
| 93 | 0.33239 | −0.02053 | 0.27778 |
| 94 | 0.33944 | −0.02589 | 0.27778 |
| 95 | 0.34083 | −0.07176 | 0.27778 |
| 96 | 0.34574 | −0.03208 | 0.27778 |
| 97 | 0.34739 | −0.06628 | 0.27778 |
| 98 | 0.34911 | −0.04012 | 0.27778 |
| 99 | 0.34961 | −0.05771 | 0.27778 |

TABLE I-continued

Non-Dimensionalized [X Y Z/Span Height]

| N | X | Y | Z |
|---|---|---|---|
| 100 | 0.35004 | −0.04893 | 0.27778 |
| 1 | −0.03288 | −0.03174 | 0.30556 |
| 2 | −0.03277 | −0.02276 | 0.30556 |
| 3 | −0.03249 | −0.01378 | 0.30556 |
| 4 | −0.03217 | −0.00481 | 0.30556 |
| 5 | −0.03178 | −0.04065 | 0.30556 |
| 6 | −0.03027 | −0.04951 | 0.30556 |
| 7 | −0.03025 | 0.00392 | 0.30556 |
| 8 | −0.02500 | −0.05660 | 0.30556 |
| 9 | −0.02487 | 0.01097 | 0.30556 |
| 10 | −0.01684 | 0.01478 | 0.30556 |
| 11 | −0.01656 | −0.05916 | 0.30556 |
| 12 | −0.00793 | 0.01462 | 0.30556 |
| 13 | −0.00759 | −0.05869 | 0.30556 |
| 14 | 0.00090 | 0.01289 | 0.30556 |
| 15 | 0.00137 | −0.05796 | 0.30556 |
| 16 | 0.00985 | 0.01264 | 0.30556 |
| 17 | 0.01028 | −0.05691 | 0.30556 |
| 18 | 0.01862 | 0.01445 | 0.30556 |
| 19 | 0.01915 | −0.05545 | 0.30556 |
| 20 | 0.02664 | 0.01843 | 0.30556 |
| 21 | 0.02791 | −0.05350 | 0.30556 |
| 22 | 0.03426 | 0.02316 | 0.30556 |
| 23 | 0.03657 | −0.05113 | 0.30556 |
| 24 | 0.04193 | 0.02786 | 0.30556 |
| 25 | 0.04521 | −0.04867 | 0.30556 |
| 26 | 0.04961 | 0.03249 | 0.30556 |
| 27 | 0.05376 | −0.04599 | 0.30556 |
| 28 | 0.05786 | 0.03598 | 0.30556 |
| 29 | 0.06204 | −0.04257 | 0.30556 |
| 30 | 0.06646 | 0.03868 | 0.30556 |
| 31 | 0.07081 | −0.04065 | 0.30556 |
| 32 | 0.07498 | 0.04150 | 0.30556 |
| 33 | 0.07959 | −0.03876 | 0.30556 |
| 34 | 0.08347 | 0.04443 | 0.30556 |
| 35 | 0.08839 | −0.03693 | 0.30556 |
| 36 | 0.09193 | 0.04741 | 0.30556 |
| 37 | 0.09720 | −0.03520 | 0.30556 |
| 38 | 0.10038 | 0.05046 | 0.30556 |
| 39 | 0.10604 | −0.03361 | 0.30556 |
| 40 | 0.10888 | 0.05327 | 0.30556 |
| 41 | 0.11491 | −0.03217 | 0.30556 |
| 42 | 0.11788 | 0.05370 | 0.30556 |
| 43 | 0.12381 | −0.03093 | 0.30556 |
| 44 | 0.12647 | 0.05617 | 0.30556 |
| 45 | 0.13273 | −0.02990 | 0.30556 |
| 46 | 0.13506 | 0.05882 | 0.30556 |
| 47 | 0.14167 | −0.02910 | 0.30556 |
| 48 | 0.14374 | 0.06112 | 0.30556 |
| 49 | 0.15064 | −0.02851 | 0.30556 |
| 50 | 0.15253 | 0.06295 | 0.30556 |
| 51 | 0.15961 | −0.02816 | 0.30556 |
| 52 | 0.16143 | 0.06418 | 0.30556 |
| 53 | 0.16859 | −0.02809 | 0.30556 |
| 54 | 0.17039 | 0.06462 | 0.30556 |
| 55 | 0.17756 | −0.02829 | 0.30556 |
| 56 | 0.17935 | 0.06428 | 0.30556 |
| 57 | 0.18652 | −0.02878 | 0.30556 |
| 58 | 0.18827 | 0.06317 | 0.30556 |
| 59 | 0.19547 | −0.02952 | 0.30556 |
| 60 | 0.19706 | 0.06131 | 0.30556 |
| 61 | 0.20440 | −0.03053 | 0.30556 |
| 62 | 0.20567 | 0.05878 | 0.30556 |
| 63 | 0.21330 | −0.03178 | 0.30556 |
| 64 | 0.21406 | 0.05558 | 0.30556 |
| 65 | 0.22217 | −0.03326 | 0.30556 |
| 66 | 0.22219 | 0.05178 | 0.30556 |
| 67 | 0.23005 | 0.04743 | 0.30556 |
| 68 | 0.23099 | −0.03494 | 0.30556 |
| 69 | 0.23763 | 0.04261 | 0.30556 |
| 70 | 0.23976 | −0.03689 | 0.30556 |
| 71 | 0.24497 | 0.03743 | 0.30556 |
| 72 | 0.24842 | −0.03928 | 0.30556 |
| 73 | 0.25212 | 0.03201 | 0.30556 |
| 74 | 0.25691 | −0.04218 | 0.30556 |
| 75 | 0.25917 | 0.02642 | 0.30556 |
| 76 | 0.26525 | −0.04551 | 0.30556 |
| 77 | 0.26613 | 0.02074 | 0.30556 |
| 78 | 0.27301 | 0.01497 | 0.30556 |
| 79 | 0.27347 | −0.04913 | 0.30556 |
| 80 | 0.27980 | 0.00908 | 0.30556 |
| 81 | 0.28160 | −0.05296 | 0.30556 |
| 82 | 0.28646 | 0.00306 | 0.30556 |
| 83 | 0.28968 | −0.05690 | 0.30556 |
| 84 | 0.29299 | −0.00310 | 0.30556 |
| 85 | 0.29768 | −0.06097 | 0.30556 |
| 86 | 0.29939 | −0.00940 | 0.30556 |
| 87 | 0.30557 | −0.06527 | 0.30556 |
| 88 | 0.30566 | −0.01582 | 0.30556 |
| 89 | 0.31182 | −0.02237 | 0.30556 |
| 90 | 0.31330 | −0.06983 | 0.30556 |
| 91 | 0.31785 | −0.02902 | 0.30556 |
| 92 | 0.32090 | −0.07462 | 0.30556 |
| 93 | 0.32377 | −0.03578 | 0.30556 |
| 94 | 0.32840 | −0.07956 | 0.30556 |
| 95 | 0.32959 | −0.04262 | 0.30556 |
| 96 | 0.33532 | −0.04954 | 0.30556 |
| 97 | 0.33698 | −0.08094 | 0.30556 |
| 98 | 0.34090 | −0.05658 | 0.30556 |
| 99 | 0.34212 | −0.07404 | 0.30556 |
| 100 | 0.34298 | −0.06521 | 0.30556 |
| 1 | −0.03177 | −0.04166 | 0.33333 |
| 2 | −0.03143 | −0.03254 | 0.33333 |
| 3 | −0.03092 | −0.02344 | 0.33333 |
| 4 | −0.03042 | −0.05065 | 0.33333 |
| 5 | −0.03038 | −0.01434 | 0.33333 |
| 6 | −0.02982 | −0.00524 | 0.33333 |
| 7 | −0.02752 | 0.00354 | 0.33333 |
| 8 | −0.02519 | −0.05788 | 0.33333 |
| 9 | −0.02159 | 0.01027 | 0.33333 |
| 10 | −0.01651 | −0.06027 | 0.33333 |
| 11 | −0.01303 | 0.01314 | 0.33333 |
| 12 | −0.00740 | −0.06054 | 0.33333 |
| 13 | −0.00406 | 0.01181 | 0.33333 |
| 14 | 0.00170 | −0.06013 | 0.33333 |
| 15 | 0.00485 | 0.00987 | 0.33333 |
| 16 | 0.01078 | −0.05924 | 0.33333 |
| 17 | 0.01397 | 0.00934 | 0.33333 |
| 18 | 0.01979 | −0.05788 | 0.33333 |
| 19 | 0.02277 | 0.01138 | 0.33333 |
| 20 | 0.02869 | −0.05588 | 0.33333 |
| 21 | 0.03049 | 0.01616 | 0.33333 |
| 22 | 0.03740 | −0.05319 | 0.33333 |
| 23 | 0.03749 | 0.02200 | 0.33333 |
| 24 | 0.04457 | 0.02776 | 0.33333 |
| 25 | 0.04592 | −0.04996 | 0.33333 |
| 26 | 0.05173 | 0.03340 | 0.33333 |
| 27 | 0.05437 | −0.04656 | 0.33333 |
| 28 | 0.05978 | 0.03763 | 0.33333 |
| 29 | 0.06238 | −0.04222 | 0.33333 |
| 30 | 0.06819 | 0.04116 | 0.33333 |
| 31 | 0.07111 | −0.03962 | 0.33333 |
| 32 | 0.07656 | 0.04474 | 0.33333 |
| 33 | 0.07989 | −0.03715 | 0.33333 |
| 34 | 0.08494 | 0.04834 | 0.33333 |
| 35 | 0.08868 | −0.03475 | 0.33333 |
| 36 | 0.09332 | 0.05195 | 0.33333 |
| 37 | 0.09750 | −0.03244 | 0.33333 |
| 38 | 0.10168 | 0.05557 | 0.33333 |
| 39 | 0.10636 | −0.03030 | 0.33333 |
| 40 | 0.11018 | 0.05876 | 0.33333 |
| 41 | 0.11528 | −0.02837 | 0.33333 |
| 42 | 0.11924 | 0.05914 | 0.33333 |
| 43 | 0.12424 | −0.02670 | 0.33333 |
| 44 | 0.12768 | 0.06258 | 0.33333 |
| 45 | 0.13325 | −0.02532 | 0.33333 |
| 46 | 0.13622 | 0.06578 | 0.33333 |
| 47 | 0.14230 | −0.02423 | 0.33333 |
| 48 | 0.14489 | 0.06862 | 0.33333 |
| 49 | 0.15138 | −0.02343 | 0.33333 |
| 50 | 0.15370 | 0.07093 | 0.33333 |
| 51 | 0.16049 | −0.02292 | 0.33333 |

TABLE I-continued

Non-Dimensionalized [X Y Z/Span Height]

| N | X | Y | Z |
|---|---|---|---|
| 52 | 0.16267 | 0.07255 | 0.33333 |
| 53 | 0.16960 | −0.02272 | 0.33333 |
| 54 | 0.17176 | 0.07332 | 0.33333 |
| 55 | 0.17872 | −0.02280 | 0.33333 |
| 56 | 0.18086 | 0.07308 | 0.33333 |
| 57 | 0.18782 | −0.02315 | 0.33333 |
| 58 | 0.18986 | 0.07176 | 0.33333 |
| 59 | 0.19692 | −0.02378 | 0.33333 |
| 60 | 0.19867 | 0.06941 | 0.33333 |
| 61 | 0.20599 | −0.02470 | 0.33333 |
| 62 | 0.20720 | 0.06619 | 0.33333 |
| 63 | 0.21503 | −0.02590 | 0.33333 |
| 64 | 0.21541 | 0.06222 | 0.33333 |
| 65 | 0.22327 | 0.05760 | 0.33333 |
| 66 | 0.22402 | −0.02741 | 0.33333 |
| 67 | 0.23122 | 0.05317 | 0.33333 |
| 68 | 0.23265 | −0.03032 | 0.33333 |
| 69 | 0.23906 | 0.04852 | 0.33333 |
| 70 | 0.24117 | −0.03354 | 0.33333 |
| 71 | 0.24599 | 0.04261 | 0.33333 |
| 72 | 0.24977 | −0.03653 | 0.33333 |
| 73 | 0.25265 | 0.03638 | 0.33333 |
| 74 | 0.25813 | −0.04017 | 0.33333 |
| 75 | 0.25911 | 0.02996 | 0.33333 |
| 76 | 0.26543 | 0.02338 | 0.33333 |
| 77 | 0.26623 | −0.04435 | 0.33333 |
| 78 | 0.27163 | 0.01669 | 0.33333 |
| 79 | 0.27411 | −0.04893 | 0.33333 |
| 80 | 0.27772 | 0.00991 | 0.33333 |
| 81 | 0.28187 | −0.05374 | 0.33333 |
| 82 | 0.28369 | 0.00302 | 0.33333 |
| 83 | 0.28950 | −0.00400 | 0.33333 |
| 84 | 0.28953 | −0.05869 | 0.33333 |
| 85 | 0.29516 | −0.01114 | 0.33333 |
| 86 | 0.29706 | −0.06384 | 0.33333 |
| 87 | 0.30065 | −0.01842 | 0.33333 |
| 88 | 0.30439 | −0.06924 | 0.33333 |
| 89 | 0.30597 | −0.02581 | 0.33333 |
| 90 | 0.31115 | −0.03331 | 0.33333 |
| 91 | 0.31149 | −0.07494 | 0.33333 |
| 92 | 0.31619 | −0.04092 | 0.33333 |
| 93 | 0.31842 | −0.08087 | 0.33333 |
| 94 | 0.32110 | −0.04861 | 0.33333 |
| 95 | 0.32522 | −0.08695 | 0.33333 |
| 96 | 0.32587 | −0.05638 | 0.33333 |
| 97 | 0.33052 | −0.06422 | 0.33333 |
| 98 | 0.33366 | −0.08845 | 0.33333 |
| 99 | 0.33514 | −0.07207 | 0.33333 |
| 100 | 0.33763 | −0.08056 | 0.33333 |
| 1 | 0.03092 | −0.02723 | 0.36111 |
| 2 | 0.03152 | −0.01927 | 0.36111 |
| 3 | 0.03210 | −0.01131 | 0.36111 |
| 4 | 0.03269 | −0.00335 | 0.36111 |
| 5 | 0.03328 | 0.00461 | 0.36111 |
| 6 | 0.03347 | −0.03462 | 0.36111 |
| 7 | 0.03386 | 0.01257 | 0.36111 |
| 8 | 0.03684 | 0.01979 | 0.36111 |
| 9 | 0.03721 | −0.04167 | 0.36111 |
| 10 | 0.04102 | −0.04867 | 0.36111 |
| 11 | 0.04252 | 0.02540 | 0.36111 |
| 12 | 0.04825 | −0.04964 | 0.36111 |
| 13 | 0.04831 | 0.03090 | 0.36111 |
| 14 | 0.05425 | 0.03621 | 0.36111 |
| 15 | 0.05544 | −0.04618 | 0.36111 |
| 16 | 0.06100 | 0.04045 | 0.36111 |
| 17 | 0.06222 | −0.04194 | 0.36111 |
| 18 | 0.06804 | 0.04421 | 0.36111 |
| 19 | 0.06958 | −0.03895 | 0.36111 |
| 20 | 0.07507 | 0.04798 | 0.36111 |
| 21 | 0.07714 | −0.03636 | 0.36111 |
| 22 | 0.08215 | 0.05167 | 0.36111 |
| 23 | 0.08471 | −0.03386 | 0.36111 |
| 24 | 0.08927 | 0.05529 | 0.36111 |
| 25 | 0.09232 | −0.03143 | 0.36111 |
| 26 | 0.09640 | 0.05885 | 0.36111 |
| 27 | 0.09996 | −0.02914 | 0.36111 |

TABLE I-continued

Non-Dimensionalized [X Y Z/Span Height]

| N | X | Y | Z |
|---|---|---|---|
| 28 | 0.10356 | 0.06238 | 0.36111 |
| 29 | 0.10765 | −0.02700 | 0.36111 |
| 30 | 0.11083 | 0.06558 | 0.36111 |
| 31 | 0.11539 | −0.02506 | 0.36111 |
| 32 | 0.11879 | 0.06645 | 0.36111 |
| 33 | 0.12318 | −0.02333 | 0.36111 |
| 34 | 0.12615 | 0.06940 | 0.36111 |
| 35 | 0.13102 | −0.02184 | 0.36111 |
| 36 | 0.13349 | 0.07253 | 0.36111 |
| 37 | 0.13891 | −0.02062 | 0.36111 |
| 38 | 0.14096 | 0.07536 | 0.36111 |
| 39 | 0.14683 | −0.01967 | 0.36111 |
| 40 | 0.14855 | 0.07781 | 0.36111 |
| 41 | 0.15478 | −0.01900 | 0.36111 |
| 42 | 0.15629 | 0.07976 | 0.36111 |
| 43 | 0.16275 | −0.01860 | 0.36111 |
| 44 | 0.16415 | 0.08111 | 0.36111 |
| 45 | 0.17073 | −0.01846 | 0.36111 |
| 46 | 0.17210 | 0.08179 | 0.36111 |
| 47 | 0.17871 | −0.01857 | 0.36111 |
| 48 | 0.18007 | 0.08169 | 0.36111 |
| 49 | 0.18668 | −0.01895 | 0.36111 |
| 50 | 0.18799 | 0.08073 | 0.36111 |
| 51 | 0.19463 | −0.01958 | 0.36111 |
| 52 | 0.19576 | 0.07895 | 0.36111 |
| 53 | 0.20256 | −0.02047 | 0.36111 |
| 54 | 0.20332 | 0.07639 | 0.36111 |
| 55 | 0.21047 | −0.02161 | 0.36111 |
| 56 | 0.21063 | 0.07319 | 0.36111 |
| 57 | 0.21765 | 0.06940 | 0.36111 |
| 58 | 0.21833 | −0.02299 | 0.36111 |
| 59 | 0.22439 | 0.06513 | 0.36111 |
| 60 | 0.22614 | −0.02462 | 0.36111 |
| 61 | 0.23095 | 0.06060 | 0.36111 |
| 62 | 0.23369 | −0.02709 | 0.36111 |
| 63 | 0.23778 | 0.05644 | 0.36111 |
| 64 | 0.24097 | −0.03038 | 0.36111 |
| 65 | 0.24392 | 0.05139 | 0.36111 |
| 66 | 0.24841 | −0.03326 | 0.36111 |
| 67 | 0.24956 | 0.04576 | 0.36111 |
| 68 | 0.25501 | 0.03992 | 0.36111 |
| 69 | 0.25562 | −0.03665 | 0.36111 |
| 70 | 0.26029 | 0.03393 | 0.36111 |
| 71 | 0.26260 | −0.04053 | 0.36111 |
| 72 | 0.26542 | 0.02782 | 0.36111 |
| 73 | 0.26933 | −0.04482 | 0.36111 |
| 74 | 0.27045 | 0.02162 | 0.36111 |
| 75 | 0.27539 | 0.01535 | 0.36111 |
| 76 | 0.27586 | −0.04940 | 0.36111 |
| 77 | 0.28023 | 0.00900 | 0.36111 |
| 78 | 0.28227 | −0.05416 | 0.36111 |
| 79 | 0.28496 | 0.00259 | 0.36111 |
| 80 | 0.28858 | −0.05907 | 0.36111 |
| 81 | 0.28958 | −0.00393 | 0.36111 |
| 82 | 0.29407 | −0.01053 | 0.36111 |
| 83 | 0.29475 | −0.06412 | 0.36111 |
| 84 | 0.29843 | −0.01721 | 0.36111 |
| 85 | 0.30076 | −0.06937 | 0.36111 |
| 86 | 0.30264 | −0.02398 | 0.36111 |
| 87 | 0.30657 | −0.07482 | 0.36111 |
| 88 | 0.30674 | −0.03084 | 0.36111 |
| 89 | 0.31071 | −0.03775 | 0.36111 |
| 90 | 0.31222 | −0.08047 | 0.36111 |
| 91 | 0.31457 | −0.04474 | 0.36111 |
| 92 | 0.31771 | −0.08625 | 0.36111 |
| 93 | 0.31832 | −0.05179 | 0.36111 |
| 94 | 0.32197 | −0.05889 | 0.36111 |
| 95 | 0.32311 | −0.09213 | 0.36111 |
| 96 | 0.32551 | −0.06603 | 0.36111 |
| 97 | 0.32897 | −0.07323 | 0.36111 |
| 98 | 0.33033 | −0.09410 | 0.36111 |
| 99 | 0.33235 | −0.08046 | 0.36111 |
| 100 | 0.33473 | −0.08796 | 0.36111 |
| 1 | 0.00684 | −0.03833 | 0.38889 |
| 2 | 0.00849 | −0.02998 | 0.38889 |
| 3 | 0.00861 | −0.04653 | 0.38889 |

TABLE I-continued

Non-Dimensionalized [X Y Z/Span Height]

| N | X | Y | Z |
|---|---|---|---|
| 4 | 0.01148 | −0.02197 | 0.38889 |
| 5 | 0.01422 | −0.05291 | 0.38889 |
| 6 | 0.01499 | −0.01420 | 0.38889 |
| 7 | 0.01880 | −0.00655 | 0.38889 |
| 8 | 0.02201 | −0.05611 | 0.38889 |
| 9 | 0.02296 | 0.00090 | 0.38889 |
| 10 | 0.02751 | 0.00812 | 0.38889 |
| 11 | 0.03040 | −0.05498 | 0.38889 |
| 12 | 0.03247 | 0.01506 | 0.38889 |
| 13 | 0.03785 | 0.02169 | 0.38889 |
| 14 | 0.03838 | −0.05196 | 0.38889 |
| 15 | 0.04359 | 0.02800 | 0.38889 |
| 16 | 0.04625 | −0.04866 | 0.38889 |
| 17 | 0.04952 | 0.03415 | 0.38889 |
| 18 | 0.05390 | −0.04490 | 0.38889 |
| 19 | 0.05566 | 0.04005 | 0.38889 |
| 20 | 0.06158 | −0.04116 | 0.38889 |
| 21 | 0.06265 | 0.04495 | 0.38889 |
| 22 | 0.06942 | −0.03778 | 0.38889 |
| 23 | 0.06982 | 0.04960 | 0.38889 |
| 24 | 0.07698 | 0.05424 | 0.38889 |
| 25 | 0.07739 | −0.03472 | 0.38889 |
| 26 | 0.08427 | 0.05868 | 0.38889 |
| 27 | 0.08543 | −0.03184 | 0.38889 |
| 28 | 0.09166 | 0.06294 | 0.38889 |
| 29 | 0.09350 | −0.02907 | 0.38889 |
| 30 | 0.09914 | 0.06707 | 0.38889 |
| 31 | 0.10163 | −0.02647 | 0.38889 |
| 32 | 0.10667 | 0.07110 | 0.38889 |
| 33 | 0.10982 | −0.02408 | 0.38889 |
| 34 | 0.11438 | 0.07472 | 0.38889 |
| 35 | 0.11809 | −0.02196 | 0.38889 |
| 36 | 0.12231 | 0.07788 | 0.38889 |
| 37 | 0.12644 | −0.02017 | 0.38889 |
| 38 | 0.13013 | 0.08132 | 0.38889 |
| 39 | 0.13485 | −0.01873 | 0.38889 |
| 40 | 0.13809 | 0.08440 | 0.38889 |
| 41 | 0.14331 | −0.01764 | 0.38889 |
| 42 | 0.14622 | 0.08700 | 0.38889 |
| 43 | 0.15181 | −0.01687 | 0.38889 |
| 44 | 0.15451 | 0.08901 | 0.38889 |
| 45 | 0.16033 | −0.01642 | 0.38889 |
| 46 | 0.16294 | 0.09031 | 0.38889 |
| 47 | 0.16887 | −0.01630 | 0.38889 |
| 48 | 0.17146 | 0.09084 | 0.38889 |
| 49 | 0.17740 | −0.01651 | 0.38889 |
| 50 | 0.17998 | 0.09050 | 0.38889 |
| 51 | 0.18592 | −0.01703 | 0.38889 |
| 52 | 0.18842 | 0.08925 | 0.38889 |
| 53 | 0.19442 | −0.01788 | 0.38889 |
| 54 | 0.19668 | 0.08712 | 0.38889 |
| 55 | 0.20288 | −0.01905 | 0.38889 |
| 56 | 0.20468 | 0.08415 | 0.38889 |
| 57 | 0.21128 | −0.02052 | 0.38889 |
| 58 | 0.21239 | 0.08049 | 0.38889 |
| 59 | 0.21963 | −0.02231 | 0.38889 |
| 60 | 0.21979 | 0.07624 | 0.38889 |
| 61 | 0.22687 | 0.07148 | 0.38889 |
| 62 | 0.22790 | −0.02440 | 0.38889 |
| 63 | 0.23364 | 0.06627 | 0.38889 |
| 64 | 0.23607 | −0.02687 | 0.38889 |
| 65 | 0.24008 | 0.06067 | 0.38889 |
| 66 | 0.24409 | −0.02981 | 0.38889 |
| 67 | 0.24621 | 0.05473 | 0.38889 |
| 68 | 0.25186 | −0.03331 | 0.38889 |
| 69 | 0.25206 | 0.04853 | 0.38889 |
| 70 | 0.25768 | 0.04210 | 0.38889 |
| 71 | 0.25937 | −0.03737 | 0.38889 |
| 72 | 0.26312 | 0.03552 | 0.38889 |
| 73 | 0.26660 | −0.04191 | 0.38889 |
| 74 | 0.26841 | 0.02882 | 0.38889 |
| 75 | 0.27353 | −0.04688 | 0.38889 |
| 76 | 0.27359 | 0.02203 | 0.38889 |
| 77 | 0.27864 | 0.01515 | 0.38889 |
| 78 | 0.28025 | −0.05216 | 0.38889 |
| 79 | 0.28359 | 0.00819 | 0.38889 |
| 80 | 0.28681 | −0.05762 | 0.38889 |
| 81 | 0.28841 | 0.00115 | 0.38889 |
| 82 | 0.29311 | −0.00598 | 0.38889 |
| 83 | 0.29320 | −0.06328 | 0.38889 |
| 84 | 0.29765 | −0.01321 | 0.38889 |
| 85 | 0.29941 | −0.06914 | 0.38889 |
| 86 | 0.30200 | −0.02054 | 0.38889 |
| 87 | 0.30542 | −0.07519 | 0.38889 |
| 88 | 0.30618 | −0.02799 | 0.38889 |
| 89 | 0.31020 | −0.03552 | 0.38889 |
| 90 | 0.31124 | −0.08143 | 0.38889 |
| 91 | 0.31410 | −0.04312 | 0.38889 |
| 92 | 0.31691 | −0.08782 | 0.38889 |
| 93 | 0.31788 | −0.05077 | 0.38889 |
| 94 | 0.32155 | −0.05847 | 0.38889 |
| 95 | 0.32247 | −0.09430 | 0.38889 |
| 96 | 0.32513 | −0.06622 | 0.38889 |
| 97 | 0.32863 | −0.07400 | 0.38889 |
| 98 | 0.33016 | −0.09637 | 0.38889 |
| 99 | 0.33203 | −0.08184 | 0.38889 |
| 100 | 0.33483 | −0.08986 | 0.38889 |
| 1 | 0.00761 | −0.03207 | 0.41666 |
| 2 | 0.00783 | −0.04065 | 0.41666 |
| 3 | 0.00946 | −0.02362 | 0.41666 |
| 4 | 0.01218 | −0.04804 | 0.41666 |
| 5 | 0.01238 | −0.01546 | 0.41666 |
| 6 | 0.01593 | −0.00756 | 0.41666 |
| 7 | 0.01937 | −0.05272 | 0.41666 |
| 8 | 0.02000 | 0.00007 | 0.41666 |
| 9 | 0.02452 | 0.00746 | 0.41666 |
| 10 | 0.02792 | −0.05293 | 0.41666 |
| 11 | 0.02941 | 0.01460 | 0.41666 |
| 12 | 0.03463 | 0.02151 | 0.41666 |
| 13 | 0.03617 | −0.05036 | 0.41666 |
| 14 | 0.04012 | 0.02821 | 0.41666 |
| 15 | 0.04400 | −0.04667 | 0.41666 |
| 16 | 0.04584 | 0.03472 | 0.41666 |
| 17 | 0.05165 | −0.04260 | 0.41666 |
| 18 | 0.05179 | 0.04100 | 0.41666 |
| 19 | 0.05806 | 0.04696 | 0.41666 |
| 20 | 0.05933 | −0.03860 | 0.41666 |
| 21 | 0.06498 | 0.05216 | 0.41666 |
| 22 | 0.06715 | −0.03489 | 0.41666 |
| 23 | 0.07192 | 0.05736 | 0.41666 |
| 24 | 0.07513 | −0.03153 | 0.41666 |
| 25 | 0.07895 | 0.06240 | 0.41666 |
| 26 | 0.08322 | −0.02845 | 0.41666 |
| 27 | 0.08618 | 0.06718 | 0.41666 |
| 28 | 0.09138 | −0.02554 | 0.41666 |
| 29 | 0.09355 | 0.07170 | 0.41666 |
| 30 | 0.09960 | −0.02282 | 0.41666 |
| 31 | 0.10104 | 0.07606 | 0.41666 |
| 32 | 0.10790 | −0.02035 | 0.41666 |
| 33 | 0.10863 | 0.08023 | 0.41666 |
| 34 | 0.11629 | −0.01820 | 0.41666 |
| 35 | 0.11639 | 0.08409 | 0.41666 |
| 36 | 0.12428 | 0.08765 | 0.41666 |
| 37 | 0.12476 | −0.01642 | 0.41666 |
| 38 | 0.13233 | 0.09083 | 0.41666 |
| 39 | 0.13331 | −0.01504 | 0.41666 |
| 40 | 0.14055 | 0.09355 | 0.41666 |
| 41 | 0.14191 | −0.01403 | 0.41666 |
| 42 | 0.14894 | 0.09567 | 0.41666 |
| 43 | 0.15054 | −0.01339 | 0.41666 |
| 44 | 0.15749 | 0.09705 | 0.41666 |
| 45 | 0.15920 | −0.01309 | 0.41666 |
| 46 | 0.16613 | 0.09765 | 0.41666 |
| 47 | 0.16786 | −0.01313 | 0.41666 |
| 48 | 0.17478 | 0.09743 | 0.41666 |
| 49 | 0.17651 | −0.01350 | 0.41666 |
| 50 | 0.18336 | 0.09635 | 0.41666 |
| 51 | 0.18514 | −0.01421 | 0.41666 |
| 52 | 0.19179 | 0.09438 | 0.41666 |
| 53 | 0.19373 | −0.01528 | 0.41666 |
| 54 | 0.19999 | 0.09159 | 0.41666 |
| 55 | 0.20228 | −0.01668 | 0.41666 |

TABLE I-continued

Non-Dimensionalized [X Y Z/Span Height]

| N | X | Y | Z |
|---|---|---|---|
| 56 | 0.20791 | 0.08809 | 0.41666 |
| 57 | 0.21076 | −0.01840 | 0.41666 |
| 58 | 0.21552 | 0.08398 | 0.41666 |
| 59 | 0.21918 | −0.02044 | 0.41666 |
| 60 | 0.22282 | 0.07932 | 0.41666 |
| 61 | 0.22751 | −0.02282 | 0.41666 |
| 62 | 0.22980 | 0.07420 | 0.41666 |
| 63 | 0.23573 | −0.02554 | 0.41666 |
| 64 | 0.23647 | 0.06867 | 0.41666 |
| 65 | 0.24281 | 0.06278 | 0.41666 |
| 66 | 0.24379 | −0.02868 | 0.41666 |
| 67 | 0.24887 | 0.05660 | 0.41666 |
| 68 | 0.25164 | −0.03234 | 0.41666 |
| 69 | 0.25466 | 0.05017 | 0.41666 |
| 70 | 0.25923 | −0.03650 | 0.41666 |
| 71 | 0.26024 | 0.04354 | 0.41666 |
| 72 | 0.26565 | 0.03677 | 0.41666 |
| 73 | 0.26654 | −0.04114 | 0.41666 |
| 74 | 0.27093 | 0.02990 | 0.41666 |
| 75 | 0.27356 | −0.04620 | 0.41666 |
| 76 | 0.27609 | 0.02295 | 0.41666 |
| 77 | 0.28033 | −0.05162 | 0.41666 |
| 78 | 0.28114 | 0.01591 | 0.41666 |
| 79 | 0.28607 | 0.00880 | 0.41666 |
| 80 | 0.28688 | −0.05728 | 0.41666 |
| 81 | 0.29088 | 0.00159 | 0.41666 |
| 82 | 0.29323 | −0.06316 | 0.41666 |
| 83 | 0.29554 | −0.00570 | 0.41666 |
| 84 | 0.29941 | −0.06923 | 0.41666 |
| 85 | 0.30004 | −0.01310 | 0.41666 |
| 86 | 0.30432 | −0.02062 | 0.41666 |
| 87 | 0.30540 | −0.07548 | 0.41666 |
| 88 | 0.30844 | −0.02824 | 0.41666 |
| 89 | 0.31123 | −0.08189 | 0.41666 |
| 90 | 0.31239 | −0.03595 | 0.41666 |
| 91 | 0.31621 | −0.04372 | 0.41666 |
| 92 | 0.31692 | −0.08842 | 0.41666 |
| 93 | 0.31993 | −0.05154 | 0.41666 |
| 94 | 0.32250 | −0.09503 | 0.41666 |
| 95 | 0.32352 | −0.05941 | 0.41666 |
| 96 | 0.32704 | −0.06733 | 0.41666 |
| 97 | 0.33027 | −0.09754 | 0.41666 |
| 98 | 0.33046 | −0.07528 | 0.41666 |
| 99 | 0.33377 | −0.08329 | 0.41666 |
| 100 | 0.33589 | −0.09155 | 0.41666 |
| 1 | 0.00806 | −0.03447 | 0.44445 |
| 2 | 0.00857 | −0.02573 | 0.44445 |
| 3 | 0.01048 | −0.01715 | 0.44445 |
| 4 | 0.01074 | −0.04272 | 0.44445 |
| 5 | 0.01327 | −0.00880 | 0.44445 |
| 6 | 0.01670 | −0.00072 | 0.44445 |
| 7 | 0.01705 | −0.04873 | 0.44445 |
| 8 | 0.02069 | 0.00711 | 0.44445 |
| 9 | 0.02518 | 0.01466 | 0.44445 |
| 10 | 0.02549 | −0.05055 | 0.44445 |
| 11 | 0.03007 | 0.02195 | 0.44445 |
| 12 | 0.03398 | −0.04837 | 0.44445 |
| 13 | 0.03530 | 0.02901 | 0.44445 |
| 14 | 0.04082 | 0.03585 | 0.44445 |
| 15 | 0.04197 | −0.04476 | 0.44445 |
| 16 | 0.04660 | 0.04246 | 0.44445 |
| 17 | 0.04969 | −0.04053 | 0.44445 |
| 18 | 0.05266 | 0.04883 | 0.44445 |
| 19 | 0.05738 | −0.03628 | 0.44445 |
| 20 | 0.05901 | 0.05489 | 0.44445 |
| 21 | 0.06519 | −0.03225 | 0.44445 |
| 22 | 0.06564 | 0.06067 | 0.44445 |
| 23 | 0.07251 | 0.06615 | 0.44445 |
| 24 | 0.07316 | −0.02855 | 0.44445 |
| 25 | 0.07961 | 0.07132 | 0.44445 |
| 26 | 0.08128 | −0.02521 | 0.44445 |
| 27 | 0.08689 | 0.07622 | 0.44445 |
| 28 | 0.08951 | −0.02210 | 0.44445 |
| 29 | 0.09436 | 0.08087 | 0.44445 |
| 30 | 0.09781 | −0.01924 | 0.44445 |
| 31 | 0.10195 | 0.08528 | 0.44445 |
| 32 | 0.10622 | −0.01668 | 0.44445 |
| 33 | 0.10969 | 0.08944 | 0.44445 |
| 34 | 0.11472 | −0.01447 | 0.44445 |
| 35 | 0.11760 | 0.09326 | 0.44445 |
| 36 | 0.12332 | −0.01267 | 0.44445 |
| 37 | 0.12571 | 0.09664 | 0.44445 |
| 38 | 0.13200 | −0.01131 | 0.44445 |
| 39 | 0.13402 | 0.09951 | 0.44445 |
| 40 | 0.14074 | −0.01038 | 0.44445 |
| 41 | 0.14250 | 0.10178 | 0.44445 |
| 42 | 0.14950 | −0.00985 | 0.44445 |
| 43 | 0.15114 | 0.10336 | 0.44445 |
| 44 | 0.15829 | −0.00967 | 0.44445 |
| 45 | 0.15989 | 0.10416 | 0.44445 |
| 46 | 0.16707 | −0.00985 | 0.44445 |
| 47 | 0.16868 | 0.10413 | 0.44445 |
| 48 | 0.17585 | −0.01039 | 0.44445 |
| 49 | 0.17741 | 0.10329 | 0.44445 |
| 50 | 0.18458 | −0.01129 | 0.44445 |
| 51 | 0.18603 | 0.10160 | 0.44445 |
| 52 | 0.19328 | −0.01254 | 0.44445 |
| 53 | 0.19445 | 0.09908 | 0.44445 |
| 54 | 0.20192 | −0.01415 | 0.44445 |
| 55 | 0.20261 | 0.09583 | 0.44445 |
| 56 | 0.21047 | 0.09191 | 0.44445 |
| 57 | 0.21048 | −0.01611 | 0.44445 |
| 58 | 0.21802 | 0.08741 | 0.44445 |
| 59 | 0.21896 | −0.01841 | 0.44445 |
| 60 | 0.22524 | 0.08243 | 0.44445 |
| 61 | 0.22735 | −0.02104 | 0.44445 |
| 62 | 0.23215 | 0.07699 | 0.44445 |
| 63 | 0.23561 | −0.02403 | 0.44445 |
| 64 | 0.23874 | 0.07118 | 0.44445 |
| 65 | 0.24372 | −0.02742 | 0.44445 |
| 66 | 0.24502 | 0.06503 | 0.44445 |
| 67 | 0.25100 | 0.05860 | 0.44445 |
| 68 | 0.25160 | −0.03127 | 0.44445 |
| 69 | 0.25673 | 0.05195 | 0.44445 |
| 70 | 0.25926 | −0.03560 | 0.44445 |
| 71 | 0.26227 | 0.04512 | 0.44445 |
| 72 | 0.26663 | −0.04037 | 0.44445 |
| 73 | 0.26765 | 0.03817 | 0.44445 |
| 74 | 0.27292 | 0.03113 | 0.44445 |
| 75 | 0.27371 | −0.04557 | 0.44445 |
| 76 | 0.27806 | 0.02401 | 0.44445 |
| 77 | 0.28052 | −0.05113 | 0.44445 |
| 78 | 0.28309 | 0.01680 | 0.44445 |
| 79 | 0.28707 | −0.05698 | 0.44445 |
| 80 | 0.28801 | 0.00952 | 0.44445 |
| 81 | 0.29280 | 0.00216 | 0.44445 |
| 82 | 0.29339 | −0.06308 | 0.44445 |
| 83 | 0.29742 | −0.00532 | 0.44445 |
| 84 | 0.29952 | −0.06938 | 0.44445 |
| 85 | 0.30187 | −0.01289 | 0.44445 |
| 86 | 0.30548 | −0.07583 | 0.44445 |
| 87 | 0.30611 | −0.02058 | 0.44445 |
| 88 | 0.31017 | −0.02837 | 0.44445 |
| 89 | 0.31131 | −0.08241 | 0.44445 |
| 90 | 0.31407 | −0.03625 | 0.44445 |
| 91 | 0.31701 | −0.08910 | 0.44445 |
| 92 | 0.31783 | −0.04419 | 0.44445 |
| 93 | 0.32148 | −0.05218 | 0.44445 |
| 94 | 0.32261 | −0.09586 | 0.44445 |
| 95 | 0.32504 | −0.06022 | 0.44445 |
| 96 | 0.32848 | −0.06830 | 0.44445 |
| 97 | 0.33044 | −0.09868 | 0.44445 |
| 98 | 0.33186 | −0.07641 | 0.44445 |
| 99 | 0.33511 | −0.08457 | 0.44445 |
| 100 | 0.33665 | −0.09304 | 0.44445 |
| 1 | 0.00891 | −0.02885 | 0.47222 |
| 2 | 0.00960 | −0.01998 | 0.47222 |
| 3 | 0.01038 | −0.03757 | 0.47222 |
| 4 | 0.01139 | −0.01126 | 0.47222 |
| 5 | 0.01393 | −0.00273 | 0.47222 |
| 6 | 0.01567 | −0.04459 | 0.47222 |
| 7 | 0.01710 | 0.00559 | 0.47222 |

TABLE I-continued

Non-Dimensionalized [X Y Z/Span Height]

| N | X | Y | Z |
|---|---|---|---|
| 8 | 0.02085 | 0.01367 | 0.47222 |
| 9 | 0.02387 | −0.04776 | 0.47222 |
| 10 | 0.02511 | 0.02148 | 0.47222 |
| 11 | 0.02985 | 0.02902 | 0.47222 |
| 12 | 0.03256 | −0.04614 | 0.47222 |
| 13 | 0.03501 | 0.03628 | 0.47222 |
| 14 | 0.04054 | 0.04327 | 0.47222 |
| 15 | 0.04073 | −0.04261 | 0.47222 |
| 16 | 0.04639 | 0.04997 | 0.47222 |
| 17 | 0.04853 | −0.03832 | 0.47222 |
| 18 | 0.05254 | 0.05642 | 0.47222 |
| 19 | 0.05626 | −0.03386 | 0.47222 |
| 20 | 0.05896 | 0.06259 | 0.47222 |
| 21 | 0.06405 | −0.02956 | 0.47222 |
| 22 | 0.06562 | 0.06850 | 0.47222 |
| 23 | 0.07200 | −0.02555 | 0.47222 |
| 24 | 0.07251 | 0.07414 | 0.47222 |
| 25 | 0.07962 | 0.07950 | 0.47222 |
| 26 | 0.08012 | −0.02188 | 0.47222 |
| 27 | 0.08694 | 0.08458 | 0.47222 |
| 28 | 0.08838 | −0.01855 | 0.47222 |
| 29 | 0.09446 | 0.08935 | 0.47222 |
| 30 | 0.09676 | −0.01556 | 0.47222 |
| 31 | 0.10217 | 0.09379 | 0.47222 |
| 32 | 0.10527 | −0.01291 | 0.47222 |
| 33 | 0.11009 | 0.09787 | 0.47222 |
| 34 | 0.11389 | −0.01067 | 0.47222 |
| 35 | 0.11822 | 0.10150 | 0.47222 |
| 36 | 0.12261 | −0.00888 | 0.47222 |
| 37 | 0.12657 | 0.10460 | 0.47222 |
| 38 | 0.13141 | −0.00755 | 0.47222 |
| 39 | 0.13512 | 0.10710 | 0.47222 |
| 40 | 0.14028 | −0.00666 | 0.47222 |
| 41 | 0.14383 | 0.10893 | 0.47222 |
| 42 | 0.14916 | −0.00620 | 0.47222 |
| 43 | 0.15266 | 0.11003 | 0.47222 |
| 44 | 0.15807 | −0.00615 | 0.47222 |
| 45 | 0.16156 | 0.11033 | 0.47222 |
| 46 | 0.16697 | −0.00647 | 0.47222 |
| 47 | 0.17045 | 0.10981 | 0.47222 |
| 48 | 0.17585 | −0.00717 | 0.47222 |
| 49 | 0.17926 | 0.10848 | 0.47222 |
| 50 | 0.18469 | −0.00824 | 0.47222 |
| 51 | 0.18790 | 0.10635 | 0.47222 |
| 52 | 0.19348 | −0.00968 | 0.47222 |
| 53 | 0.19632 | 0.10344 | 0.47222 |
| 54 | 0.20220 | −0.01150 | 0.47222 |
| 55 | 0.20446 | 0.09985 | 0.47222 |
| 56 | 0.21083 | −0.01368 | 0.47222 |
| 57 | 0.21229 | 0.09561 | 0.47222 |
| 58 | 0.21936 | −0.01621 | 0.47222 |
| 59 | 0.21980 | 0.09082 | 0.47222 |
| 60 | 0.22697 | 0.08555 | 0.47222 |
| 61 | 0.22779 | −0.01910 | 0.47222 |
| 62 | 0.23381 | 0.07984 | 0.47222 |
| 63 | 0.23607 | −0.02236 | 0.47222 |
| 64 | 0.24032 | 0.07377 | 0.47222 |
| 65 | 0.24420 | −0.02601 | 0.47222 |
| 66 | 0.24652 | 0.06738 | 0.47222 |
| 67 | 0.25211 | −0.03011 | 0.47222 |
| 68 | 0.25245 | 0.06073 | 0.47222 |
| 69 | 0.25812 | 0.05387 | 0.47222 |
| 70 | 0.25977 | −0.03466 | 0.47222 |
| 71 | 0.26361 | 0.04686 | 0.47222 |
| 72 | 0.26715 | −0.03963 | 0.47222 |
| 73 | 0.26894 | 0.03972 | 0.47222 |
| 74 | 0.27417 | 0.03250 | 0.47222 |
| 75 | 0.27424 | −0.04501 | 0.47222 |
| 76 | 0.27928 | 0.02521 | 0.47222 |
| 77 | 0.28104 | −0.05076 | 0.47222 |
| 78 | 0.28428 | 0.01785 | 0.47222 |
| 79 | 0.28757 | −0.05682 | 0.47222 |
| 80 | 0.28917 | 0.01039 | 0.47222 |
| 81 | 0.29386 | −0.06312 | 0.47222 |
| 82 | 0.29392 | 0.00286 | 0.47222 |
| 83 | 0.29852 | −0.00476 | 0.47222 |
| 84 | 0.29995 | −0.06963 | 0.47222 |
| 85 | 0.30293 | −0.01250 | 0.47222 |
| 86 | 0.30586 | −0.07628 | 0.47222 |
| 87 | 0.30713 | −0.02034 | 0.47222 |
| 88 | 0.31114 | −0.02829 | 0.47222 |
| 89 | 0.31165 | −0.08304 | 0.47222 |
| 90 | 0.31501 | −0.03632 | 0.47222 |
| 91 | 0.31734 | −0.08990 | 0.47222 |
| 92 | 0.31874 | −0.04441 | 0.47222 |
| 93 | 0.32235 | −0.05255 | 0.47222 |
| 94 | 0.32294 | −0.09683 | 0.47222 |
| 95 | 0.32586 | −0.06074 | 0.47222 |
| 96 | 0.32926 | −0.06897 | 0.47222 |
| 97 | 0.33085 | −0.09978 | 0.47222 |
| 98 | 0.33256 | −0.07724 | 0.47222 |
| 99 | 0.33575 | −0.08556 | 0.47222 |
| 100 | 0.33721 | −0.09415 | 0.47222 |
| 1 | 0.01008 | −0.02468 | 0.50000 |
| 2 | 0.01074 | −0.01570 | 0.50000 |
| 3 | 0.01104 | −0.03360 | 0.50000 |
| 4 | 0.01235 | −0.00684 | 0.50000 |
| 5 | 0.01468 | 0.00185 | 0.50000 |
| 6 | 0.01555 | −0.04127 | 0.50000 |
| 7 | 0.01763 | 0.01036 | 0.50000 |
| 8 | 0.02119 | 0.01864 | 0.50000 |
| 9 | 0.02353 | −0.04515 | 0.50000 |
| 10 | 0.02530 | 0.02664 | 0.50000 |
| 11 | 0.02994 | 0.03435 | 0.50000 |
| 12 | 0.03236 | −0.04394 | 0.50000 |
| 13 | 0.03506 | 0.04176 | 0.50000 |
| 14 | 0.04060 | 0.04886 | 0.50000 |
| 15 | 0.04064 | −0.04043 | 0.50000 |
| 16 | 0.04651 | 0.05566 | 0.50000 |
| 17 | 0.04852 | −0.03609 | 0.50000 |
| 18 | 0.05270 | 0.06220 | 0.50000 |
| 19 | 0.05626 | −0.03147 | 0.50000 |
| 20 | 0.05913 | 0.06852 | 0.50000 |
| 21 | 0.06405 | −0.02695 | 0.50000 |
| 22 | 0.06575 | 0.07460 | 0.50000 |
| 23 | 0.07196 | −0.02265 | 0.50000 |
| 24 | 0.07259 | 0.08047 | 0.50000 |
| 25 | 0.07963 | 0.08608 | 0.50000 |
| 26 | 0.08006 | −0.01869 | 0.50000 |
| 27 | 0.08692 | 0.09138 | 0.50000 |
| 28 | 0.08833 | −0.01512 | 0.50000 |
| 29 | 0.09446 | 0.09631 | 0.50000 |
| 30 | 0.09675 | −0.01195 | 0.50000 |
| 31 | 0.10226 | 0.10079 | 0.50000 |
| 32 | 0.10533 | −0.00923 | 0.50000 |
| 33 | 0.11034 | 0.10479 | 0.50000 |
| 34 | 0.11405 | −0.00697 | 0.50000 |
| 35 | 0.11865 | 0.10823 | 0.50000 |
| 36 | 0.12288 | −0.00519 | 0.50000 |
| 37 | 0.12720 | 0.11108 | 0.50000 |
| 38 | 0.13179 | −0.00388 | 0.50000 |
| 39 | 0.13593 | 0.11327 | 0.50000 |
| 40 | 0.14076 | −0.00303 | 0.50000 |
| 41 | 0.14480 | 0.11476 | 0.50000 |
| 42 | 0.14975 | −0.00263 | 0.50000 |
| 43 | 0.15378 | 0.11550 | 0.50000 |
| 44 | 0.15876 | −0.00266 | 0.50000 |
| 45 | 0.16279 | 0.11544 | 0.50000 |
| 46 | 0.16775 | −0.00310 | 0.50000 |
| 47 | 0.17175 | 0.11457 | 0.50000 |
| 48 | 0.17671 | −0.00395 | 0.50000 |
| 49 | 0.18060 | 0.11290 | 0.50000 |
| 50 | 0.18564 | −0.00519 | 0.50000 |
| 51 | 0.18926 | 0.11048 | 0.50000 |
| 52 | 0.19449 | −0.00682 | 0.50000 |
| 53 | 0.19769 | 0.10731 | 0.50000 |
| 54 | 0.20327 | −0.00883 | 0.50000 |
| 55 | 0.20583 | 0.10346 | 0.50000 |
| 56 | 0.21195 | −0.01122 | 0.50000 |
| 57 | 0.21364 | 0.09899 | 0.50000 |
| 58 | 0.22053 | −0.01398 | 0.50000 |
| 59 | 0.22111 | 0.09396 | 0.50000 |

TABLE I-continued

Non-Dimensionalized [X Y Z/Span Height]

| N | X | Y | Z |
|---|---|---|---|
| 60 | 0.22823 | 0.08844 | 0.50000 |
| 61 | 0.22897 | −0.01712 | 0.50000 |
| 62 | 0.23499 | 0.08249 | 0.50000 |
| 63 | 0.23726 | −0.02065 | 0.50000 |
| 64 | 0.24143 | 0.07619 | 0.50000 |
| 65 | 0.24536 | −0.02458 | 0.50000 |
| 66 | 0.24754 | 0.06958 | 0.50000 |
| 67 | 0.25322 | −0.02896 | 0.50000 |
| 68 | 0.25339 | 0.06274 | 0.50000 |
| 69 | 0.25899 | 0.05569 | 0.50000 |
| 70 | 0.26083 | −0.03377 | 0.50000 |
| 71 | 0.26440 | 0.04849 | 0.50000 |
| 72 | 0.26816 | −0.03901 | 0.50000 |
| 73 | 0.26968 | 0.04118 | 0.50000 |
| 74 | 0.27484 | 0.03380 | 0.50000 |
| 75 | 0.27520 | −0.04462 | 0.50000 |
| 76 | 0.27990 | 0.02634 | 0.50000 |
| 77 | 0.28195 | −0.05059 | 0.50000 |
| 78 | 0.28484 | 0.01882 | 0.50000 |
| 79 | 0.28842 | −0.05685 | 0.50000 |
| 80 | 0.28967 | 0.01122 | 0.50000 |
| 81 | 0.29437 | 0.00354 | 0.50000 |
| 82 | 0.29465 | −0.06334 | 0.50000 |
| 83 | 0.29892 | −0.00423 | 0.50000 |
| 84 | 0.30068 | −0.07003 | 0.50000 |
| 85 | 0.30329 | −0.01211 | 0.50000 |
| 86 | 0.30655 | −0.07687 | 0.50000 |
| 87 | 0.30746 | −0.02009 | 0.50000 |
| 88 | 0.31145 | −0.02816 | 0.50000 |
| 89 | 0.31229 | −0.08381 | 0.50000 |
| 90 | 0.31529 | −0.03631 | 0.50000 |
| 91 | 0.31791 | −0.09084 | 0.50000 |
| 92 | 0.31899 | −0.04452 | 0.50000 |
| 93 | 0.32257 | −0.05278 | 0.50000 |
| 94 | 0.32345 | −0.09795 | 0.50000 |
| 95 | 0.32605 | −0.06110 | 0.50000 |
| 96 | 0.32941 | −0.06945 | 0.50000 |
| 97 | 0.33143 | −0.10089 | 0.50000 |
| 98 | 0.33267 | −0.07784 | 0.50000 |
| 99 | 0.33581 | −0.08628 | 0.50000 |
| 100 | 0.33759 | −0.09497 | 0.50000 |
| 1 | 0.01175 | −0.02277 | 0.52778 |
| 2 | 0.01242 | −0.01372 | 0.52778 |
| 3 | 0.01252 | −0.03179 | 0.52778 |
| 4 | 0.01396 | −0.00478 | 0.52778 |
| 5 | 0.01620 | 0.00401 | 0.52778 |
| 6 | 0.01670 | −0.03972 | 0.52778 |
| 7 | 0.01907 | 0.01262 | 0.52778 |
| 8 | 0.02254 | 0.02101 | 0.52778 |
| 9 | 0.02468 | −0.04372 | 0.52778 |
| 10 | 0.02657 | 0.02913 | 0.52778 |
| 11 | 0.03116 | 0.03696 | 0.52778 |
| 12 | 0.03357 | −0.04252 | 0.52778 |
| 13 | 0.03624 | 0.04448 | 0.52778 |
| 14 | 0.04177 | 0.05167 | 0.52778 |
| 15 | 0.04191 | −0.03894 | 0.52778 |
| 16 | 0.04767 | 0.05856 | 0.52778 |
| 17 | 0.04982 | −0.03450 | 0.52778 |
| 18 | 0.05386 | 0.06521 | 0.52778 |
| 19 | 0.05756 | −0.02974 | 0.52778 |
| 20 | 0.06023 | 0.07167 | 0.52778 |
| 21 | 0.06530 | −0.02502 | 0.52778 |
| 22 | 0.06680 | 0.07793 | 0.52778 |
| 23 | 0.07316 | −0.02046 | 0.52778 |
| 24 | 0.07356 | 0.08399 | 0.52778 |
| 25 | 0.08051 | 0.08982 | 0.52778 |
| 26 | 0.08119 | −0.01624 | 0.52778 |
| 27 | 0.08773 | 0.09533 | 0.52778 |
| 28 | 0.08943 | −0.01241 | 0.52778 |
| 29 | 0.09523 | 0.10044 | 0.52778 |
| 30 | 0.09786 | −0.00907 | 0.52778 |
| 31 | 0.10304 | 0.10505 | 0.52778 |
| 32 | 0.10648 | −0.00622 | 0.52778 |
| 33 | 0.11116 | 0.10910 | 0.52778 |
| 34 | 0.11524 | −0.00388 | 0.52778 |
| 35 | 0.11955 | 0.11255 | 0.52778 |

TABLE I-continued

Non-Dimensionalized [X Y Z/Span Height]

| N | X | Y | Z |
|---|---|---|---|
| 36 | 0.12413 | −0.00205 | 0.52778 |
| 37 | 0.12818 | 0.11535 | 0.52778 |
| 38 | 0.13311 | −0.00071 | 0.52778 |
| 39 | 0.13701 | 0.11746 | 0.52778 |
| 40 | 0.14214 | 0.00018 | 0.52778 |
| 41 | 0.14598 | 0.11883 | 0.52778 |
| 42 | 0.15120 | 0.00059 | 0.52778 |
| 43 | 0.15504 | 0.11943 | 0.52778 |
| 44 | 0.16028 | 0.00055 | 0.52778 |
| 45 | 0.16410 | 0.11921 | 0.52778 |
| 46 | 0.16934 | 0.00004 | 0.52778 |
| 47 | 0.17312 | 0.11817 | 0.52778 |
| 48 | 0.17836 | −0.00092 | 0.52778 |
| 49 | 0.18199 | 0.11632 | 0.52778 |
| 50 | 0.18734 | −0.00230 | 0.52778 |
| 51 | 0.19069 | 0.11370 | 0.52778 |
| 52 | 0.19623 | −0.00409 | 0.52778 |
| 53 | 0.19912 | 0.11034 | 0.52778 |
| 54 | 0.20503 | −0.00629 | 0.52778 |
| 55 | 0.20724 | 0.10631 | 0.52778 |
| 56 | 0.21373 | −0.00889 | 0.52778 |
| 57 | 0.21502 | 0.10164 | 0.52778 |
| 58 | 0.22230 | −0.01189 | 0.52778 |
| 59 | 0.22243 | 0.09641 | 0.52778 |
| 60 | 0.22948 | 0.09069 | 0.52778 |
| 61 | 0.23071 | −0.01529 | 0.52778 |
| 62 | 0.23616 | 0.08454 | 0.52778 |
| 63 | 0.23896 | −0.01908 | 0.52778 |
| 64 | 0.24249 | 0.07804 | 0.52778 |
| 65 | 0.24699 | −0.02330 | 0.52778 |
| 66 | 0.24852 | 0.07125 | 0.52778 |
| 67 | 0.25425 | 0.06423 | 0.52778 |
| 68 | 0.25477 | −0.02797 | 0.52778 |
| 69 | 0.25976 | 0.05702 | 0.52778 |
| 70 | 0.26227 | −0.03307 | 0.52778 |
| 71 | 0.26508 | 0.04966 | 0.52778 |
| 72 | 0.26949 | −0.03858 | 0.52778 |
| 73 | 0.27026 | 0.04220 | 0.52778 |
| 74 | 0.27532 | 0.03467 | 0.52778 |
| 75 | 0.27641 | −0.04445 | 0.52778 |
| 76 | 0.28030 | 0.02708 | 0.52778 |
| 77 | 0.28304 | −0.05064 | 0.52778 |
| 78 | 0.28517 | 0.01941 | 0.52778 |
| 79 | 0.28941 | −0.05711 | 0.52778 |
| 80 | 0.28992 | 0.01168 | 0.52778 |
| 81 | 0.29455 | 0.00388 | 0.52778 |
| 82 | 0.29557 | −0.06377 | 0.52778 |
| 83 | 0.29903 | −0.00401 | 0.52778 |
| 84 | 0.30152 | −0.07063 | 0.52778 |
| 85 | 0.30335 | −0.01199 | 0.52778 |
| 86 | 0.30731 | −0.07762 | 0.52778 |
| 87 | 0.30747 | −0.02008 | 0.52778 |
| 88 | 0.31142 | −0.02825 | 0.52778 |
| 89 | 0.31296 | −0.08472 | 0.52778 |
| 90 | 0.31522 | −0.03649 | 0.52778 |
| 91 | 0.31849 | −0.09191 | 0.52778 |
| 92 | 0.31889 | −0.04480 | 0.52778 |
| 93 | 0.32243 | −0.05315 | 0.52778 |
| 94 | 0.32394 | −0.09917 | 0.52778 |
| 95 | 0.32587 | −0.06155 | 0.52778 |
| 96 | 0.32920 | −0.06999 | 0.52778 |
| 97 | 0.33195 | −0.10205 | 0.52778 |
| 98 | 0.33242 | −0.07848 | 0.52778 |
| 99 | 0.33553 | −0.08701 | 0.52778 |
| 100 | 0.33773 | −0.09573 | 0.52778 |
| 1 | 0.01375 | −0.02248 | 0.55555 |
| 2 | 0.01446 | −0.03154 | 0.55555 |
| 3 | 0.01449 | −0.01339 | 0.55555 |
| 4 | 0.01607 | −0.00441 | 0.55555 |
| 5 | 0.01832 | 0.00442 | 0.55555 |
| 6 | 0.01876 | −0.03943 | 0.55555 |
| 7 | 0.02118 | 0.01308 | 0.55555 |
| 8 | 0.02462 | 0.02152 | 0.55555 |
| 9 | 0.02696 | −0.04303 | 0.55555 |
| 10 | 0.02863 | 0.02971 | 0.55555 |
| 11 | 0.03318 | 0.03761 | 0.55555 |

TABLE I-continued

Non-Dimensionalized [X Y Z/Span Height]

| N | X | Y | Z |
|---|---|---|---|
| 12 | 0.03588 | −0.04150 | 0.55555 |
| 13 | 0.03822 | 0.04520 | 0.55555 |
| 14 | 0.04371 | 0.05248 | 0.55555 |
| 15 | 0.04421 | −0.03781 | 0.55555 |
| 16 | 0.04957 | 0.05947 | 0.55555 |
| 17 | 0.05210 | −0.03325 | 0.55555 |
| 18 | 0.05571 | 0.06621 | 0.55555 |
| 19 | 0.05980 | −0.02835 | 0.55555 |
| 20 | 0.06204 | 0.07278 | 0.55555 |
| 21 | 0.06748 | −0.02343 | 0.55555 |
| 22 | 0.06854 | 0.07917 | 0.55555 |
| 23 | 0.07522 | 0.08536 | 0.55555 |
| 24 | 0.07525 | −0.01866 | 0.55555 |
| 25 | 0.08211 | 0.09134 | 0.55555 |
| 26 | 0.08320 | −0.01420 | 0.55555 |
| 27 | 0.08925 | 0.09702 | 0.55555 |
| 28 | 0.09138 | −0.01017 | 0.55555 |
| 29 | 0.09669 | 0.10230 | 0.55555 |
| 30 | 0.09978 | −0.00665 | 0.55555 |
| 31 | 0.10444 | 0.10708 | 0.55555 |
| 32 | 0.10840 | −0.00367 | 0.55555 |
| 33 | 0.11253 | 0.11129 | 0.55555 |
| 34 | 0.11718 | −0.00123 | 0.55555 |
| 35 | 0.12091 | 0.11488 | 0.55555 |
| 36 | 0.12610 | 0.00069 | 0.55555 |
| 37 | 0.12954 | 0.11781 | 0.55555 |
| 38 | 0.13510 | 0.00212 | 0.55555 |
| 39 | 0.13839 | 0.12000 | 0.55555 |
| 40 | 0.14417 | 0.00307 | 0.55555 |
| 41 | 0.14739 | 0.12143 | 0.55555 |
| 42 | 0.15328 | 0.00352 | 0.55555 |
| 43 | 0.15649 | 0.12206 | 0.55555 |
| 44 | 0.16239 | 0.00346 | 0.55555 |
| 45 | 0.16560 | 0.12181 | 0.55555 |
| 46 | 0.17150 | 0.00292 | 0.55555 |
| 47 | 0.17464 | 0.12070 | 0.55555 |
| 48 | 0.18055 | 0.00188 | 0.55555 |
| 49 | 0.18354 | 0.11876 | 0.55555 |
| 50 | 0.18955 | 0.00038 | 0.55555 |
| 51 | 0.19224 | 0.11602 | 0.55555 |
| 52 | 0.19846 | −0.00157 | 0.55555 |
| 53 | 0.20066 | 0.11252 | 0.55555 |
| 54 | 0.20725 | −0.00396 | 0.55555 |
| 55 | 0.20875 | 0.10833 | 0.55555 |
| 56 | 0.21593 | −0.00678 | 0.55555 |
| 57 | 0.21648 | 0.10350 | 0.55555 |
| 58 | 0.22383 | 0.09811 | 0.55555 |
| 59 | 0.22445 | −0.01002 | 0.55555 |
| 60 | 0.23079 | 0.09222 | 0.55555 |
| 61 | 0.23280 | −0.01368 | 0.55555 |
| 62 | 0.23738 | 0.08592 | 0.55555 |
| 63 | 0.24095 | −0.01775 | 0.55555 |
| 64 | 0.24361 | 0.07926 | 0.55555 |
| 65 | 0.24888 | −0.02225 | 0.55555 |
| 66 | 0.24953 | 0.07231 | 0.55555 |
| 67 | 0.25516 | 0.06515 | 0.55555 |
| 68 | 0.25653 | −0.02721 | 0.55555 |
| 69 | 0.26055 | 0.05780 | 0.55555 |
| 70 | 0.26388 | −0.03260 | 0.55555 |
| 71 | 0.26576 | 0.05031 | 0.55555 |
| 72 | 0.27082 | 0.04273 | 0.55555 |
| 73 | 0.27094 | −0.03838 | 0.55555 |
| 74 | 0.27579 | 0.03508 | 0.55555 |
| 75 | 0.27770 | −0.04450 | 0.55555 |
| 76 | 0.28066 | 0.02737 | 0.55555 |
| 77 | 0.28417 | −0.05093 | 0.55555 |
| 78 | 0.28544 | 0.01960 | 0.55555 |
| 79 | 0.29010 | 0.01177 | 0.55555 |
| 80 | 0.29041 | −0.05756 | 0.55555 |
| 81 | 0.29465 | 0.00386 | 0.55555 |
| 82 | 0.29645 | −0.06439 | 0.55555 |
| 83 | 0.29905 | −0.00412 | 0.55555 |
| 84 | 0.30230 | −0.07137 | 0.55555 |
| 85 | 0.30329 | −0.01219 | 0.55555 |
| 86 | 0.30736 | −0.02035 | 0.55555 |
| 87 | 0.30799 | −0.07850 | 0.55555 |
| 88 | 0.31124 | −0.02860 | 0.55555 |
| 89 | 0.31354 | −0.08574 | 0.55555 |
| 90 | 0.31498 | −0.03692 | 0.55555 |
| 91 | 0.31859 | −0.04529 | 0.55555 |
| 92 | 0.31898 | −0.09307 | 0.55555 |
| 93 | 0.32210 | −0.05370 | 0.55555 |
| 94 | 0.32430 | −0.10047 | 0.55555 |
| 95 | 0.32549 | −0.06217 | 0.55555 |
| 96 | 0.32879 | −0.07067 | 0.55555 |
| 97 | 0.33196 | −0.07922 | 0.55555 |
| 98 | 0.33234 | −0.10325 | 0.55555 |
| 99 | 0.33504 | −0.08781 | 0.55555 |
| 100 | 0.33758 | −0.09652 | 0.55555 |
| 1 | 0.01570 | −0.02238 | 0.58334 |
| 2 | 0.01648 | −0.01327 | 0.58334 |
| 3 | 0.01652 | −0.03144 | 0.58334 |
| 4 | 0.01814 | −0.00428 | 0.58334 |
| 5 | 0.02045 | 0.00457 | 0.58334 |
| 6 | 0.02126 | −0.03907 | 0.58334 |
| 7 | 0.02333 | 0.01325 | 0.58334 |
| 8 | 0.02677 | 0.02171 | 0.58334 |
| 9 | 0.02975 | −0.04198 | 0.58334 |
| 10 | 0.03075 | 0.02993 | 0.58334 |
| 11 | 0.03526 | 0.03788 | 0.58334 |
| 12 | 0.03864 | −0.04006 | 0.58334 |
| 13 | 0.04025 | 0.04553 | 0.58334 |
| 14 | 0.04568 | 0.05288 | 0.58334 |
| 15 | 0.04693 | −0.03623 | 0.58334 |
| 16 | 0.05149 | 0.05994 | 0.58334 |
| 17 | 0.05479 | −0.03156 | 0.58334 |
| 18 | 0.05758 | 0.06675 | 0.58334 |
| 19 | 0.06243 | −0.02654 | 0.58334 |
| 20 | 0.06386 | 0.07340 | 0.58334 |
| 21 | 0.07004 | −0.02147 | 0.58334 |
| 22 | 0.07033 | 0.07985 | 0.58334 |
| 23 | 0.07699 | 0.08611 | 0.58334 |
| 24 | 0.07772 | −0.01651 | 0.58334 |
| 25 | 0.08385 | 0.09216 | 0.58334 |
| 26 | 0.08559 | −0.01186 | 0.58334 |
| 27 | 0.09096 | 0.09791 | 0.58334 |
| 28 | 0.09370 | −0.00767 | 0.58334 |
| 29 | 0.09835 | 0.10329 | 0.58334 |
| 30 | 0.10209 | −0.00404 | 0.58334 |
| 31 | 0.10606 | 0.10820 | 0.58334 |
| 32 | 0.11070 | −0.00098 | 0.58334 |
| 33 | 0.11409 | 0.11256 | 0.58334 |
| 34 | 0.11949 | 0.00152 | 0.58334 |
| 35 | 0.12242 | 0.11631 | 0.58334 |
| 36 | 0.12842 | 0.00348 | 0.58334 |
| 37 | 0.13104 | 0.11936 | 0.58334 |
| 38 | 0.13745 | 0.00495 | 0.58334 |
| 39 | 0.13988 | 0.12166 | 0.58334 |
| 40 | 0.14653 | 0.00592 | 0.58334 |
| 41 | 0.14890 | 0.12316 | 0.58334 |
| 42 | 0.15566 | 0.00636 | 0.58334 |
| 43 | 0.15801 | 0.12382 | 0.58334 |
| 44 | 0.16480 | 0.00626 | 0.58334 |
| 45 | 0.16714 | 0.12357 | 0.58334 |
| 46 | 0.17392 | 0.00563 | 0.58334 |
| 47 | 0.17620 | 0.12242 | 0.58334 |
| 48 | 0.18299 | 0.00448 | 0.58334 |
| 49 | 0.18512 | 0.12040 | 0.58334 |
| 50 | 0.19197 | 0.00284 | 0.58334 |
| 51 | 0.19380 | 0.11756 | 0.58334 |
| 52 | 0.20087 | 0.00072 | 0.58334 |
| 53 | 0.20219 | 0.11393 | 0.58334 |
| 54 | 0.20963 | −0.00189 | 0.58334 |
| 55 | 0.21024 | 0.10961 | 0.58334 |
| 56 | 0.21791 | 0.10465 | 0.58334 |
| 57 | 0.21825 | −0.00494 | 0.58334 |
| 58 | 0.22519 | 0.09912 | 0.58334 |
| 59 | 0.22669 | −0.00843 | 0.58334 |
| 60 | 0.23207 | 0.09310 | 0.58334 |
| 61 | 0.23495 | −0.01235 | 0.58334 |
| 62 | 0.23855 | 0.08666 | 0.58334 |
| 63 | 0.24298 | −0.01670 | 0.58334 |

TABLE I-continued

Non-Dimensionalized [X Y Z/Span Height]

| N | X | Y | Z |
|---|---|---|---|
| 64 | 0.24469 | 0.07989 | 0.58334 |
| 65 | 0.25049 | 0.07282 | 0.58334 |
| 66 | 0.25077 | −0.02149 | 0.58334 |
| 67 | 0.25601 | 0.06555 | 0.58334 |
| 68 | 0.25826 | −0.02673 | 0.58334 |
| 69 | 0.26130 | 0.05809 | 0.58334 |
| 70 | 0.26543 | −0.03239 | 0.58334 |
| 71 | 0.26639 | 0.05050 | 0.58334 |
| 72 | 0.27135 | 0.04281 | 0.58334 |
| 73 | 0.27230 | −0.03843 | 0.58334 |
| 74 | 0.27622 | 0.03507 | 0.58334 |
| 75 | 0.27886 | −0.04479 | 0.58334 |
| 76 | 0.28100 | 0.02728 | 0.58334 |
| 77 | 0.28516 | −0.05141 | 0.58334 |
| 78 | 0.28569 | 0.01943 | 0.58334 |
| 79 | 0.29027 | 0.01152 | 0.58334 |
| 80 | 0.29127 | −0.05822 | 0.58334 |
| 81 | 0.29473 | 0.00354 | 0.58334 |
| 82 | 0.29721 | −0.06516 | 0.58334 |
| 83 | 0.29905 | −0.00451 | 0.58334 |
| 84 | 0.30297 | −0.07226 | 0.58334 |
| 85 | 0.30321 | −0.01265 | 0.58334 |
| 86 | 0.30720 | −0.02087 | 0.58334 |
| 87 | 0.30857 | −0.07948 | 0.58334 |
| 88 | 0.31101 | −0.02918 | 0.58334 |
| 89 | 0.31401 | −0.08683 | 0.58334 |
| 90 | 0.31467 | −0.03756 | 0.58334 |
| 91 | 0.31822 | −0.04598 | 0.58334 |
| 92 | 0.31931 | −0.09428 | 0.58334 |
| 93 | 0.32165 | −0.05446 | 0.58334 |
| 94 | 0.32450 | −0.10180 | 0.58334 |
| 95 | 0.32500 | −0.06296 | 0.58334 |
| 96 | 0.32824 | −0.07151 | 0.58334 |
| 97 | 0.33140 | −0.08008 | 0.58334 |
| 98 | 0.33253 | −0.10446 | 0.58334 |
| 99 | 0.33445 | −0.08870 | 0.58334 |
| 100 | 0.33723 | −0.09740 | 0.58334 |
| 1 | 0.01753 | −0.02174 | 0.61111 |
| 2 | 0.01830 | −0.01264 | 0.61111 |
| 3 | 0.01860 | −0.03079 | 0.61111 |
| 4 | 0.01999 | −0.00364 | 0.61111 |
| 5 | 0.02232 | 0.00522 | 0.61111 |
| 6 | 0.02393 | −0.03797 | 0.61111 |
| 7 | 0.02521 | 0.01390 | 0.61111 |
| 8 | 0.02864 | 0.02237 | 0.61111 |
| 9 | 0.03260 | 0.03061 | 0.61111 |
| 10 | 0.03268 | −0.04005 | 0.61111 |
| 11 | 0.03706 | 0.03859 | 0.61111 |
| 12 | 0.04151 | −0.03780 | 0.61111 |
| 13 | 0.04201 | 0.04628 | 0.61111 |
| 14 | 0.04739 | 0.05368 | 0.61111 |
| 15 | 0.04976 | −0.03387 | 0.61111 |
| 16 | 0.05315 | 0.06079 | 0.61111 |
| 17 | 0.05758 | −0.02912 | 0.61111 |
| 18 | 0.05920 | 0.06766 | 0.61111 |
| 19 | 0.06518 | −0.02401 | 0.61111 |
| 20 | 0.06547 | 0.07432 | 0.61111 |
| 21 | 0.07194 | 0.08079 | 0.61111 |
| 22 | 0.07270 | −0.01881 | 0.61111 |
| 23 | 0.07861 | 0.08705 | 0.61111 |
| 24 | 0.08030 | −0.01370 | 0.61111 |
| 25 | 0.08548 | 0.09309 | 0.61111 |
| 26 | 0.08809 | −0.00891 | 0.61111 |
| 27 | 0.09260 | 0.09884 | 0.61111 |
| 28 | 0.09617 | −0.00463 | 0.61111 |
| 29 | 0.09999 | 0.10423 | 0.61111 |
| 30 | 0.10454 | −0.00095 | 0.61111 |
| 31 | 0.10768 | 0.10917 | 0.61111 |
| 32 | 0.11316 | 0.00211 | 0.61111 |
| 33 | 0.11569 | 0.11360 | 0.61111 |
| 34 | 0.12197 | 0.00459 | 0.61111 |
| 35 | 0.12399 | 0.11742 | 0.61111 |
| 36 | 0.13091 | 0.00652 | 0.61111 |
| 37 | 0.13259 | 0.12055 | 0.61111 |
| 38 | 0.13995 | 0.00794 | 0.61111 |
| 39 | 0.14143 | 0.12289 | 0.61111 |
| 40 | 0.14905 | 0.00884 | 0.61111 |
| 41 | 0.15045 | 0.12440 | 0.61111 |
| 42 | 0.15819 | 0.00919 | 0.61111 |
| 43 | 0.15957 | 0.12503 | 0.61111 |
| 44 | 0.16733 | 0.00899 | 0.61111 |
| 45 | 0.16871 | 0.12473 | 0.61111 |
| 46 | 0.17645 | 0.00822 | 0.61111 |
| 47 | 0.17778 | 0.12350 | 0.61111 |
| 48 | 0.18550 | 0.00690 | 0.61111 |
| 49 | 0.18668 | 0.12138 | 0.61111 |
| 50 | 0.19447 | 0.00507 | 0.61111 |
| 51 | 0.19533 | 0.11843 | 0.61111 |
| 52 | 0.20332 | 0.00273 | 0.61111 |
| 53 | 0.20367 | 0.11469 | 0.61111 |
| 54 | 0.21168 | 0.11025 | 0.61111 |
| 55 | 0.21201 | −0.00011 | 0.61111 |
| 56 | 0.21927 | 0.10516 | 0.61111 |
| 57 | 0.22055 | −0.00340 | 0.61111 |
| 58 | 0.22647 | 0.09951 | 0.61111 |
| 59 | 0.22889 | −0.00716 | 0.61111 |
| 60 | 0.23326 | 0.09338 | 0.61111 |
| 61 | 0.23701 | −0.01135 | 0.61111 |
| 62 | 0.23965 | 0.08683 | 0.61111 |
| 63 | 0.24492 | −0.01597 | 0.61111 |
| 64 | 0.24567 | 0.07995 | 0.61111 |
| 65 | 0.25137 | 0.07280 | 0.61111 |
| 66 | 0.25254 | −0.02103 | 0.61111 |
| 67 | 0.25679 | 0.06543 | 0.61111 |
| 68 | 0.25983 | −0.02653 | 0.61111 |
| 69 | 0.26198 | 0.05789 | 0.61111 |
| 70 | 0.26680 | −0.03246 | 0.61111 |
| 71 | 0.26697 | 0.05023 | 0.61111 |
| 72 | 0.27183 | 0.04248 | 0.61111 |
| 73 | 0.27346 | −0.03873 | 0.61111 |
| 74 | 0.27661 | 0.03467 | 0.61111 |
| 75 | 0.27983 | −0.04531 | 0.61111 |
| 76 | 0.28132 | 0.02682 | 0.61111 |
| 77 | 0.28593 | 0.01892 | 0.61111 |
| 78 | 0.28596 | −0.05210 | 0.61111 |
| 79 | 0.29044 | 0.01096 | 0.61111 |
| 80 | 0.29194 | −0.05902 | 0.61111 |
| 81 | 0.29483 | 0.00294 | 0.61111 |
| 82 | 0.29777 | −0.06607 | 0.61111 |
| 83 | 0.29908 | −0.00517 | 0.61111 |
| 84 | 0.30316 | −0.01335 | 0.61111 |
| 85 | 0.30346 | −0.07323 | 0.61111 |
| 86 | 0.30706 | −0.02163 | 0.61111 |
| 87 | 0.30897 | −0.08054 | 0.61111 |
| 88 | 0.31078 | −0.02998 | 0.61111 |
| 89 | 0.31430 | −0.08797 | 0.61111 |
| 90 | 0.31435 | −0.03841 | 0.61111 |
| 91 | 0.31780 | −0.04688 | 0.61111 |
| 92 | 0.31948 | −0.09551 | 0.61111 |
| 93 | 0.32117 | −0.05540 | 0.61111 |
| 94 | 0.32445 | −0.06393 | 0.61111 |
| 95 | 0.32453 | −0.10314 | 0.61111 |
| 96 | 0.32765 | −0.07250 | 0.61111 |
| 97 | 0.33077 | −0.08110 | 0.61111 |
| 98 | 0.33254 | −0.10571 | 0.61111 |
| 99 | 0.33383 | −0.08973 | 0.61111 |
| 100 | 0.33672 | −0.09841 | 0.61111 |
| 1 | 0.01940 | −0.02083 | 0.63889 |
| 2 | 0.02010 | −0.01173 | 0.63889 |
| 3 | 0.02081 | −0.02980 | 0.63889 |
| 4 | 0.02179 | −0.00273 | 0.63889 |
| 5 | 0.02412 | 0.00612 | 0.63889 |
| 6 | 0.02686 | −0.03635 | 0.63889 |
| 7 | 0.02701 | 0.01480 | 0.63889 |
| 8 | 0.03043 | 0.02327 | 0.63889 |
| 9 | 0.03438 | 0.03152 | 0.63889 |
| 10 | 0.03579 | −0.03749 | 0.63889 |
| 11 | 0.03882 | 0.03951 | 0.63889 |
| 12 | 0.04372 | 0.04722 | 0.63889 |
| 13 | 0.04456 | −0.03494 | 0.63889 |
| 14 | 0.04907 | 0.05464 | 0.63889 |
| 15 | 0.05276 | −0.03092 | 0.63889 |

TABLE I-continued

Non-Dimensionalized [X Y Z/Span Height]

| N | X | Y | Z |
|---|---|---|---|
| 16 | 0.05479 | 0.06178 | 0.63889 |
| 17 | 0.06055 | −0.02613 | 0.63889 |
| 18 | 0.06081 | 0.06866 | 0.63889 |
| 19 | 0.06708 | 0.07532 | 0.63889 |
| 20 | 0.06809 | −0.02095 | 0.63889 |
| 21 | 0.07356 | 0.08176 | 0.63889 |
| 22 | 0.07554 | −0.01565 | 0.63889 |
| 23 | 0.08025 | 0.08799 | 0.63889 |
| 24 | 0.08304 | −0.01042 | 0.63889 |
| 25 | 0.08716 | 0.09399 | 0.63889 |
| 26 | 0.09077 | −0.00552 | 0.63889 |
| 27 | 0.09430 | 0.09970 | 0.63889 |
| 28 | 0.09882 | −0.00120 | 0.63889 |
| 29 | 0.10172 | 0.10505 | 0.63889 |
| 30 | 0.10719 | 0.00247 | 0.63889 |
| 31 | 0.10940 | 0.11000 | 0.63889 |
| 32 | 0.11582 | 0.00548 | 0.63889 |
| 33 | 0.11740 | 0.11444 | 0.63889 |
| 34 | 0.12465 | 0.00787 | 0.63889 |
| 35 | 0.12569 | 0.11830 | 0.63889 |
| 36 | 0.13361 | 0.00969 | 0.63889 |
| 37 | 0.13427 | 0.12145 | 0.63889 |
| 38 | 0.14266 | 0.01101 | 0.63889 |
| 39 | 0.14310 | 0.12377 | 0.63889 |
| 40 | 0.15177 | 0.01179 | 0.63889 |
| 41 | 0.15214 | 0.12523 | 0.63889 |
| 42 | 0.16091 | 0.01199 | 0.63889 |
| 43 | 0.16126 | 0.12578 | 0.63889 |
| 44 | 0.17005 | 0.01162 | 0.63889 |
| 45 | 0.17039 | 0.12538 | 0.63889 |
| 46 | 0.17914 | 0.01066 | 0.63889 |
| 47 | 0.17943 | 0.12405 | 0.63889 |
| 48 | 0.18815 | 0.00914 | 0.63889 |
| 49 | 0.18830 | 0.12183 | 0.63889 |
| 50 | 0.19691 | 0.11876 | 0.63889 |
| 51 | 0.19706 | 0.00708 | 0.63889 |
| 52 | 0.20520 | 0.11493 | 0.63889 |
| 53 | 0.20583 | 0.00450 | 0.63889 |
| 54 | 0.21314 | 0.11038 | 0.63889 |
| 55 | 0.21444 | 0.00142 | 0.63889 |
| 56 | 0.22067 | 0.10520 | 0.63889 |
| 57 | 0.22287 | −0.00213 | 0.63889 |
| 58 | 0.22777 | 0.09944 | 0.63889 |
| 59 | 0.23108 | −0.00614 | 0.63889 |
| 60 | 0.23445 | 0.09320 | 0.63889 |
| 61 | 0.23907 | −0.01060 | 0.63889 |
| 62 | 0.24074 | 0.08655 | 0.63889 |
| 63 | 0.24664 | 0.07957 | 0.63889 |
| 64 | 0.24680 | −0.01548 | 0.63889 |
| 65 | 0.25222 | 0.07233 | 0.63889 |
| 66 | 0.25423 | −0.02082 | 0.63889 |
| 67 | 0.25752 | 0.06488 | 0.63889 |
| 68 | 0.26130 | −0.02660 | 0.63889 |
| 69 | 0.26260 | 0.05728 | 0.63889 |
| 70 | 0.26750 | 0.04956 | 0.63889 |
| 71 | 0.26805 | −0.03278 | 0.63889 |
| 72 | 0.27227 | 0.04176 | 0.63889 |
| 73 | 0.27448 | −0.03928 | 0.63889 |
| 74 | 0.27694 | 0.03389 | 0.63889 |
| 75 | 0.28064 | −0.04603 | 0.63889 |
| 76 | 0.28156 | 0.02599 | 0.63889 |
| 77 | 0.28611 | 0.01806 | 0.63889 |
| 78 | 0.28660 | −0.05297 | 0.63889 |
| 79 | 0.29058 | 0.01008 | 0.63889 |
| 80 | 0.29246 | −0.06000 | 0.63889 |
| 81 | 0.29492 | 0.00204 | 0.63889 |
| 82 | 0.29820 | −0.06711 | 0.63889 |
| 83 | 0.29911 | −0.00610 | 0.63889 |
| 84 | 0.30311 | −0.01431 | 0.63889 |
| 85 | 0.30381 | −0.07434 | 0.63889 |
| 86 | 0.30691 | −0.02263 | 0.63889 |
| 87 | 0.30923 | −0.08169 | 0.63889 |
| 88 | 0.31054 | −0.03102 | 0.63889 |
| 89 | 0.31401 | −0.03949 | 0.63889 |
| 90 | 0.31446 | −0.08919 | 0.63889 |
| 91 | 0.31737 | −0.04799 | 0.63889 |
| 92 | 0.31950 | −0.09682 | 0.63889 |
| 93 | 0.32066 | −0.05652 | 0.63889 |
| 94 | 0.32387 | −0.06509 | 0.63889 |
| 95 | 0.32443 | −0.10454 | 0.63889 |
| 96 | 0.32703 | −0.07366 | 0.63889 |
| 97 | 0.33014 | −0.08227 | 0.63889 |
| 98 | 0.33239 | −0.10703 | 0.63889 |
| 99 | 0.33317 | −0.09089 | 0.63889 |
| 100 | 0.33612 | −0.09956 | 0.63889 |
| 1 | 0.02135 | −0.01970 | 0.66667 |
| 2 | 0.02199 | −0.01061 | 0.66667 |
| 3 | 0.02319 | −0.02856 | 0.66667 |
| 4 | 0.02366 | −0.00162 | 0.66667 |
| 5 | 0.02599 | 0.00721 | 0.66667 |
| 6 | 0.02887 | 0.01588 | 0.66667 |
| 7 | 0.03002 | −0.03422 | 0.66667 |
| 8 | 0.03229 | 0.02435 | 0.66667 |
| 9 | 0.03623 | 0.03258 | 0.66667 |
| 10 | 0.03905 | −0.03448 | 0.66667 |
| 11 | 0.04065 | 0.04056 | 0.66667 |
| 12 | 0.04554 | 0.04827 | 0.66667 |
| 13 | 0.04775 | −0.03173 | 0.66667 |
| 14 | 0.05087 | 0.05569 | 0.66667 |
| 15 | 0.05592 | −0.02767 | 0.66667 |
| 16 | 0.05656 | 0.06283 | 0.66667 |
| 17 | 0.06257 | 0.06969 | 0.66667 |
| 18 | 0.06368 | −0.02284 | 0.66667 |
| 19 | 0.06885 | 0.07633 | 0.66667 |
| 20 | 0.07117 | −0.01762 | 0.66667 |
| 21 | 0.07535 | 0.08274 | 0.66667 |
| 22 | 0.07853 | −0.01223 | 0.66667 |
| 23 | 0.08206 | 0.08893 | 0.66667 |
| 24 | 0.08595 | −0.00691 | 0.66667 |
| 25 | 0.08900 | 0.09487 | 0.66667 |
| 26 | 0.09362 | −0.00195 | 0.66667 |
| 27 | 0.09617 | 0.10053 | 0.66667 |
| 28 | 0.10166 | 0.00236 | 0.66667 |
| 29 | 0.10359 | 0.10584 | 0.66667 |
| 30 | 0.11005 | 0.00598 | 0.66667 |
| 31 | 0.11128 | 0.11076 | 0.66667 |
| 32 | 0.11870 | 0.00889 | 0.66667 |
| 33 | 0.11926 | 0.11519 | 0.66667 |
| 34 | 0.12754 | 0.11904 | 0.66667 |
| 35 | 0.12754 | 0.01114 | 0.66667 |
| 36 | 0.13611 | 0.12217 | 0.66667 |
| 37 | 0.13652 | 0.01284 | 0.66667 |
| 38 | 0.14495 | 0.12444 | 0.66667 |
| 39 | 0.14557 | 0.01402 | 0.66667 |
| 40 | 0.15397 | 0.12580 | 0.66667 |
| 41 | 0.15468 | 0.01463 | 0.66667 |
| 42 | 0.16309 | 0.12622 | 0.66667 |
| 43 | 0.16381 | 0.01465 | 0.66667 |
| 44 | 0.17220 | 0.12569 | 0.66667 |
| 45 | 0.17292 | 0.01408 | 0.66667 |
| 46 | 0.18122 | 0.12424 | 0.66667 |
| 47 | 0.18197 | 0.01290 | 0.66667 |
| 48 | 0.19003 | 0.12190 | 0.66667 |
| 49 | 0.19093 | 0.01115 | 0.66667 |
| 50 | 0.19860 | 0.11873 | 0.66667 |
| 51 | 0.19976 | 0.00885 | 0.66667 |
| 52 | 0.20683 | 0.11480 | 0.66667 |
| 53 | 0.20844 | 0.00603 | 0.66667 |
| 54 | 0.21470 | 0.11017 | 0.66667 |
| 55 | 0.21695 | 0.00270 | 0.66667 |
| 56 | 0.22216 | 0.10490 | 0.66667 |
| 57 | 0.22524 | −0.00111 | 0.66667 |
| 58 | 0.22916 | 0.09906 | 0.66667 |
| 59 | 0.23332 | −0.00538 | 0.66667 |
| 60 | 0.23573 | 0.09271 | 0.66667 |
| 61 | 0.24113 | −0.01011 | 0.66667 |
| 62 | 0.24187 | 0.08596 | 0.66667 |
| 63 | 0.24764 | 0.07887 | 0.66667 |
| 64 | 0.24866 | −0.01526 | 0.66667 |
| 65 | 0.25307 | 0.07153 | 0.66667 |
| 66 | 0.25587 | −0.02086 | 0.66667 |
| 67 | 0.25824 | 0.06401 | 0.66667 |

TABLE I-continued

Non-Dimensionalized [X Y Z/Span Height]

| N | X | Y | Z |
|---|---|---|---|
| 68 | 0.26273 | −0.02689 | 0.66667 |
| 69 | 0.26320 | 0.05634 | 0.66667 |
| 70 | 0.26798 | 0.04858 | 0.66667 |
| 71 | 0.26923 | −0.03330 | 0.66667 |
| 72 | 0.27265 | 0.04072 | 0.66667 |
| 73 | 0.27540 | −0.04002 | 0.66667 |
| 74 | 0.27723 | 0.03281 | 0.66667 |
| 75 | 0.28135 | −0.04696 | 0.66667 |
| 76 | 0.28176 | 0.02489 | 0.66667 |
| 77 | 0.28623 | 0.01693 | 0.66667 |
| 78 | 0.28715 | −0.05401 | 0.66667 |
| 79 | 0.29065 | 0.00893 | 0.66667 |
| 80 | 0.29288 | −0.06112 | 0.66667 |
| 81 | 0.29493 | 0.00088 | 0.66667 |
| 82 | 0.29853 | −0.06829 | 0.66667 |
| 83 | 0.29906 | −0.00727 | 0.66667 |
| 84 | 0.30298 | −0.01551 | 0.66667 |
| 85 | 0.30406 | −0.07556 | 0.66667 |
| 86 | 0.30670 | −0.02385 | 0.66667 |
| 87 | 0.30938 | −0.08297 | 0.66667 |
| 88 | 0.31022 | −0.03228 | 0.66667 |
| 89 | 0.31361 | −0.04076 | 0.66667 |
| 90 | 0.31449 | −0.09054 | 0.66667 |
| 91 | 0.31688 | −0.04928 | 0.66667 |
| 92 | 0.31941 | −0.09823 | 0.66667 |
| 93 | 0.32010 | −0.05783 | 0.66667 |
| 94 | 0.32326 | −0.06640 | 0.66667 |
| 95 | 0.32419 | −0.10600 | 0.66667 |
| 96 | 0.32638 | −0.07498 | 0.66667 |
| 97 | 0.32946 | −0.08357 | 0.66667 |
| 98 | 0.33212 | −0.10844 | 0.66667 |
| 99 | 0.33248 | −0.09218 | 0.66667 |
| 100 | 0.33544 | −0.10083 | 0.66667 |
| 1 | 0.02323 | −0.01760 | 0.69444 |
| 2 | 0.02382 | −0.00852 | 0.69444 |
| 3 | 0.02542 | −0.02634 | 0.69444 |
| 4 | 0.02547 | 0.00044 | 0.69444 |
| 5 | 0.02782 | 0.00926 | 0.69444 |
| 6 | 0.03072 | 0.01789 | 0.69444 |
| 7 | 0.03279 | −0.03121 | 0.69444 |
| 8 | 0.03415 | 0.02633 | 0.69444 |
| 9 | 0.03808 | 0.03454 | 0.69444 |
| 10 | 0.04183 | −0.03102 | 0.69444 |
| 11 | 0.04250 | 0.04250 | 0.69444 |
| 12 | 0.04737 | 0.05019 | 0.69444 |
| 13 | 0.05050 | −0.02827 | 0.69444 |
| 14 | 0.05265 | 0.05762 | 0.69444 |
| 15 | 0.05830 | 0.06476 | 0.69444 |
| 16 | 0.05867 | −0.02427 | 0.69444 |
| 17 | 0.06428 | 0.07162 | 0.69444 |
| 18 | 0.06645 | −0.01950 | 0.69444 |
| 19 | 0.07056 | 0.07823 | 0.69444 |
| 20 | 0.07395 | −0.01435 | 0.69444 |
| 21 | 0.07707 | 0.08460 | 0.69444 |
| 22 | 0.08131 | −0.00897 | 0.69444 |
| 23 | 0.08381 | 0.09072 | 0.69444 |
| 24 | 0.08872 | −0.00366 | 0.69444 |
| 25 | 0.09080 | 0.09659 | 0.69444 |
| 26 | 0.09637 | 0.00126 | 0.69444 |
| 27 | 0.09801 | 0.10215 | 0.69444 |
| 28 | 0.10443 | 0.00552 | 0.69444 |
| 29 | 0.10548 | 0.10735 | 0.69444 |
| 30 | 0.11282 | 0.00905 | 0.69444 |
| 31 | 0.11322 | 0.11217 | 0.69444 |
| 32 | 0.12123 | 0.11649 | 0.69444 |
| 33 | 0.12149 | 0.01185 | 0.69444 |
| 34 | 0.12953 | 0.12023 | 0.69444 |
| 35 | 0.13035 | 0.01397 | 0.69444 |
| 36 | 0.13814 | 0.12323 | 0.69444 |
| 37 | 0.13933 | 0.01551 | 0.69444 |
| 38 | 0.14699 | 0.12536 | 0.69444 |
| 39 | 0.14838 | 0.01652 | 0.69444 |
| 40 | 0.15601 | 0.12655 | 0.69444 |
| 41 | 0.15747 | 0.01696 | 0.69444 |
| 42 | 0.16512 | 0.12677 | 0.69444 |
| 43 | 0.16658 | 0.01679 | 0.69444 |
| 44 | 0.17420 | 0.12605 | 0.69444 |
| 45 | 0.17566 | 0.01601 | 0.69444 |
| 46 | 0.18315 | 0.12441 | 0.69444 |
| 47 | 0.18465 | 0.01462 | 0.69444 |
| 48 | 0.19190 | 0.12187 | 0.69444 |
| 49 | 0.19355 | 0.01265 | 0.69444 |
| 50 | 0.20037 | 0.11854 | 0.69444 |
| 51 | 0.20230 | 0.01012 | 0.69444 |
| 52 | 0.20852 | 0.11446 | 0.69444 |
| 53 | 0.21088 | 0.00706 | 0.69444 |
| 54 | 0.21628 | 0.10971 | 0.69444 |
| 55 | 0.21927 | 0.00350 | 0.69444 |
| 56 | 0.22363 | 0.10432 | 0.69444 |
| 57 | 0.22743 | −0.00055 | 0.69444 |
| 58 | 0.23053 | 0.09838 | 0.69444 |
| 59 | 0.23534 | −0.00506 | 0.69444 |
| 60 | 0.23696 | 0.09194 | 0.69444 |
| 61 | 0.24298 | −0.01002 | 0.69444 |
| 62 | 0.24298 | 0.08509 | 0.69444 |
| 63 | 0.24861 | 0.07793 | 0.69444 |
| 64 | 0.25032 | −0.01542 | 0.69444 |
| 65 | 0.25391 | 0.07052 | 0.69444 |
| 66 | 0.25731 | −0.02125 | 0.69444 |
| 67 | 0.25895 | 0.06294 | 0.69444 |
| 68 | 0.26380 | 0.05523 | 0.69444 |
| 69 | 0.26395 | −0.02749 | 0.69444 |
| 70 | 0.26847 | 0.04740 | 0.69444 |
| 71 | 0.27023 | −0.03408 | 0.69444 |
| 72 | 0.27302 | 0.03952 | 0.69444 |
| 73 | 0.27620 | −0.04097 | 0.69444 |
| 74 | 0.27750 | 0.03158 | 0.69444 |
| 75 | 0.28193 | 0.02361 | 0.69444 |
| 76 | 0.28197 | −0.04802 | 0.69444 |
| 77 | 0.28631 | 0.01562 | 0.69444 |
| 78 | 0.28762 | −0.05516 | 0.69444 |
| 79 | 0.29062 | 0.00760 | 0.69444 |
| 80 | 0.29323 | −0.06235 | 0.69444 |
| 81 | 0.29482 | −0.00048 | 0.69444 |
| 82 | 0.29877 | −0.06957 | 0.69444 |
| 83 | 0.29886 | −0.00866 | 0.69444 |
| 84 | 0.30270 | −0.01692 | 0.69444 |
| 85 | 0.30419 | −0.07690 | 0.69444 |
| 86 | 0.30633 | −0.02527 | 0.69444 |
| 87 | 0.30941 | −0.08436 | 0.69444 |
| 88 | 0.30978 | −0.03370 | 0.69444 |
| 89 | 0.31309 | −0.04218 | 0.69444 |
| 90 | 0.31439 | −0.09198 | 0.69444 |
| 91 | 0.31630 | −0.05071 | 0.69444 |
| 92 | 0.31919 | −0.09973 | 0.69444 |
| 93 | 0.31946 | −0.05925 | 0.69444 |
| 94 | 0.32257 | −0.06782 | 0.69444 |
| 95 | 0.32385 | −0.10755 | 0.69444 |
| 96 | 0.32566 | −0.07639 | 0.69444 |
| 97 | 0.32872 | −0.08497 | 0.69444 |
| 98 | 0.33173 | −0.09357 | 0.69444 |
| 99 | 0.33175 | −0.10990 | 0.69444 |
| 100 | 0.33467 | −0.10219 | 0.69444 |
| 1 | 0.02497 | −0.01410 | 0.72222 |
| 2 | 0.02554 | −0.00505 | 0.72222 |
| 3 | 0.02719 | 0.00388 | 0.72222 |
| 4 | 0.02725 | −0.02278 | 0.72222 |
| 5 | 0.02956 | 0.01267 | 0.72222 |
| 6 | 0.03247 | 0.02127 | 0.72222 |
| 7 | 0.03478 | −0.02734 | 0.72222 |
| 8 | 0.03592 | 0.02967 | 0.72222 |
| 9 | 0.03985 | 0.03785 | 0.72222 |
| 10 | 0.04380 | −0.02708 | 0.72222 |
| 11 | 0.04426 | 0.04578 | 0.72222 |
| 12 | 0.04910 | 0.05346 | 0.72222 |
| 13 | 0.05250 | −0.02452 | 0.72222 |
| 14 | 0.05435 | 0.06087 | 0.72222 |
| 15 | 0.05996 | 0.06802 | 0.72222 |
| 16 | 0.06074 | −0.02070 | 0.72222 |
| 17 | 0.06590 | 0.07488 | 0.72222 |
| 18 | 0.06862 | −0.01615 | 0.72222 |
| 19 | 0.07216 | 0.08147 | 0.72222 |

TABLE I-continued

Non-Dimensionalized [X Y Z/Span Height]

| N | X | Y | Z |
|---|---|---|---|
| 20 | 0.07622 | −0.01119 | 0.72222 |
| 21 | 0.07868 | 0.08780 | 0.72222 |
| 22 | 0.08366 | −0.00600 | 0.72222 |
| 23 | 0.08546 | 0.09383 | 0.72222 |
| 24 | 0.09115 | −0.00083 | 0.72222 |
| 25 | 0.09250 | 0.09957 | 0.72222 |
| 26 | 0.09886 | 0.00395 | 0.72222 |
| 27 | 0.09980 | 0.10497 | 0.72222 |
| 28 | 0.10694 | 0.00809 | 0.72222 |
| 29 | 0.10736 | 0.11000 | 0.72222 |
| 30 | 0.11520 | 0.11458 | 0.72222 |
| 31 | 0.11536 | 0.01150 | 0.72222 |
| 32 | 0.12332 | 0.11866 | 0.72222 |
| 33 | 0.12403 | 0.01418 | 0.72222 |
| 34 | 0.13171 | 0.12213 | 0.72222 |
| 35 | 0.13289 | 0.01616 | 0.72222 |
| 36 | 0.14037 | 0.12485 | 0.72222 |
| 37 | 0.14187 | 0.01755 | 0.72222 |
| 38 | 0.14926 | 0.12671 | 0.72222 |
| 39 | 0.15091 | 0.01839 | 0.72222 |
| 40 | 0.15829 | 0.12762 | 0.72222 |
| 41 | 0.15998 | 0.01864 | 0.72222 |
| 42 | 0.16737 | 0.12757 | 0.72222 |
| 43 | 0.16906 | 0.01827 | 0.72222 |
| 44 | 0.17639 | 0.12657 | 0.72222 |
| 45 | 0.17808 | 0.01727 | 0.72222 |
| 46 | 0.18526 | 0.12465 | 0.72222 |
| 47 | 0.18703 | 0.01568 | 0.72222 |
| 48 | 0.19390 | 0.12185 | 0.72222 |
| 49 | 0.19584 | 0.01350 | 0.72222 |
| 50 | 0.20224 | 0.11826 | 0.72222 |
| 51 | 0.20450 | 0.01076 | 0.72222 |
| 52 | 0.21023 | 0.11395 | 0.72222 |
| 53 | 0.21297 | 0.00749 | 0.72222 |
| 54 | 0.21784 | 0.10899 | 0.72222 |
| 55 | 0.22123 | 0.00371 | 0.72222 |
| 56 | 0.22503 | 0.10344 | 0.72222 |
| 57 | 0.22925 | −0.00055 | 0.72222 |
| 58 | 0.23177 | 0.09737 | 0.72222 |
| 59 | 0.23701 | −0.00527 | 0.72222 |
| 60 | 0.23808 | 0.09084 | 0.72222 |
| 61 | 0.24398 | 0.08393 | 0.72222 |
| 62 | 0.24447 | −0.01045 | 0.72222 |
| 63 | 0.24951 | 0.07673 | 0.72222 |
| 64 | 0.25162 | −0.01605 | 0.72222 |
| 65 | 0.25472 | 0.06929 | 0.72222 |
| 66 | 0.25842 | −0.02205 | 0.72222 |
| 67 | 0.25967 | 0.06167 | 0.72222 |
| 68 | 0.26441 | 0.05393 | 0.72222 |
| 69 | 0.26489 | −0.02844 | 0.72222 |
| 70 | 0.26899 | 0.04609 | 0.72222 |
| 71 | 0.27100 | −0.03515 | 0.72222 |
| 72 | 0.27344 | 0.03817 | 0.72222 |
| 73 | 0.27683 | −0.04211 | 0.72222 |
| 74 | 0.27780 | 0.03020 | 0.72222 |
| 75 | 0.28212 | 0.02220 | 0.72222 |
| 76 | 0.28247 | −0.04924 | 0.72222 |
| 77 | 0.28638 | 0.01418 | 0.72222 |
| 78 | 0.28802 | −0.05643 | 0.72222 |
| 79 | 0.29055 | 0.00610 | 0.72222 |
| 80 | 0.29350 | −0.06367 | 0.72222 |
| 81 | 0.29459 | −0.00202 | 0.72222 |
| 82 | 0.29849 | −0.01022 | 0.72222 |
| 83 | 0.29893 | −0.07096 | 0.72222 |
| 84 | 0.30219 | −0.01851 | 0.72222 |
| 85 | 0.30422 | −0.07834 | 0.72222 |
| 86 | 0.30575 | −0.02687 | 0.72222 |
| 87 | 0.30915 | −0.03529 | 0.72222 |
| 88 | 0.30931 | −0.08586 | 0.72222 |
| 89 | 0.31242 | −0.04376 | 0.72222 |
| 90 | 0.31417 | −0.09353 | 0.72222 |
| 91 | 0.31560 | −0.05227 | 0.72222 |
| 92 | 0.31873 | −0.06080 | 0.72222 |
| 93 | 0.31885 | −0.10130 | 0.72222 |
| 94 | 0.32182 | −0.06934 | 0.72222 |
| 95 | 0.32342 | −0.10916 | 0.72222 |
| 96 | 0.32489 | −0.07789 | 0.72222 |
| 97 | 0.32793 | −0.08645 | 0.72222 |
| 98 | 0.33092 | −0.09503 | 0.72222 |
| 99 | 0.33127 | −0.11142 | 0.72222 |
| 100 | 0.33383 | −0.10363 | 0.72222 |
| 1 | 0.02664 | −0.00939 | 0.75000 |
| 2 | 0.02717 | −0.00038 | 0.75000 |
| 3 | 0.02880 | −0.01806 | 0.75000 |
| 4 | 0.02886 | 0.00852 | 0.75000 |
| 5 | 0.03127 | 0.01725 | 0.75000 |
| 6 | 0.03423 | 0.02580 | 0.75000 |
| 7 | 0.03630 | −0.02262 | 0.75000 |
| 8 | 0.03769 | 0.03416 | 0.75000 |
| 9 | 0.04164 | 0.04229 | 0.75000 |
| 10 | 0.04529 | −0.02251 | 0.75000 |
| 11 | 0.04604 | 0.05019 | 0.75000 |
| 12 | 0.05087 | 0.05783 | 0.75000 |
| 13 | 0.05402 | −0.02022 | 0.75000 |
| 14 | 0.05609 | 0.06522 | 0.75000 |
| 15 | 0.06166 | 0.07235 | 0.75000 |
| 16 | 0.06234 | −0.01668 | 0.75000 |
| 17 | 0.06758 | 0.07920 | 0.75000 |
| 18 | 0.07034 | −0.01242 | 0.75000 |
| 19 | 0.07381 | 0.08575 | 0.75000 |
| 20 | 0.07810 | −0.00778 | 0.75000 |
| 21 | 0.08035 | 0.09200 | 0.75000 |
| 22 | 0.08571 | −0.00288 | 0.75000 |
| 23 | 0.08719 | 0.09791 | 0.75000 |
| 24 | 0.09334 | 0.00199 | 0.75000 |
| 25 | 0.09431 | 0.10349 | 0.75000 |
| 26 | 0.10116 | 0.00653 | 0.75000 |
| 27 | 0.10172 | 0.10867 | 0.75000 |
| 28 | 0.10931 | 0.01045 | 0.75000 |
| 29 | 0.10942 | 0.11341 | 0.75000 |
| 30 | 0.11741 | 0.11768 | 0.75000 |
| 31 | 0.11775 | 0.01369 | 0.75000 |
| 32 | 0.12565 | 0.12140 | 0.75000 |
| 33 | 0.12644 | 0.01619 | 0.75000 |
| 34 | 0.13415 | 0.12448 | 0.75000 |
| 35 | 0.13530 | 0.01800 | 0.75000 |
| 36 | 0.14290 | 0.12680 | 0.75000 |
| 37 | 0.14427 | 0.01921 | 0.75000 |
| 38 | 0.15181 | 0.12825 | 0.75000 |
| 39 | 0.15329 | 0.01983 | 0.75000 |
| 40 | 0.16084 | 0.12879 | 0.75000 |
| 41 | 0.16233 | 0.01987 | 0.75000 |
| 42 | 0.16988 | 0.12839 | 0.75000 |
| 43 | 0.17135 | 0.01927 | 0.75000 |
| 44 | 0.17882 | 0.12705 | 0.75000 |
| 45 | 0.18032 | 0.01806 | 0.75000 |
| 46 | 0.18757 | 0.12477 | 0.75000 |
| 47 | 0.18918 | 0.01625 | 0.75000 |
| 48 | 0.19605 | 0.12164 | 0.75000 |
| 49 | 0.19790 | 0.01385 | 0.75000 |
| 50 | 0.20420 | 0.11773 | 0.75000 |
| 51 | 0.20645 | 0.01089 | 0.75000 |
| 52 | 0.21200 | 0.11314 | 0.75000 |
| 53 | 0.21480 | 0.00741 | 0.75000 |
| 54 | 0.21939 | 0.10793 | 0.75000 |
| 55 | 0.22292 | 0.00343 | 0.75000 |
| 56 | 0.22638 | 0.10218 | 0.75000 |
| 57 | 0.23079 | −0.00105 | 0.75000 |
| 58 | 0.23293 | 0.09597 | 0.75000 |
| 59 | 0.23837 | −0.00596 | 0.75000 |
| 60 | 0.23909 | 0.08934 | 0.75000 |
| 61 | 0.24488 | 0.08238 | 0.75000 |
| 62 | 0.24566 | −0.01131 | 0.75000 |
| 63 | 0.25032 | 0.07515 | 0.75000 |
| 64 | 0.25263 | −0.01708 | 0.75000 |
| 65 | 0.25546 | 0.06771 | 0.75000 |
| 66 | 0.25928 | −0.02322 | 0.75000 |
| 67 | 0.26036 | 0.06010 | 0.75000 |
| 68 | 0.26503 | 0.05236 | 0.75000 |
| 69 | 0.26559 | −0.02970 | 0.75000 |
| 70 | 0.26953 | 0.04452 | 0.75000 |
| 71 | 0.27159 | −0.03647 | 0.75000 |

TABLE I-continued

Non-Dimensionalized [X Y Z/Span Height]

| N | X | Y | Z |
|---|---|---|---|
| 72 | 0.27388 | 0.03659 | 0.75000 |
| 73 | 0.27732 | −0.04346 | 0.75000 |
| 74 | 0.27813 | 0.02860 | 0.75000 |
| 75 | 0.28230 | 0.02056 | 0.75000 |
| 76 | 0.28287 | −0.05061 | 0.75000 |
| 77 | 0.28639 | 0.01249 | 0.75000 |
| 78 | 0.28833 | −0.05782 | 0.75000 |
| 79 | 0.29040 | 0.00438 | 0.75000 |
| 80 | 0.29370 | −0.06511 | 0.75000 |
| 81 | 0.29428 | −0.00379 | 0.75000 |
| 82 | 0.29804 | −0.01201 | 0.75000 |
| 83 | 0.29898 | −0.07245 | 0.75000 |
| 84 | 0.30165 | −0.02031 | 0.75000 |
| 85 | 0.30413 | −0.07989 | 0.75000 |
| 86 | 0.30511 | −0.02866 | 0.75000 |
| 87 | 0.30845 | −0.03707 | 0.75000 |
| 88 | 0.30908 | −0.08746 | 0.75000 |
| 89 | 0.31169 | −0.04551 | 0.75000 |
| 90 | 0.31382 | −0.09515 | 0.75000 |
| 91 | 0.31485 | −0.05400 | 0.75000 |
| 92 | 0.31796 | −0.06249 | 0.75000 |
| 93 | 0.31840 | −0.10296 | 0.75000 |
| 94 | 0.32104 | −0.07100 | 0.75000 |
| 95 | 0.32289 | −0.11082 | 0.75000 |
| 96 | 0.32410 | −0.07952 | 0.75000 |
| 97 | 0.32710 | −0.08805 | 0.75000 |
| 98 | 0.33008 | −0.09659 | 0.75000 |
| 99 | 0.33068 | −0.11299 | 0.75000 |
| 100 | 0.33298 | −0.10516 | 0.75000 |
| 1 | 0.02829 | −0.00375 | 0.77778 |
| 2 | 0.02887 | 0.00521 | 0.77778 |
| 3 | 0.03034 | −0.01241 | 0.77778 |
| 4 | 0.03059 | 0.01404 | 0.77778 |
| 5 | 0.03303 | 0.02273 | 0.77778 |
| 6 | 0.03600 | 0.03122 | 0.77778 |
| 7 | 0.03772 | −0.01703 | 0.77778 |
| 8 | 0.03949 | 0.03951 | 0.77778 |
| 9 | 0.04346 | 0.04758 | 0.77778 |
| 10 | 0.04667 | −0.01712 | 0.77778 |
| 11 | 0.04787 | 0.05542 | 0.77778 |
| 12 | 0.05269 | 0.06301 | 0.77778 |
| 13 | 0.05541 | −0.01507 | 0.77778 |
| 14 | 0.05790 | 0.07035 | 0.77778 |
| 15 | 0.06347 | 0.07742 | 0.77778 |
| 16 | 0.06380 | −0.01184 | 0.77778 |
| 17 | 0.06938 | 0.08422 | 0.77778 |
| 18 | 0.07193 | −0.00792 | 0.77778 |
| 19 | 0.07562 | 0.09069 | 0.77778 |
| 20 | 0.07984 | −0.00365 | 0.77778 |
| 21 | 0.08221 | 0.09682 | 0.77778 |
| 22 | 0.08765 | 0.00084 | 0.77778 |
| 23 | 0.08913 | 0.10257 | 0.77778 |
| 24 | 0.09546 | 0.00531 | 0.77778 |
| 25 | 0.09637 | 0.10792 | 0.77778 |
| 26 | 0.10344 | 0.00945 | 0.77778 |
| 27 | 0.10392 | 0.11281 | 0.77778 |
| 28 | 0.11169 | 0.01306 | 0.77778 |
| 29 | 0.11177 | 0.11723 | 0.77778 |
| 30 | 0.11989 | 0.12109 | 0.77778 |
| 31 | 0.12018 | 0.01601 | 0.77778 |
| 32 | 0.12828 | 0.12434 | 0.77778 |
| 33 | 0.12890 | 0.01826 | 0.77778 |
| 34 | 0.13689 | 0.12694 | 0.77778 |
| 35 | 0.13776 | 0.01982 | 0.77778 |
| 36 | 0.14571 | 0.12876 | 0.77778 |
| 37 | 0.14670 | 0.02078 | 0.77778 |
| 38 | 0.15465 | 0.12972 | 0.77778 |
| 39 | 0.15570 | 0.02116 | 0.77778 |
| 40 | 0.16365 | 0.12979 | 0.77778 |
| 41 | 0.16469 | 0.02093 | 0.77778 |
| 42 | 0.17261 | 0.12895 | 0.77778 |
| 43 | 0.17364 | 0.02007 | 0.77778 |
| 44 | 0.18142 | 0.12720 | 0.77778 |
| 45 | 0.18252 | 0.01859 | 0.77778 |
| 46 | 0.19001 | 0.12452 | 0.77778 |
| 47 | 0.19128 | 0.01651 | 0.77778 |
| 48 | 0.19829 | 0.12101 | 0.77778 |
| 49 | 0.19988 | 0.01386 | 0.77778 |
| 50 | 0.20622 | 0.11676 | 0.77778 |
| 51 | 0.20828 | 0.01066 | 0.77778 |
| 52 | 0.21377 | 0.11186 | 0.77778 |
| 53 | 0.21648 | 0.00695 | 0.77778 |
| 54 | 0.22091 | 0.10639 | 0.77778 |
| 55 | 0.22443 | 0.00273 | 0.77778 |
| 56 | 0.22766 | 0.10044 | 0.77778 |
| 57 | 0.23212 | −0.00194 | 0.77778 |
| 58 | 0.23402 | 0.09408 | 0.77778 |
| 59 | 0.23953 | −0.00705 | 0.77778 |
| 60 | 0.24001 | 0.08737 | 0.77778 |
| 61 | 0.24568 | 0.08037 | 0.77778 |
| 62 | 0.24664 | −0.01257 | 0.77778 |
| 63 | 0.25104 | 0.07314 | 0.77778 |
| 64 | 0.25344 | −0.01847 | 0.77778 |
| 65 | 0.25612 | 0.06571 | 0.77778 |
| 66 | 0.25993 | −0.02470 | 0.77778 |
| 67 | 0.26097 | 0.05813 | 0.77778 |
| 68 | 0.26559 | 0.05041 | 0.77778 |
| 69 | 0.26610 | −0.03124 | 0.77778 |
| 70 | 0.27003 | 0.04259 | 0.77778 |
| 71 | 0.27199 | −0.03803 | 0.77778 |
| 72 | 0.27431 | 0.03467 | 0.77778 |
| 73 | 0.27768 | −0.04501 | 0.77778 |
| 74 | 0.27845 | 0.02667 | 0.77778 |
| 75 | 0.28248 | 0.01862 | 0.77778 |
| 76 | 0.28318 | −0.05215 | 0.77778 |
| 77 | 0.28640 | 0.01052 | 0.77778 |
| 78 | 0.28855 | −0.05937 | 0.77778 |
| 79 | 0.29023 | 0.00237 | 0.77778 |
| 80 | 0.29380 | −0.06668 | 0.77778 |
| 81 | 0.29394 | −0.00583 | 0.77778 |
| 82 | 0.29755 | −0.01407 | 0.77778 |
| 83 | 0.29893 | −0.07408 | 0.77778 |
| 84 | 0.30105 | −0.02236 | 0.77778 |
| 85 | 0.30392 | −0.08157 | 0.77778 |
| 86 | 0.30442 | −0.03070 | 0.77778 |
| 87 | 0.30772 | −0.03908 | 0.77778 |
| 88 | 0.30874 | −0.08917 | 0.77778 |
| 89 | 0.31093 | −0.04748 | 0.77778 |
| 90 | 0.31336 | −0.09688 | 0.77778 |
| 91 | 0.31409 | −0.05592 | 0.77778 |
| 92 | 0.31720 | −0.06436 | 0.77778 |
| 93 | 0.31786 | −0.10468 | 0.77778 |
| 94 | 0.32028 | −0.07281 | 0.77778 |
| 95 | 0.32226 | −0.11253 | 0.77778 |
| 96 | 0.32332 | −0.08129 | 0.77778 |
| 97 | 0.32632 | −0.08978 | 0.77778 |
| 98 | 0.32925 | −0.09828 | 0.77778 |
| 99 | 0.33001 | −0.11466 | 0.77778 |
| 100 | 0.33212 | −0.10681 | 0.77778 |
| 1 | 0.03005 | 0.00240 | 0.80555 |
| 2 | 0.03058 | 0.01130 | 0.80555 |
| 3 | 0.03212 | −0.00620 | 0.80555 |
| 4 | 0.03229 | 0.02009 | 0.80555 |
| 5 | 0.03471 | 0.02871 | 0.80555 |
| 6 | 0.03769 | 0.03715 | 0.80555 |
| 7 | 0.03951 | −0.01070 | 0.80555 |
| 8 | 0.04118 | 0.04537 | 0.80555 |
| 9 | 0.04515 | 0.05338 | 0.80555 |
| 10 | 0.04841 | −0.01076 | 0.80555 |
| 11 | 0.04957 | 0.06114 | 0.80555 |
| 12 | 0.05440 | 0.06866 | 0.80555 |
| 13 | 0.05713 | −0.00887 | 0.80555 |
| 14 | 0.05963 | 0.07592 | 0.80555 |
| 15 | 0.06522 | 0.08290 | 0.80555 |
| 16 | 0.06555 | −0.00588 | 0.80555 |
| 17 | 0.07117 | 0.08958 | 0.80555 |
| 18 | 0.07377 | −0.00230 | 0.80555 |
| 19 | 0.07747 | 0.09592 | 0.80555 |
| 20 | 0.08183 | 0.00156 | 0.80555 |
| 21 | 0.08415 | 0.10187 | 0.80555 |
| 22 | 0.08981 | 0.00559 | 0.80555 |
| 23 | 0.09117 | 0.10739 | 0.80555 |

TABLE I-continued

Non-Dimensionalized [X Y Z/Span Height]

| N | X | Y | Z |
|---|---|---|---|
| 24 | 0.09782 | 0.00956 | 0.80555 |
| 25 | 0.09855 | 0.11245 | 0.80555 |
| 26 | 0.10599 | 0.01322 | 0.80555 |
| 27 | 0.10624 | 0.11700 | 0.80555 |
| 28 | 0.11424 | 0.12100 | 0.80555 |
| 29 | 0.11435 | 0.01638 | 0.80555 |
| 30 | 0.12251 | 0.12438 | 0.80555 |
| 31 | 0.12292 | 0.01892 | 0.80555 |
| 32 | 0.13102 | 0.12712 | 0.80555 |
| 33 | 0.13166 | 0.02079 | 0.80555 |
| 34 | 0.13973 | 0.12915 | 0.80555 |
| 35 | 0.14052 | 0.02200 | 0.80555 |
| 36 | 0.14858 | 0.13038 | 0.80555 |
| 37 | 0.14943 | 0.02263 | 0.80555 |
| 38 | 0.15751 | 0.13077 | 0.80555 |
| 39 | 0.15837 | 0.02267 | 0.80555 |
| 40 | 0.16643 | 0.13030 | 0.80555 |
| 41 | 0.16730 | 0.02211 | 0.80555 |
| 42 | 0.17526 | 0.12893 | 0.80555 |
| 43 | 0.17616 | 0.02093 | 0.80555 |
| 44 | 0.18392 | 0.12669 | 0.80555 |
| 45 | 0.18491 | 0.01913 | 0.80555 |
| 46 | 0.19230 | 0.12358 | 0.80555 |
| 47 | 0.19353 | 0.01672 | 0.80555 |
| 48 | 0.20034 | 0.11969 | 0.80555 |
| 49 | 0.20196 | 0.01375 | 0.80555 |
| 50 | 0.20802 | 0.11512 | 0.80555 |
| 51 | 0.21019 | 0.01025 | 0.80555 |
| 52 | 0.21531 | 0.10993 | 0.80555 |
| 53 | 0.21818 | 0.00625 | 0.80555 |
| 54 | 0.22220 | 0.10424 | 0.80555 |
| 55 | 0.22593 | 0.00179 | 0.80555 |
| 56 | 0.22872 | 0.09811 | 0.80555 |
| 57 | 0.23341 | −0.00311 | 0.80555 |
| 58 | 0.23488 | 0.09164 | 0.80555 |
| 59 | 0.24061 | −0.00840 | 0.80555 |
| 60 | 0.24071 | 0.08486 | 0.80555 |
| 61 | 0.24625 | 0.07784 | 0.80555 |
| 62 | 0.24752 | −0.01408 | 0.80555 |
| 63 | 0.25152 | 0.07061 | 0.80555 |
| 64 | 0.25414 | −0.02009 | 0.80555 |
| 65 | 0.25655 | 0.06321 | 0.80555 |
| 66 | 0.26047 | −0.02641 | 0.80555 |
| 67 | 0.26133 | 0.05566 | 0.80555 |
| 68 | 0.26591 | 0.04798 | 0.80555 |
| 69 | 0.26652 | −0.03298 | 0.80555 |
| 70 | 0.27029 | 0.04020 | 0.80555 |
| 71 | 0.27233 | −0.03978 | 0.80555 |
| 72 | 0.27451 | 0.03231 | 0.80555 |
| 73 | 0.27793 | −0.04675 | 0.80555 |
| 74 | 0.27856 | 0.02434 | 0.80555 |
| 75 | 0.28248 | 0.01629 | 0.80555 |
| 76 | 0.28335 | −0.05387 | 0.80555 |
| 77 | 0.28626 | 0.00819 | 0.80555 |
| 78 | 0.28862 | −0.06109 | 0.80555 |
| 79 | 0.28994 | 0.00004 | 0.80555 |
| 80 | 0.29351 | −0.00815 | 0.80555 |
| 81 | 0.29375 | −0.06841 | 0.80555 |
| 82 | 0.29699 | −0.01639 | 0.80555 |
| 83 | 0.29874 | −0.07584 | 0.80555 |
| 84 | 0.30039 | −0.02467 | 0.80555 |
| 85 | 0.30357 | −0.08336 | 0.80555 |
| 86 | 0.30371 | −0.03297 | 0.80555 |
| 87 | 0.30696 | −0.04130 | 0.80555 |
| 88 | 0.30825 | −0.09098 | 0.80555 |
| 89 | 0.31015 | −0.04965 | 0.80555 |
| 90 | 0.31278 | −0.09869 | 0.80555 |
| 91 | 0.31330 | −0.05802 | 0.80555 |
| 92 | 0.31641 | −0.06641 | 0.80555 |
| 93 | 0.31720 | −0.10647 | 0.80555 |
| 94 | 0.31947 | −0.07480 | 0.80555 |
| 95 | 0.32154 | −0.11428 | 0.80555 |
| 96 | 0.32249 | −0.08321 | 0.80555 |
| 97 | 0.32547 | −0.09165 | 0.80555 |
| 98 | 0.32839 | −0.10010 | 0.80555 |
| 99 | 0.32922 | −0.11639 | 0.80555 |
| 100 | 0.33126 | −0.10857 | 0.80555 |
| 1 | 0.03195 | 0.00866 | 0.83333 |
| 2 | 0.03236 | 0.01750 | 0.83333 |
| 3 | 0.03394 | 0.02623 | 0.83333 |
| 4 | 0.03435 | 0.00023 | 0.83333 |
| 5 | 0.03628 | 0.03481 | 0.83333 |
| 6 | 0.03918 | 0.04320 | 0.83333 |
| 7 | 0.04205 | −0.00363 | 0.83333 |
| 8 | 0.04261 | 0.05138 | 0.83333 |
| 9 | 0.04655 | 0.05933 | 0.83333 |
| 10 | 0.05089 | −0.00342 | 0.83333 |
| 11 | 0.05096 | 0.06702 | 0.83333 |
| 12 | 0.05581 | 0.07445 | 0.83333 |
| 13 | 0.05955 | −0.00152 | 0.83333 |
| 14 | 0.06107 | 0.08159 | 0.83333 |
| 15 | 0.06672 | 0.08844 | 0.83333 |
| 16 | 0.06796 | 0.00131 | 0.83333 |
| 17 | 0.07274 | 0.09496 | 0.83333 |
| 18 | 0.07622 | 0.00458 | 0.83333 |
| 19 | 0.07915 | 0.10109 | 0.83333 |
| 20 | 0.08439 | 0.00805 | 0.83333 |
| 21 | 0.08594 | 0.10679 | 0.83333 |
| 22 | 0.09252 | 0.01160 | 0.83333 |
| 23 | 0.09311 | 0.11203 | 0.83333 |
| 24 | 0.10062 | 0.11675 | 0.83333 |
| 25 | 0.10071 | 0.01502 | 0.83333 |
| 26 | 0.10846 | 0.12091 | 0.83333 |
| 27 | 0.10903 | 0.01812 | 0.83333 |
| 28 | 0.11660 | 0.12444 | 0.83333 |
| 29 | 0.11751 | 0.02071 | 0.83333 |
| 30 | 0.12500 | 0.12731 | 0.83333 |
| 31 | 0.12615 | 0.02273 | 0.83333 |
| 32 | 0.13360 | 0.12947 | 0.83333 |
| 33 | 0.13492 | 0.02409 | 0.83333 |
| 34 | 0.14236 | 0.13087 | 0.83333 |
| 35 | 0.14377 | 0.02483 | 0.83333 |
| 36 | 0.15121 | 0.13146 | 0.83333 |
| 37 | 0.15264 | 0.02500 | 0.83333 |
| 38 | 0.16008 | 0.13119 | 0.83333 |
| 39 | 0.16150 | 0.02461 | 0.83333 |
| 40 | 0.16888 | 0.13007 | 0.83333 |
| 41 | 0.17032 | 0.02365 | 0.83333 |
| 42 | 0.17754 | 0.12812 | 0.83333 |
| 43 | 0.17905 | 0.02206 | 0.83333 |
| 44 | 0.18596 | 0.12535 | 0.83333 |
| 45 | 0.18764 | 0.01986 | 0.83333 |
| 46 | 0.19410 | 0.12180 | 0.83333 |
| 47 | 0.19607 | 0.01705 | 0.83333 |
| 48 | 0.20188 | 0.11755 | 0.83333 |
| 49 | 0.20427 | 0.01369 | 0.83333 |
| 50 | 0.20930 | 0.11269 | 0.83333 |
| 51 | 0.21226 | 0.00982 | 0.83333 |
| 52 | 0.21635 | 0.10730 | 0.83333 |
| 53 | 0.22001 | 0.00550 | 0.83333 |
| 54 | 0.22302 | 0.10145 | 0.83333 |
| 55 | 0.22751 | 0.00075 | 0.83333 |
| 56 | 0.22934 | 0.09522 | 0.83333 |
| 57 | 0.23474 | −0.00439 | 0.83333 |
| 58 | 0.23534 | 0.08868 | 0.83333 |
| 59 | 0.24104 | 0.08188 | 0.83333 |
| 60 | 0.24170 | −0.00988 | 0.83333 |
| 61 | 0.24647 | 0.07485 | 0.83333 |
| 62 | 0.24840 | −0.01571 | 0.83333 |
| 63 | 0.25163 | 0.06764 | 0.83333 |
| 64 | 0.25482 | −0.02184 | 0.83333 |
| 65 | 0.25657 | 0.06026 | 0.83333 |
| 66 | 0.26097 | −0.02824 | 0.83333 |
| 67 | 0.26129 | 0.05275 | 0.83333 |
| 68 | 0.26580 | 0.04510 | 0.83333 |
| 69 | 0.26687 | −0.03485 | 0.83333 |
| 70 | 0.27012 | 0.03736 | 0.83333 |
| 71 | 0.27257 | −0.04167 | 0.83333 |
| 72 | 0.27428 | 0.02952 | 0.83333 |
| 73 | 0.27805 | −0.04864 | 0.83333 |
| 74 | 0.27827 | 0.02159 | 0.83333 |
| 75 | 0.28212 | 0.01359 | 0.83333 |

TABLE I-continued

Non-Dimensionalized [X Y Z/Span Height]

| N | X | Y | Z |
|---|---|---|---|
| 76 | 0.28336 | −0.05575 | 0.83333 |
| 77 | 0.28583 | 0.00553 | 0.83333 |
| 78 | 0.28852 | −0.06298 | 0.83333 |
| 79 | 0.28943 | −0.00259 | 0.83333 |
| 80 | 0.29293 | −0.01074 | 0.83333 |
| 81 | 0.29352 | −0.07031 | 0.83333 |
| 82 | 0.29634 | −0.01893 | 0.83333 |
| 83 | 0.29838 | −0.07774 | 0.83333 |
| 84 | 0.29968 | −0.02716 | 0.83333 |
| 85 | 0.30295 | −0.03541 | 0.83333 |
| 86 | 0.30308 | −0.08526 | 0.83333 |
| 87 | 0.30617 | −0.04368 | 0.83333 |
| 88 | 0.30764 | −0.09288 | 0.83333 |
| 89 | 0.30934 | −0.05197 | 0.83333 |
| 90 | 0.31207 | −0.10057 | 0.83333 |
| 91 | 0.31246 | −0.06027 | 0.83333 |
| 92 | 0.31555 | −0.06859 | 0.83333 |
| 93 | 0.31640 | −0.10831 | 0.83333 |
| 94 | 0.31859 | −0.07693 | 0.83333 |
| 95 | 0.32068 | −0.11609 | 0.83333 |
| 96 | 0.32161 | −0.08527 | 0.83333 |
| 97 | 0.32457 | −0.09364 | 0.83333 |
| 98 | 0.32748 | −0.10203 | 0.83333 |
| 99 | 0.32830 | −0.11819 | 0.83333 |
| 100 | 0.33033 | −0.11043 | 0.83333 |
| 1 | 0.03399 | 0.01489 | 0.86111 |
| 2 | 0.03410 | 0.02368 | 0.86111 |
| 3 | 0.03550 | 0.03237 | 0.86111 |
| 4 | 0.03709 | 0.00686 | 0.86111 |
| 5 | 0.03772 | 0.04092 | 0.86111 |
| 6 | 0.04052 | 0.04927 | 0.86111 |
| 7 | 0.04388 | 0.05741 | 0.86111 |
| 8 | 0.04524 | 0.00403 | 0.86111 |
| 9 | 0.04776 | 0.06530 | 0.86111 |
| 10 | 0.05215 | 0.07294 | 0.86111 |
| 11 | 0.05401 | 0.00466 | 0.86111 |
| 12 | 0.05701 | 0.08028 | 0.86111 |
| 13 | 0.06231 | 0.08730 | 0.86111 |
| 14 | 0.06257 | 0.00664 | 0.86111 |
| 15 | 0.06805 | 0.09398 | 0.86111 |
| 16 | 0.07096 | 0.00935 | 0.86111 |
| 17 | 0.07419 | 0.10030 | 0.86111 |
| 18 | 0.07925 | 0.01233 | 0.86111 |
| 19 | 0.08074 | 0.10619 | 0.86111 |
| 20 | 0.08750 | 0.01541 | 0.86111 |
| 21 | 0.08767 | 0.11162 | 0.86111 |
| 22 | 0.09498 | 0.11652 | 0.86111 |
| 23 | 0.09576 | 0.01847 | 0.86111 |
| 24 | 0.10264 | 0.12087 | 0.86111 |
| 25 | 0.10410 | 0.02133 | 0.86111 |
| 26 | 0.11061 | 0.12459 | 0.86111 |
| 27 | 0.11255 | 0.02381 | 0.86111 |
| 28 | 0.11887 | 0.12765 | 0.86111 |
| 29 | 0.12112 | 0.02579 | 0.86111 |
| 30 | 0.12736 | 0.12997 | 0.86111 |
| 31 | 0.12981 | 0.02718 | 0.86111 |
| 32 | 0.13602 | 0.13153 | 0.86111 |
| 33 | 0.13858 | 0.02794 | 0.86111 |
| 34 | 0.14480 | 0.13227 | 0.86111 |
| 35 | 0.14739 | 0.02812 | 0.86111 |
| 36 | 0.15360 | 0.13218 | 0.86111 |
| 37 | 0.15619 | 0.02777 | 0.86111 |
| 38 | 0.16236 | 0.13124 | 0.86111 |
| 39 | 0.16495 | 0.02690 | 0.86111 |
| 40 | 0.17098 | 0.12944 | 0.86111 |
| 41 | 0.17364 | 0.02546 | 0.86111 |
| 42 | 0.17939 | 0.12686 | 0.86111 |
| 43 | 0.18220 | 0.02341 | 0.86111 |
| 44 | 0.18754 | 0.12354 | 0.86111 |
| 45 | 0.19060 | 0.02075 | 0.86111 |
| 46 | 0.19540 | 0.11956 | 0.86111 |
| 47 | 0.19878 | 0.01750 | 0.86111 |
| 48 | 0.20292 | 0.11498 | 0.86111 |
| 49 | 0.20673 | 0.01370 | 0.86111 |
| 50 | 0.21009 | 0.10988 | 0.86111 |
| 51 | 0.21442 | 0.00943 | 0.86111 |
| 52 | 0.21692 | 0.10431 | 0.86111 |
| 53 | 0.22189 | 0.00476 | 0.86111 |
| 54 | 0.22341 | 0.09836 | 0.86111 |
| 55 | 0.22911 | −0.00029 | 0.86111 |
| 56 | 0.22958 | 0.09208 | 0.86111 |
| 57 | 0.23544 | 0.08551 | 0.86111 |
| 58 | 0.23607 | −0.00567 | 0.86111 |
| 59 | 0.24102 | 0.07869 | 0.86111 |
| 60 | 0.24279 | −0.01137 | 0.86111 |
| 61 | 0.24633 | 0.07168 | 0.86111 |
| 62 | 0.24925 | −0.01736 | 0.86111 |
| 63 | 0.25141 | 0.06447 | 0.86111 |
| 64 | 0.25545 | −0.02360 | 0.86111 |
| 65 | 0.25625 | 0.05711 | 0.86111 |
| 66 | 0.26089 | 0.04962 | 0.86111 |
| 67 | 0.26141 | −0.03008 | 0.86111 |
| 68 | 0.26533 | 0.04202 | 0.86111 |
| 69 | 0.26716 | −0.03676 | 0.86111 |
| 70 | 0.26960 | 0.03432 | 0.86111 |
| 71 | 0.27270 | −0.04360 | 0.86111 |
| 72 | 0.27369 | 0.02653 | 0.86111 |
| 73 | 0.27764 | 0.01865 | 0.86111 |
| 74 | 0.27805 | −0.05060 | 0.86111 |
| 75 | 0.28146 | 0.01071 | 0.86111 |
| 76 | 0.28324 | −0.05771 | 0.86111 |
| 77 | 0.28514 | 0.00271 | 0.86111 |
| 78 | 0.28827 | −0.06496 | 0.86111 |
| 79 | 0.28871 | −0.00533 | 0.86111 |
| 80 | 0.29220 | −0.01343 | 0.86111 |
| 81 | 0.29314 | −0.07229 | 0.86111 |
| 82 | 0.29559 | −0.02155 | 0.86111 |
| 83 | 0.29788 | −0.07971 | 0.86111 |
| 84 | 0.29890 | −0.02972 | 0.86111 |
| 85 | 0.30214 | −0.03790 | 0.86111 |
| 86 | 0.30246 | −0.08722 | 0.86111 |
| 87 | 0.30534 | −0.04611 | 0.86111 |
| 88 | 0.30692 | −0.09482 | 0.86111 |
| 89 | 0.30847 | −0.05434 | 0.86111 |
| 90 | 0.31126 | −0.10249 | 0.86111 |
| 91 | 0.31157 | −0.06258 | 0.86111 |
| 92 | 0.31463 | −0.07084 | 0.86111 |
| 93 | 0.31553 | −0.11019 | 0.86111 |
| 94 | 0.31765 | −0.07912 | 0.86111 |
| 95 | 0.31975 | −0.11792 | 0.86111 |
| 96 | 0.32064 | −0.08739 | 0.86111 |
| 97 | 0.32359 | −0.09569 | 0.86111 |
| 98 | 0.32649 | −0.10401 | 0.86111 |
| 99 | 0.32731 | −0.12003 | 0.86111 |
| 100 | 0.32934 | −0.11235 | 0.86111 |
| 1 | 0.03576 | 0.03007 | 0.88889 |
| 2 | 0.03599 | 0.02135 | 0.88889 |
| 3 | 0.03695 | 0.03871 | 0.88889 |
| 4 | 0.03908 | 0.04721 | 0.88889 |
| 5 | 0.04032 | 0.01413 | 0.88889 |
| 6 | 0.04182 | 0.05552 | 0.88889 |
| 7 | 0.04514 | 0.06360 | 0.88889 |
| 8 | 0.04882 | 0.01248 | 0.88889 |
| 9 | 0.04901 | 0.07144 | 0.88889 |
| 10 | 0.05342 | 0.07898 | 0.88889 |
| 11 | 0.05750 | 0.01344 | 0.88889 |
| 12 | 0.05833 | 0.08621 | 0.88889 |
| 13 | 0.06372 | 0.09309 | 0.88889 |
| 14 | 0.06600 | 0.01544 | 0.88889 |
| 15 | 0.06956 | 0.09959 | 0.88889 |
| 16 | 0.07438 | 0.01796 | 0.88889 |
| 17 | 0.07584 | 0.10567 | 0.88889 |
| 18 | 0.08253 | 0.11129 | 0.88889 |
| 19 | 0.08271 | 0.02061 | 0.88889 |
| 20 | 0.08962 | 0.11640 | 0.88889 |
| 21 | 0.09105 | 0.02327 | 0.88889 |
| 22 | 0.09709 | 0.12096 | 0.88889 |
| 23 | 0.09942 | 0.02580 | 0.88889 |
| 24 | 0.10489 | 0.12489 | 0.88889 |
| 25 | 0.10786 | 0.02806 | 0.88889 |
| 26 | 0.11300 | 0.12815 | 0.88889 |
| 27 | 0.11640 | 0.02990 | 0.88889 |

TABLE I-continued

Non-Dimensionalized [X Y Z/Span Height]

| N | X | Y | Z |
|---|---|---|---|
| 28 | 0.12137 | 0.13067 | 0.88889 |
| 29 | 0.12504 | 0.03123 | 0.88889 |
| 30 | 0.12994 | 0.13243 | 0.88889 |
| 31 | 0.13375 | 0.03196 | 0.88889 |
| 32 | 0.13862 | 0.13337 | 0.88889 |
| 33 | 0.14250 | 0.03208 | 0.88889 |
| 34 | 0.14736 | 0.13346 | 0.88889 |
| 35 | 0.15123 | 0.03165 | 0.88889 |
| 36 | 0.15607 | 0.13270 | 0.88889 |
| 37 | 0.15992 | 0.03073 | 0.88889 |
| 38 | 0.16466 | 0.13110 | 0.88889 |
| 39 | 0.16855 | 0.02930 | 0.88889 |
| 40 | 0.17305 | 0.12868 | 0.88889 |
| 41 | 0.17706 | 0.02734 | 0.88889 |
| 42 | 0.18120 | 0.12550 | 0.88889 |
| 43 | 0.18542 | 0.02478 | 0.88889 |
| 44 | 0.18906 | 0.12167 | 0.88889 |
| 45 | 0.19358 | 0.02163 | 0.88889 |
| 46 | 0.19662 | 0.11728 | 0.88889 |
| 47 | 0.20149 | 0.01792 | 0.88889 |
| 48 | 0.20385 | 0.11239 | 0.88889 |
| 49 | 0.20914 | 0.01370 | 0.88889 |
| 50 | 0.21077 | 0.10704 | 0.88889 |
| 51 | 0.21655 | 0.00906 | 0.88889 |
| 52 | 0.21738 | 0.10130 | 0.88889 |
| 53 | 0.22368 | 0.09524 | 0.88889 |
| 54 | 0.22371 | 0.00404 | 0.88889 |
| 55 | 0.22969 | 0.08890 | 0.88889 |
| 56 | 0.23064 | −0.00130 | 0.88889 |
| 57 | 0.23542 | 0.08230 | 0.88889 |
| 58 | 0.23733 | −0.00693 | 0.88889 |
| 59 | 0.24089 | 0.07548 | 0.88889 |
| 60 | 0.24377 | −0.01284 | 0.88889 |
| 61 | 0.24610 | 0.06846 | 0.88889 |
| 62 | 0.24998 | −0.01898 | 0.88889 |
| 63 | 0.25109 | 0.06127 | 0.88889 |
| 64 | 0.25585 | 0.05394 | 0.88889 |
| 65 | 0.25597 | −0.02536 | 0.88889 |
| 66 | 0.26041 | 0.04648 | 0.88889 |
| 67 | 0.26175 | −0.03193 | 0.88889 |
| 68 | 0.26479 | 0.03891 | 0.88889 |
| 69 | 0.26730 | −0.03867 | 0.88889 |
| 70 | 0.26900 | 0.03126 | 0.88889 |
| 71 | 0.27269 | −0.04556 | 0.88889 |
| 72 | 0.27306 | 0.02351 | 0.88889 |
| 73 | 0.27697 | 0.01569 | 0.88889 |
| 74 | 0.27790 | −0.05258 | 0.88889 |
| 75 | 0.28075 | 0.00781 | 0.88889 |
| 76 | 0.28295 | −0.05972 | 0.88889 |
| 77 | 0.28441 | −0.00013 | 0.88889 |
| 78 | 0.28785 | −0.06695 | 0.88889 |
| 79 | 0.28797 | −0.00813 | 0.88889 |
| 80 | 0.29143 | −0.01616 | 0.88889 |
| 81 | 0.29263 | −0.07428 | 0.88889 |
| 82 | 0.29481 | −0.02422 | 0.88889 |
| 83 | 0.29725 | −0.08170 | 0.88889 |
| 84 | 0.29810 | −0.03231 | 0.88889 |
| 85 | 0.30133 | −0.04044 | 0.88889 |
| 86 | 0.30176 | −0.08919 | 0.88889 |
| 87 | 0.30450 | −0.04858 | 0.88889 |
| 88 | 0.30613 | −0.09677 | 0.88889 |
| 89 | 0.30762 | −0.05676 | 0.88889 |
| 90 | 0.31040 | −0.10439 | 0.88889 |
| 91 | 0.31069 | −0.06495 | 0.88889 |
| 92 | 0.31371 | −0.07315 | 0.88889 |
| 93 | 0.31460 | −0.11205 | 0.88889 |
| 94 | 0.31672 | −0.08135 | 0.88889 |
| 95 | 0.31876 | −0.11974 | 0.88889 |
| 96 | 0.31970 | −0.08958 | 0.88889 |
| 97 | 0.32264 | −0.09780 | 0.88889 |
| 98 | 0.32554 | −0.10606 | 0.88889 |
| 99 | 0.32626 | −0.12191 | 0.88889 |
| 100 | 0.32837 | −0.11433 | 0.88889 |
| 1 | 0.03710 | 0.03714 | 0.91667 |
| 2 | 0.03800 | 0.02857 | 0.91667 |
| 3 | 0.03814 | 0.04573 | 0.91667 |
| 4 | 0.04025 | 0.05415 | 0.91667 |
| 5 | 0.04304 | 0.06237 | 0.91667 |
| 6 | 0.04414 | 0.02303 | 0.91667 |
| 7 | 0.04645 | 0.07034 | 0.91667 |
| 8 | 0.05044 | 0.07804 | 0.91667 |
| 9 | 0.05276 | 0.02239 | 0.91667 |
| 10 | 0.05497 | 0.08543 | 0.91667 |
| 11 | 0.06002 | 0.09247 | 0.91667 |
| 12 | 0.06136 | 0.02349 | 0.91667 |
| 13 | 0.06558 | 0.09913 | 0.91667 |
| 14 | 0.06983 | 0.02530 | 0.91667 |
| 15 | 0.07161 | 0.10537 | 0.91667 |
| 16 | 0.07807 | 0.11115 | 0.91667 |
| 17 | 0.07825 | 0.02744 | 0.91667 |
| 18 | 0.08495 | 0.11641 | 0.91667 |
| 19 | 0.08664 | 0.02961 | 0.91667 |
| 20 | 0.09224 | 0.12112 | 0.91667 |
| 21 | 0.09506 | 0.03171 | 0.91667 |
| 22 | 0.09988 | 0.12521 | 0.91667 |
| 23 | 0.10352 | 0.03361 | 0.91667 |
| 24 | 0.10785 | 0.12862 | 0.91667 |
| 25 | 0.11205 | 0.03517 | 0.91667 |
| 26 | 0.11610 | 0.13130 | 0.91667 |
| 27 | 0.12066 | 0.03628 | 0.91667 |
| 28 | 0.12455 | 0.13321 | 0.91667 |
| 29 | 0.12931 | 0.03685 | 0.91667 |
| 30 | 0.13315 | 0.13432 | 0.91667 |
| 31 | 0.13798 | 0.03682 | 0.91667 |
| 32 | 0.14182 | 0.13460 | 0.91667 |
| 33 | 0.14663 | 0.03623 | 0.91667 |
| 34 | 0.15047 | 0.13404 | 0.91667 |
| 35 | 0.15523 | 0.03512 | 0.91667 |
| 36 | 0.15903 | 0.13263 | 0.91667 |
| 37 | 0.16376 | 0.03354 | 0.91667 |
| 38 | 0.16741 | 0.13042 | 0.91667 |
| 39 | 0.17218 | 0.03149 | 0.91667 |
| 40 | 0.17555 | 0.12744 | 0.91667 |
| 41 | 0.18046 | 0.02891 | 0.91667 |
| 42 | 0.18340 | 0.12376 | 0.91667 |
| 43 | 0.18856 | 0.02580 | 0.91667 |
| 44 | 0.19095 | 0.11950 | 0.91667 |
| 45 | 0.19642 | 0.02214 | 0.91667 |
| 46 | 0.19820 | 0.11474 | 0.91667 |
| 47 | 0.20402 | 0.01798 | 0.91667 |
| 48 | 0.20514 | 0.10955 | 0.91667 |
| 49 | 0.21136 | 0.01336 | 0.91667 |
| 50 | 0.21179 | 0.10398 | 0.91667 |
| 51 | 0.21816 | 0.09808 | 0.91667 |
| 52 | 0.21846 | 0.00837 | 0.91667 |
| 53 | 0.22425 | 0.09191 | 0.91667 |
| 54 | 0.22531 | 0.00305 | 0.91667 |
| 55 | 0.23009 | 0.08550 | 0.91667 |
| 56 | 0.23193 | −0.00254 | 0.91667 |
| 57 | 0.23566 | 0.07886 | 0.91667 |
| 58 | 0.23833 | −0.00840 | 0.91667 |
| 59 | 0.24099 | 0.07202 | 0.91667 |
| 60 | 0.24451 | −0.01448 | 0.91667 |
| 61 | 0.24609 | 0.06500 | 0.91667 |
| 62 | 0.25048 | −0.02078 | 0.91667 |
| 63 | 0.25097 | 0.05783 | 0.91667 |
| 64 | 0.25565 | 0.05053 | 0.91667 |
| 65 | 0.25623 | −0.02727 | 0.91667 |
| 66 | 0.26014 | 0.04311 | 0.91667 |
| 67 | 0.26179 | −0.03392 | 0.91667 |
| 68 | 0.26446 | 0.03559 | 0.91667 |
| 69 | 0.26717 | −0.04073 | 0.91667 |
| 70 | 0.26863 | 0.02798 | 0.91667 |
| 71 | 0.27239 | −0.04765 | 0.91667 |
| 72 | 0.27264 | 0.02030 | 0.91667 |
| 73 | 0.27651 | 0.01254 | 0.91667 |
| 74 | 0.27745 | −0.05470 | 0.91667 |
| 75 | 0.28026 | 0.00472 | 0.91667 |
| 76 | 0.28237 | −0.06184 | 0.91667 |
| 77 | 0.28391 | −0.00316 | 0.91667 |
| 78 | 0.28717 | −0.06907 | 0.91667 |
| 79 | 0.28743 | −0.01108 | 0.91667 |

TABLE I-continued

Non-Dimensionalized [X Y Z/Span Height]

| N | X | Y | Z |
|---|---|---|---|
| 80 | 0.29087 | −0.01905 | 0.91667 |
| 81 | 0.29184 | −0.07638 | 0.91667 |
| 82 | 0.29422 | −0.02704 | 0.91667 |
| 83 | 0.29640 | −0.08375 | 0.91667 |
| 84 | 0.29749 | −0.03508 | 0.91667 |
| 85 | 0.30070 | −0.04313 | 0.91667 |
| 86 | 0.30083 | −0.09121 | 0.91667 |
| 87 | 0.30385 | −0.05122 | 0.91667 |
| 88 | 0.30515 | −0.09873 | 0.91667 |
| 89 | 0.30695 | −0.05932 | 0.91667 |
| 90 | 0.30937 | −0.10630 | 0.91667 |
| 91 | 0.31000 | −0.06743 | 0.91667 |
| 92 | 0.31301 | −0.07557 | 0.91667 |
| 93 | 0.31354 | −0.11391 | 0.91667 |
| 94 | 0.31599 | −0.08372 | 0.91667 |
| 95 | 0.31768 | −0.12152 | 0.91667 |
| 96 | 0.31894 | −0.09187 | 0.91667 |
| 97 | 0.32186 | −0.10003 | 0.91667 |
| 98 | 0.32474 | −0.10821 | 0.91667 |
| 99 | 0.32511 | −0.12382 | 0.91667 |
| 100 | 0.32757 | −0.11641 | 0.91667 |
| 1 | 0.03818 | 0.04499 | 0.94444 |
| 2 | 0.03899 | 0.05353 | 0.94444 |
| 3 | 0.04053 | 0.03689 | 0.94444 |
| 4 | 0.04113 | 0.06187 | 0.94444 |
| 5 | 0.04408 | 0.06996 | 0.94444 |
| 6 | 0.04768 | 0.07777 | 0.94444 |
| 7 | 0.04826 | 0.03359 | 0.94444 |
| 8 | 0.05189 | 0.08526 | 0.94444 |
| 9 | 0.05666 | 0.09243 | 0.94444 |
| 10 | 0.05685 | 0.03340 | 0.94444 |
| 11 | 0.06196 | 0.09920 | 0.94444 |
| 12 | 0.06539 | 0.03433 | 0.94444 |
| 13 | 0.06775 | 0.10556 | 0.94444 |
| 14 | 0.07388 | 0.03576 | 0.94444 |
| 15 | 0.07400 | 0.11146 | 0.94444 |
| 16 | 0.08070 | 0.11686 | 0.94444 |
| 17 | 0.08234 | 0.03735 | 0.94444 |
| 18 | 0.08781 | 0.12170 | 0.94444 |
| 19 | 0.09080 | 0.03888 | 0.94444 |
| 20 | 0.09532 | 0.12590 | 0.94444 |
| 21 | 0.09930 | 0.04029 | 0.94444 |
| 22 | 0.10316 | 0.12943 | 0.94444 |
| 23 | 0.10782 | 0.04142 | 0.94444 |
| 24 | 0.11129 | 0.13221 | 0.94444 |
| 25 | 0.11640 | 0.04218 | 0.94444 |
| 26 | 0.11966 | 0.13421 | 0.94444 |
| 27 | 0.12499 | 0.04246 | 0.94444 |
| 28 | 0.12817 | 0.13541 | 0.94444 |
| 29 | 0.13359 | 0.04220 | 0.94444 |
| 30 | 0.13677 | 0.13579 | 0.94444 |
| 31 | 0.14216 | 0.04138 | 0.94444 |
| 32 | 0.14536 | 0.13535 | 0.94444 |
| 33 | 0.15065 | 0.04002 | 0.94444 |
| 34 | 0.15386 | 0.13410 | 0.94444 |
| 35 | 0.15905 | 0.03818 | 0.94444 |
| 36 | 0.16222 | 0.13207 | 0.94444 |
| 37 | 0.16735 | 0.03592 | 0.94444 |
| 38 | 0.17037 | 0.12930 | 0.94444 |
| 39 | 0.17551 | 0.03320 | 0.94444 |
| 40 | 0.17824 | 0.12583 | 0.94444 |
| 41 | 0.18350 | 0.03001 | 0.94444 |
| 42 | 0.18580 | 0.12173 | 0.94444 |
| 43 | 0.19129 | 0.02634 | 0.94444 |
| 44 | 0.19305 | 0.11710 | 0.94444 |
| 45 | 0.19882 | 0.02221 | 0.94444 |
| 46 | 0.20000 | 0.11203 | 0.94444 |
| 47 | 0.20611 | 0.01763 | 0.94444 |
| 48 | 0.20665 | 0.10659 | 0.94444 |
| 49 | 0.21304 | 0.10081 | 0.94444 |
| 50 | 0.21313 | 0.01267 | 0.94444 |
| 51 | 0.21915 | 0.09476 | 0.94444 |
| 52 | 0.21991 | 0.00737 | 0.94444 |
| 53 | 0.22503 | 0.08848 | 0.94444 |
| 54 | 0.22647 | 0.00179 | 0.94444 |
| 55 | 0.23068 | 0.08199 | 0.94444 |

TABLE I-continued

Non-Dimensionalized [X Y Z/Span Height]

| N | X | Y | Z |
|---|---|---|---|
| 56 | 0.23281 | −0.00402 | 0.94444 |
| 57 | 0.23609 | 0.07530 | 0.94444 |
| 58 | 0.23893 | −0.01006 | 0.94444 |
| 59 | 0.24128 | 0.06845 | 0.94444 |
| 60 | 0.24486 | −0.01630 | 0.94444 |
| 61 | 0.24625 | 0.06143 | 0.94444 |
| 62 | 0.25058 | −0.02272 | 0.94444 |
| 63 | 0.25103 | 0.05427 | 0.94444 |
| 64 | 0.25563 | 0.04699 | 0.94444 |
| 65 | 0.25612 | −0.02930 | 0.94444 |
| 66 | 0.26005 | 0.03962 | 0.94444 |
| 67 | 0.26149 | −0.03604 | 0.94444 |
| 68 | 0.26432 | 0.03214 | 0.94444 |
| 69 | 0.26670 | −0.04288 | 0.94444 |
| 70 | 0.26845 | 0.02460 | 0.94444 |
| 71 | 0.27175 | −0.04984 | 0.94444 |
| 72 | 0.27242 | 0.01697 | 0.94444 |
| 73 | 0.27627 | 0.00927 | 0.94444 |
| 74 | 0.27668 | −0.05689 | 0.94444 |
| 75 | 0.28000 | 0.00152 | 0.94444 |
| 76 | 0.28148 | −0.06402 | 0.94444 |
| 77 | 0.28361 | −0.00629 | 0.94444 |
| 78 | 0.28619 | −0.07124 | 0.94444 |
| 79 | 0.28711 | −0.01415 | 0.94444 |
| 80 | 0.29052 | −0.02205 | 0.94444 |
| 81 | 0.29079 | −0.07851 | 0.94444 |
| 82 | 0.29385 | −0.02998 | 0.94444 |
| 83 | 0.29530 | −0.08584 | 0.94444 |
| 84 | 0.29709 | −0.03795 | 0.94444 |
| 85 | 0.29971 | −0.09322 | 0.94444 |
| 86 | 0.30028 | −0.04594 | 0.94444 |
| 87 | 0.30340 | −0.05396 | 0.94444 |
| 88 | 0.30400 | −0.10068 | 0.94444 |
| 89 | 0.30649 | −0.06199 | 0.94444 |
| 90 | 0.30821 | −0.10819 | 0.94444 |
| 91 | 0.30953 | −0.07005 | 0.94444 |
| 92 | 0.31235 | −0.11572 | 0.94444 |
| 93 | 0.31253 | −0.07810 | 0.94444 |
| 94 | 0.31549 | −0.08619 | 0.94444 |
| 95 | 0.31647 | −0.12328 | 0.94444 |
| 96 | 0.31842 | −0.09428 | 0.94444 |
| 97 | 0.32130 | −0.10239 | 0.94444 |
| 98 | 0.32385 | −0.12578 | 0.94444 |
| 99 | 0.32415 | −0.11051 | 0.94444 |
| 100 | 0.32695 | −0.11864 | 0.94444 |
| 1 | 0.03928 | 0.05338 | 0.97222 |
| 2 | 0.03963 | 0.06189 | 0.97222 |
| 3 | 0.04176 | 0.07016 | 0.97222 |
| 4 | 0.04396 | 0.04669 | 0.97222 |
| 5 | 0.04487 | 0.07812 | 0.97222 |
| 6 | 0.04871 | 0.08576 | 0.97222 |
| 7 | 0.05227 | 0.04483 | 0.97222 |
| 8 | 0.05319 | 0.09304 | 0.97222 |
| 9 | 0.05826 | 0.09993 | 0.97222 |
| 10 | 0.06082 | 0.04466 | 0.97222 |
| 11 | 0.06385 | 0.10639 | 0.97222 |
| 12 | 0.06935 | 0.04523 | 0.97222 |
| 13 | 0.06992 | 0.11241 | 0.97222 |
| 14 | 0.07644 | 0.11794 | 0.97222 |
| 15 | 0.07785 | 0.04613 | 0.97222 |
| 16 | 0.08338 | 0.12295 | 0.97222 |
| 17 | 0.08636 | 0.04706 | 0.97222 |
| 18 | 0.09072 | 0.12731 | 0.97222 |
| 19 | 0.09487 | 0.04789 | 0.97222 |
| 20 | 0.09844 | 0.13098 | 0.97222 |
| 21 | 0.10340 | 0.04853 | 0.97222 |
| 22 | 0.10648 | 0.13388 | 0.97222 |
| 23 | 0.11194 | 0.04886 | 0.97222 |
| 24 | 0.11477 | 0.13600 | 0.97222 |
| 25 | 0.12049 | 0.04878 | 0.97222 |
| 26 | 0.12322 | 0.13728 | 0.97222 |
| 27 | 0.12902 | 0.04821 | 0.97222 |
| 28 | 0.13175 | 0.13772 | 0.97222 |
| 29 | 0.13750 | 0.04712 | 0.97222 |
| 30 | 0.14029 | 0.13735 | 0.97222 |
| 31 | 0.14590 | 0.04551 | 0.97222 |

TABLE I-continued

Non-Dimensionalized [X Y Z/Span Height]

| N | X | Y | Z |
|---|---|---|---|
| 32 | 0.14875 | 0.13617 | 0.97222 |
| 33 | 0.15418 | 0.04341 | 0.97222 |
| 34 | 0.15708 | 0.13422 | 0.97222 |
| 35 | 0.16235 | 0.04087 | 0.97222 |
| 36 | 0.16521 | 0.13158 | 0.97222 |
| 37 | 0.17039 | 0.03794 | 0.97222 |
| 38 | 0.17309 | 0.12825 | 0.97222 |
| 39 | 0.17825 | 0.03459 | 0.97222 |
| 40 | 0.18067 | 0.12432 | 0.97222 |
| 41 | 0.18593 | 0.03084 | 0.97222 |
| 42 | 0.18795 | 0.11984 | 0.97222 |
| 43 | 0.19340 | 0.02667 | 0.97222 |
| 44 | 0.19493 | 0.11489 | 0.97222 |
| 45 | 0.20063 | 0.02211 | 0.97222 |
| 46 | 0.20161 | 0.10955 | 0.97222 |
| 47 | 0.20761 | 0.01718 | 0.97222 |
| 48 | 0.20800 | 0.10386 | 0.97222 |
| 49 | 0.21412 | 0.09790 | 0.97222 |
| 50 | 0.21434 | 0.01190 | 0.97222 |
| 51 | 0.22000 | 0.09169 | 0.97222 |
| 52 | 0.22084 | 0.00635 | 0.97222 |
| 53 | 0.22567 | 0.08529 | 0.97222 |
| 54 | 0.22712 | 0.00054 | 0.97222 |
| 55 | 0.23115 | 0.07872 | 0.97222 |
| 56 | 0.23321 | −0.00547 | 0.97222 |
| 57 | 0.23642 | 0.07198 | 0.97222 |
| 58 | 0.23909 | −0.01167 | 0.97222 |
| 59 | 0.24148 | 0.06510 | 0.97222 |
| 60 | 0.24478 | −0.01804 | 0.97222 |
| 61 | 0.24635 | 0.05808 | 0.97222 |
| 62 | 0.25031 | −0.02458 | 0.97222 |
| 63 | 0.25104 | 0.05093 | 0.97222 |
| 64 | 0.25556 | 0.04367 | 0.97222 |
| 65 | 0.25566 | −0.03125 | 0.97222 |
| 66 | 0.25992 | 0.03631 | 0.97222 |
| 67 | 0.26085 | −0.03804 | 0.97222 |
| 68 | 0.26414 | 0.02887 | 0.97222 |
| 69 | 0.26590 | −0.04495 | 0.97222 |
| 70 | 0.26822 | 0.02135 | 0.97222 |
| 71 | 0.27081 | −0.05195 | 0.97222 |
| 72 | 0.27216 | 0.01377 | 0.97222 |
| 73 | 0.27562 | −0.05902 | 0.97222 |
| 74 | 0.27600 | 0.00612 | 0.97222 |
| 75 | 0.27971 | −0.00158 | 0.97222 |
| 76 | 0.28035 | −0.06615 | 0.97222 |
| 77 | 0.28331 | −0.00934 | 0.97222 |
| 78 | 0.28499 | −0.07332 | 0.97222 |
| 79 | 0.28681 | −0.01714 | 0.97222 |
| 80 | 0.28956 | −0.08056 | 0.97222 |
| 81 | 0.29022 | −0.02498 | 0.97222 |
| 82 | 0.29353 | −0.03287 | 0.97222 |
| 83 | 0.29405 | −0.08783 | 0.97222 |
| 84 | 0.29676 | −0.04078 | 0.97222 |
| 85 | 0.29843 | −0.09517 | 0.97222 |
| 86 | 0.29993 | −0.04873 | 0.97222 |
| 87 | 0.30273 | −0.10257 | 0.97222 |
| 88 | 0.30304 | −0.05669 | 0.97222 |
| 89 | 0.30611 | −0.06468 | 0.97222 |
| 90 | 0.30693 | −0.11001 | 0.97222 |
| 91 | 0.30913 | −0.07267 | 0.97222 |
| 92 | 0.31107 | −0.11750 | 0.97222 |
| 93 | 0.31212 | −0.08069 | 0.97222 |
| 94 | 0.31506 | −0.08872 | 0.97222 |
| 95 | 0.31519 | −0.12500 | 0.97222 |
| 96 | 0.31797 | −0.09676 | 0.97222 |
| 97 | 0.32084 | −0.10481 | 0.97222 |
| 98 | 0.32249 | −0.12776 | 0.97222 |
| 99 | 0.32366 | −0.11289 | 0.97222 |
| 100 | 0.32640 | −0.12100 | 0.97222 |
| 1 | 0.03973 | 0.06784 | 1.00000 |
| 2 | 0.04113 | 0.07625 | 1.00000 |
| 3 | 0.04239 | 0.06008 | 1.00000 |
| 4 | 0.04406 | 0.08428 | 1.00000 |
| 5 | 0.04790 | 0.09190 | 1.00000 |
| 6 | 0.05039 | 0.05741 | 1.00000 |
| 7 | 0.05251 | 0.09910 | 1.00000 |
| 8 | 0.05776 | 0.10589 | 1.00000 |
| 9 | 0.05886 | 0.05634 | 1.00000 |
| 10 | 0.06351 | 0.11223 | 1.00000 |
| 11 | 0.06743 | 0.05614 | 1.00000 |
| 12 | 0.06973 | 0.11810 | 1.00000 |
| 13 | 0.07592 | 0.05672 | 1.00000 |
| 14 | 0.07641 | 0.12345 | 1.00000 |
| 15 | 0.08353 | 0.12820 | 1.00000 |
| 16 | 0.08432 | 0.05833 | 1.00000 |
| 17 | 0.09104 | 0.13231 | 1.00000 |
| 18 | 0.09286 | 0.05857 | 1.00000 |
| 19 | 0.09891 | 0.13568 | 1.00000 |
| 20 | 0.10142 | 0.05851 | 1.00000 |
| 21 | 0.10704 | 0.13827 | 1.00000 |
| 22 | 0.10997 | 0.05818 | 1.00000 |
| 23 | 0.11539 | 0.13997 | 1.00000 |
| 24 | 0.11850 | 0.05754 | 1.00000 |
| 25 | 0.12389 | 0.14075 | 1.00000 |
| 26 | 0.12700 | 0.05652 | 1.00000 |
| 27 | 0.13243 | 0.14064 | 1.00000 |
| 28 | 0.13544 | 0.05511 | 1.00000 |
| 29 | 0.14095 | 0.13970 | 1.00000 |
| 30 | 0.14379 | 0.05327 | 1.00000 |
| 31 | 0.14934 | 0.13800 | 1.00000 |
| 32 | 0.15204 | 0.05100 | 1.00000 |
| 33 | 0.15756 | 0.13558 | 1.00000 |
| 34 | 0.16015 | 0.04827 | 1.00000 |
| 35 | 0.16553 | 0.13249 | 1.00000 |
| 36 | 0.16809 | 0.04510 | 1.00000 |
| 37 | 0.17325 | 0.12879 | 1.00000 |
| 38 | 0.17586 | 0.04153 | 1.00000 |
| 39 | 0.18065 | 0.12453 | 1.00000 |
| 40 | 0.18344 | 0.03756 | 1.00000 |
| 41 | 0.18774 | 0.11977 | 1.00000 |
| 42 | 0.19082 | 0.03323 | 1.00000 |
| 43 | 0.19452 | 0.11457 | 1.00000 |
| 44 | 0.19798 | 0.02855 | 1.00000 |
| 45 | 0.20102 | 0.10899 | 1.00000 |
| 46 | 0.20493 | 0.02355 | 1.00000 |
| 47 | 0.20724 | 0.10310 | 1.00000 |
| 48 | 0.21164 | 0.01825 | 1.00000 |
| 49 | 0.21324 | 0.09698 | 1.00000 |
| 50 | 0.21813 | 0.01267 | 1.00000 |
| 51 | 0.21901 | 0.09065 | 1.00000 |
| 52 | 0.22440 | 0.00686 | 1.00000 |
| 53 | 0.22456 | 0.08414 | 1.00000 |
| 54 | 0.22991 | 0.07747 | 1.00000 |
| 55 | 0.23046 | 0.00081 | 1.00000 |
| 56 | 0.23508 | 0.07066 | 1.00000 |
| 57 | 0.23633 | −0.00542 | 1.00000 |
| 58 | 0.24008 | 0.06372 | 1.00000 |
| 59 | 0.24201 | −0.01181 | 1.00000 |
| 60 | 0.24493 | 0.05667 | 1.00000 |
| 61 | 0.24752 | −0.01836 | 1.00000 |
| 62 | 0.24962 | 0.04952 | 1.00000 |
| 63 | 0.25288 | −0.02504 | 1.00000 |
| 64 | 0.25416 | 0.04227 | 1.00000 |
| 65 | 0.25808 | −0.03183 | 1.00000 |
| 66 | 0.25856 | 0.03493 | 1.00000 |
| 67 | 0.26282 | 0.02751 | 1.00000 |
| 68 | 0.26314 | −0.03872 | 1.00000 |
| 69 | 0.26695 | 0.02001 | 1.00000 |
| 70 | 0.26808 | −0.04571 | 1.00000 |
| 71 | 0.27095 | 0.01244 | 1.00000 |
| 72 | 0.27290 | −0.05278 | 1.00000 |
| 73 | 0.27482 | 0.00482 | 1.00000 |
| 74 | 0.27761 | −0.05992 | 1.00000 |
| 75 | 0.27858 | −0.00287 | 1.00000 |
| 76 | 0.28221 | −0.06714 | 1.00000 |
| 77 | 0.28222 | −0.01062 | 1.00000 |
| 78 | 0.28576 | −0.01841 | 1.00000 |
| 79 | 0.28673 | −0.07441 | 1.00000 |
| 80 | 0.28919 | −0.02624 | 1.00000 |
| 81 | 0.29118 | −0.08172 | 1.00000 |
| 82 | 0.29254 | −0.03412 | 1.00000 |
| 83 | 0.29429 | −0.08964 | 1.00000 |

TABLE I-continued

Non-Dimensionalized [X Y Z/Span Height]

| N | X | Y | Z |
|---|---|---|---|
| 84 | 0.29579 | −0.04203 | 1.00000 |
| 85 | 0.29732 | −0.09760 | 1.00000 |
| 86 | 0.29898 | −0.04997 | 1.00000 |
| 87 | 0.30163 | −0.10498 | 1.00000 |
| 88 | 0.30211 | −0.05794 | 1.00000 |
| 89 | 0.30520 | −0.06592 | 1.00000 |
| 90 | 0.30586 | −0.11242 | 1.00000 |
| 91 | 0.30824 | −0.07391 | 1.00000 |
| 92 | 0.31003 | −0.11989 | 1.00000 |
| 93 | 0.31124 | −0.08193 | 1.00000 |
| 94 | 0.31420 | −0.08996 | 1.00000 |
| 95 | 0.31429 | −0.12732 | 1.00000 |
| 96 | 0.31711 | −0.09800 | 1.00000 |
| 97 | 0.32001 | −0.10606 | 1.00000 |
| 98 | 0.32193 | −0.12927 | 1.00000 |
| 99 | 0.32286 | −0.11412 | 1.00000 |
| 100 | 0.32554 | −0.12225 | 1.00000 |

It will also be appreciated that the bucket disclosed in the above Table may be scaled up or down geometrically for use in other similar turbine designs. Consequently, the coordinate values set forth in Table 1 may be scaled upwardly or downwardly such that the internal profile shape of the bucket remains unchanged. A scaled version of the coordinates in Table 1 would be represented by X, Y and Z coordinate values of Table 1, with the non-dimensional X, Y and Z coordinate values for example converted to inches, multiplied and/or divided by a constant number.

Figure 7:
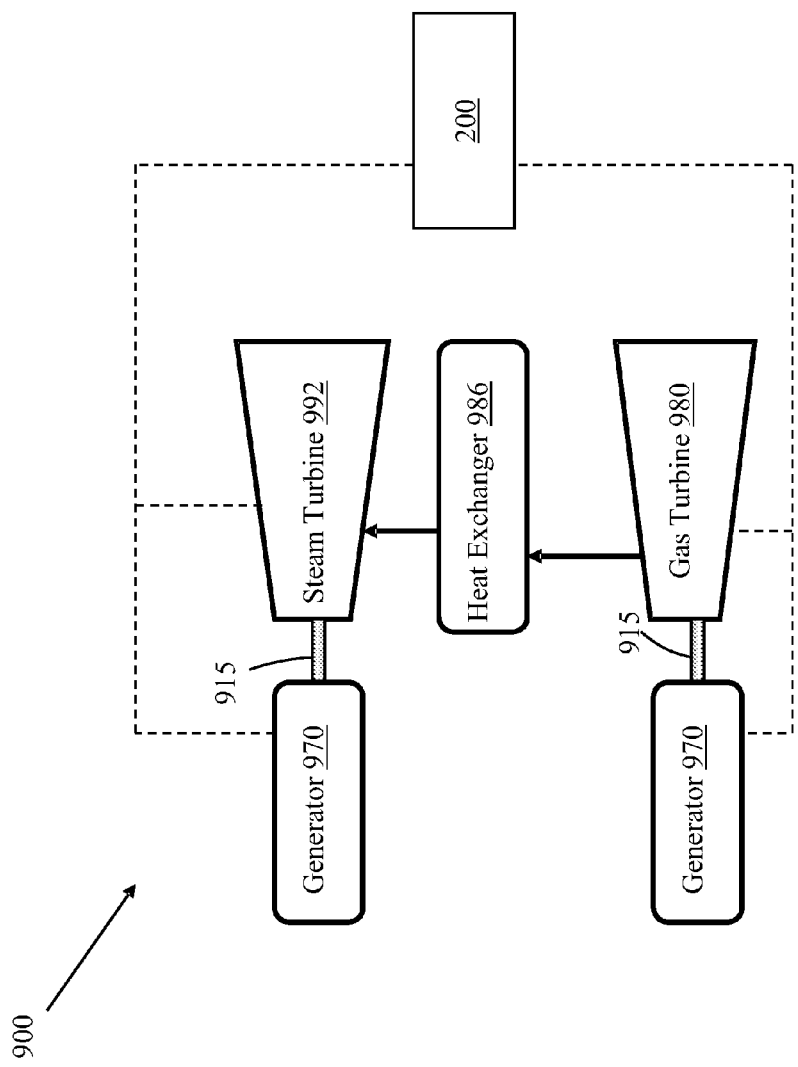
FIG. 7 shows a schematic block diagram illustrating portions of a multi-shaft combined cycle power plant system according to embodiments of the invention.
Figure 8:
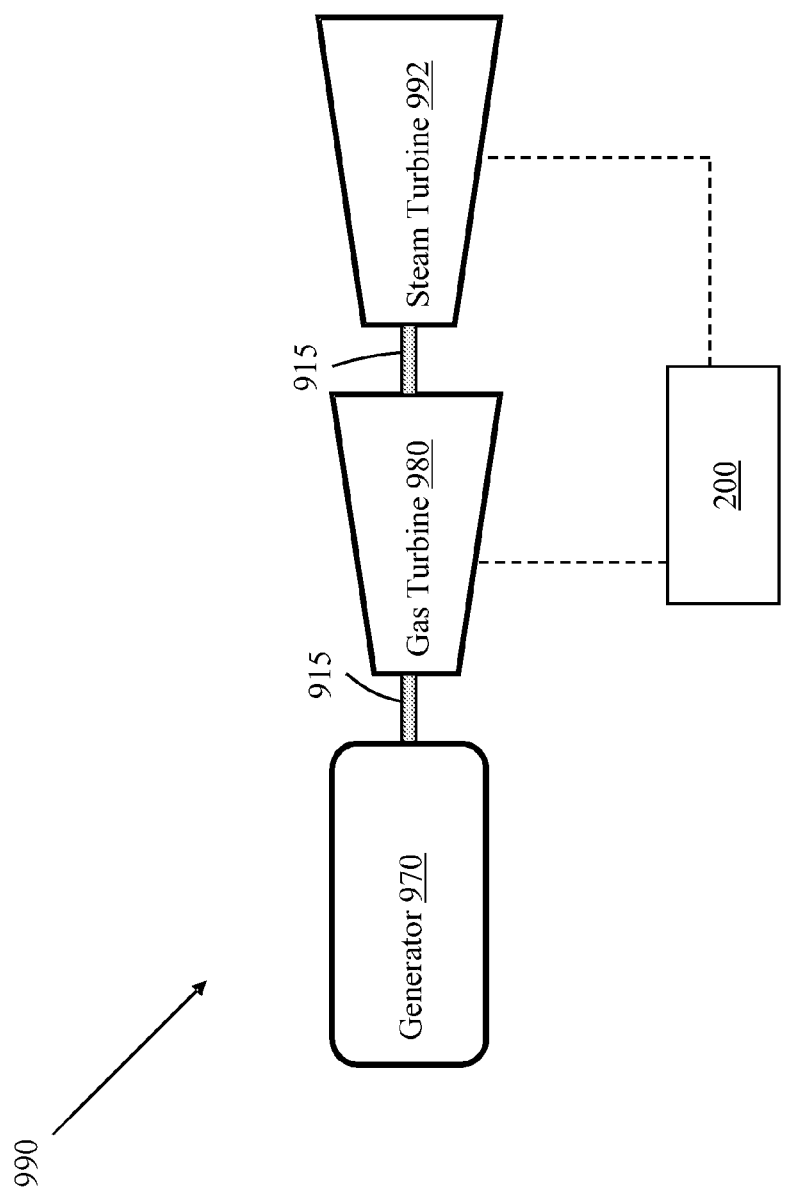
FIG. 8 shows a schematic block diagram illustrating portions of a single-shaft combined cycle power plant system according to embodiments of the invention.

Turning to FIG. 7, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 7 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more buckets 200 as shown and described with reference to FIG. 2 and/or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 8, a single shaft combined cycle power plant 990 may include a single generator 970 coupled to both gas turbine 980 and steam turbine 992 via a single shaft 915. Steam turbine 992 and/or gas turbine 980 may include one or more buckets 200 shown and described with reference to FIG. 2 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased reduced tip leakage and increased efficiency of the apparatus and devices described herein.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A turbine comprising:
   a diaphragm section; and
   a rotor section at least partially contained within the diaphragm section, the rotor section having a set of buckets including at least one bucket having:
   a base; and
   an airfoil connected with the base at a first end of the airfoil, the airfoil including:
      a casing having: a suction side; a pressure side opposing the suction side; a leading edge spanning between the pressure side and the suction side; and a trailing edge opposing the leading edge and spanning between the pressure side and the suction side, the casing including an aperture on the leading edge; and
      a core within the casing, the core having a serpentine shape for supporting the casing and a leading edge passage fluidly connected with the aperture on the leading edge of the casing,
      wherein the at least one bucket has a nominal internal core profile substantially in accordance with Cartesian coordinate values of X, Y and Z set forth in Table I, wherein the Z values are non-dimensional values from 0 to 1 convertible to Z distances in inches by multiplying the Z values by a height of the at least one bucket in inches, and wherein X and Y are non-dimensional values which, when connected by smooth continuing arcs, define internal core profile sections at each distance Z along the at least one bucket, the profile sections at the Z distances being joined smoothly with one another to form the at least one bucket internal core profile.

2. A turbine bucket comprising:
   a base; and
   an airfoil connected with the base at a first end of the airfoil, the airfoil including:
      a casing having: a suction side; a pressure side opposing the suction side; a leading edge spanning between the pressure side and the suction side; and a trailing edge opposing the leading edge and spanning between the pressure side and the suction side, the casing including an aperture on the leading edge; and
      a core within the casing, the core having a serpentine shape for supporting the casing and a leading edge passage fluidly connected with the aperture on the leading edge of the casing, wherein the serpentine shaped core includes:
         a set of contiguous reinforcement members extending substantially radially within the casing; and
         a set of support member chutes proximate one end of the set of contiguous reinforcement members for holding a set of support members,
      wherein the set of contiguous reinforcement members includes:
         a plurality of reinforcement fingers;
         a set of radially inner turns between adjacent reinforcement fingers; and
         a set of radially outer turns between adjacent reinforcement fingers, wherein at least one of the radially outer turns in the set of radially outer turns includes a non-asymmetric arc feature such that the adjacent reinforcement fingers are separated by a first distance at a radially outermost portion of the turn and are separated by a second distance, less than the first distance, at a radially inner portion of the turn,
      wherein the turbine bucket has a nominal internal core profile substantially in accordance with Cartesian coordinate values of X, Y and Z set forth in Table I, wherein the Z values are non-dimensional values from 0 to 1 convertible to Z distances in inches by multiplying the Z values by a height of the bucket in inches, and wherein X and Y are non-dimensional values which, when connected by smooth continuing arcs, define internal core profile sections at each distance Z along the bucket, the profile sections at the Z distances being joined smoothly with one another to form said bucket internal core profile.

3. The turbine bucket of claim 2, wherein each support member includes a brazed or welded support ball.

4. The turbine bucket of claim 2, wherein the set of support member chutes is located radially inboard of the set of contiguous reinforcement members.

5. The turbine bucket of claim 2, wherein the set of contiguous reinforcement members are substantially unitary.

6. The turbine bucket of claim 2, wherein the core further includes an at least partially radially extending passage fluidly connected with the aperture on the leading edge via the leading edge passage.

7. A turbine bucket comprising:
   a base; and
   an airfoil connected with the base at a first end of the airfoil, the airfoil including:
      a casing having: a suction side; a pressure side opposing the suction side; a leading edge spanning between the pressure side and the suction side; and a trailing edge opposing the leading edge and spanning between the pressure side and the suction side, the casing including an aperture on the leading edge; and
      a core within the casing, the core having a serpentine shape for supporting the casing and a leading edge passage fluidly connected with the aperture on the leading edge of the casing,
   wherein the turbine bucket has a nominal internal core profile substantially in accordance with Cartesian coordinate values of X, Y and Z set forth in Table I, wherein the Z values are non-dimensional values from 0 to 1 convertible to Z distances in inches by multiplying the Z values by a height of the bucket in inches, and wherein X and Y are non-dimensional values which, when connected by smooth continuing arcs, define internal core profile sections at each distance Z along the bucket, the profile sections at the Z distances being joined smoothly with one another to form said bucket internal core profile.

* * * * *